(12) United States Patent
Elizarrarás Maya et al.

(10) Patent No.: US 12,054,613 B2
(45) Date of Patent: Aug. 6, 2024

(54) DUAL COMPOSITION BLOCK COPOLYMERS

(71) Applicant: Dynasol Elastómeros, S.A. de C.V., Altamira (MX)

(72) Inventors: Daniel Abraham Elizarrarás Maya, Tampico (MX); Abel Zúñiga Calles, Altamira (MX); Gabriel Hernández Zamora, Tampico (MX); José Luis García Vidales, Tampico (MX); Jesús Eduardo Ibarra Rodríguez, Madero (MX)

(73) Assignee: Dynasol Elastómeros, S.A. de C.V., Altamira (MX)

( * ) Notice: Subject to any disclaimer, the term of this patent is extended or adjusted under 35 U.S.C. 154(b) by 664 days.

(21) Appl. No.: 17/282,111

(22) PCT Filed: Dec. 10, 2019

(86) PCT No.: PCT/IB2019/001434
§ 371 (c)(1),
(2) Date: Apr. 1, 2021

(87) PCT Pub. No.: WO2020/128635
PCT Pub. Date: Jun. 25, 2020

(65) Prior Publication Data
US 2021/0371642 A1 Dec. 2, 2021

(51) Int. Cl.
*C08F 297/04* (2006.01)
*C08F 297/02* (2006.01)
(Continued)

(52) U.S. Cl.
CPC ............ *C08L 9/06* (2013.01); *C08F 297/046* (2013.01); *C08J 9/103* (2013.01); *C08L 53/02* (2013.01);
(Continued)

(58) Field of Classification Search
CPC .......... C08L 9/06; C08L 9/00; C08L 2205/02; C08F 297/04; C08F 297/023; C08F 297/044; C08F 297/046
See application file for complete search history.

(56) References Cited

U.S. PATENT DOCUMENTS

| 4,003,860 A | 1/1977 | LeClerc |
| 5,036,138 A * | 7/1991 | Stamhuis .................. C08L 9/00 |
| | | 152/905 |

(Continued)

FOREIGN PATENT DOCUMENTS

| EP | 0323653 A1 | 7/1989 |
| EP | 0674578 B1 | 9/1999 |

(Continued)

*Primary Examiner* — Rip A Lee
(74) *Attorney, Agent, or Firm* — Stephen S. Hodgson

(57) ABSTRACT

Dual composition block copolymers made from conjugated diene and monovinyl aromatic monomers in batch organolithium initiated polymerization show advantageous performance in the production of crosslinked microcellular rubber compounds and pressure sensitive hot melt adhesives. The dual composition block copolymers are partially coupled with a coupling agent linking inner monovinyl aromatic blocks. Their un-coupled low molecular weight fraction has greater monovinyl aromatic repeating unit content than their coupled high molecular weight fraction. Crosslinked microcellular rubber articles made from the dual composition block copolymers exhibit lower density, smaller and more homogeneous cell size, higher softness and higher resiliency than prior art block copolymers. Rubber compounding of formulations comprising the dual composition block copolymers proceed at slightly lower torque and slightly lower temperature than with prior art block copolymers. Pressure sensitive hot melt adhesives formulated with the dual composition block copolymers are very well suited for labels, (Continued)

exhibiting higher tack and higher softening temperature than those made from prior art block copolymers.

23 Claims, 5 Drawing Sheets

(51) Int. Cl.
    *C08J 9/10*     (2006.01)
    *C08L 9/06*     (2006.01)
    *C08L 53/02*     (2006.01)

(52) U.S. Cl.
    CPC ...... *C08F 297/023* (2013.01); *C08F 297/044* (2013.01); *C08J 2201/026* (2013.01); *C08J 2205/044* (2013.01); *C08J 2353/02* (2013.01); *C08L 2205/025* (2013.01)

(56) References Cited

U.S. PATENT DOCUMENTS

| | | | |
|---|---|---|---|
| 7,893,156 B2* | 2/2011 | Hoshi | B32B 27/08 525/271 |
| 8,680,195 B2* | 3/2014 | Fraga Trillo | C08F 293/00 524/505 |
| 8,772,414 B2 | 7/2014 | Liang et al. | |
| 8,883,927 B2* | 11/2014 | Rojas Garcia | C08F 297/044 525/332.9 |
| 8,981,008 B2* | 3/2015 | Moctezuma Espiricueto | C08L 95/00 525/940 |
| 8,987,371 B2* | 3/2015 | Corona Galvan | C08F 8/04 524/572 |
| 10,865,301 B2* | 12/2020 | Cruz Tejedor | C08K 5/01 |
| 11,370,873 B2* | 6/2022 | Moctezuma Espiricueto | C08L 95/005 |
| 11,525,025 B2* | 12/2022 | Muyldermans | C08L 9/06 |
| 2009/0137704 A1* | 5/2009 | Rojas Garcia | C08F 297/044 524/68 |
| 2012/0172516 A1* | 7/2012 | Wright | C08L 53/02 524/505 |
| 2015/0259491 A1 | 9/2015 | LiPiShan et al. | |
| 2017/0210841 A1 | 7/2017 | Moctezuma et al. | |
| 2018/0215912 A1* | 8/2018 | Cruz Tejedor | C08F 297/044 |
| 2020/0199334 A1* | 6/2020 | Elizarrarás Maya | C09J 153/02 |

FOREIGN PATENT DOCUMENTS

| | | |
|---|---|---|
| EP | 2546291 A1 | 1/2013 |
| GB | 1111250 | 4/1968 |
| GB | 1249220 A | 10/1971 |
| WO | WO 2008083451 A1 | 7/2008 |
| WO | WO 2018/047008 A2 | 3/2018 |

* cited by examiner

DUAL COMPOSITION BLOCK COPOLYMERS

CROSS REFERENCE TO RELATED APPLICATIONS

This application claims priority to U.S. patent application Ser. No. 16/595,913 filed on Oct. 8, 2019, and to U.S. Provisional Patent Application No. 62/782,668 filed on Dec. 20, 2018, each of which is incorporated by reference.

BACKGROUND OF THE INVENTION

1. Field of the Invention

This present invention is directed to dual composition block copolymers of conjugated diene and monovinyl aromatic monomers and more particularly to microcellular crosslinked rubber compounds and hot-melt pressure sensitive adhesives comprising dual composition block copolymers. The novel dual composition block copolymers of the invention can be used to produce microcellular crosslinked rubber compounds with closed cells of homogeneous size, without blistering defects, with improvements in softness and higher resilience. Hot-melt pressure sensitive adhesives based on the novel dual composition block copolymers exhibit improved tack and service temperature.

2. Description of the Related Art

Microcellular rubber compounds have widespread application in the manufacture of a variety of products such as shoe soles, sandals, cushioning pads, floating articles, sound dampening sheets, vibration dampening materials, shock absorbing protectors, sealing applications, etc. Moreover, these materials have great acceptance in the market because of their lightweight and cost effective attributes.

In the foaming of these compounds, closed cells are formed by expansion of a chemical or physical blowing agent under the influence of heat, or combined heat and decompression at typical temperature and pressure for vulcanizing compounding. Crosslinking of the microcellular rubber compounds adds improved and long lasting mechanical performance. Rubber elasticity during foaming, which in most processes is enhanced by partial crosslinking prior or simultaneous to foaming stage, is important to preserve closed cell structure. In the time elapsed between end of expansion and optimum crosslinking attainment, foam rubber compounds tend to shrink. Block copolymers of conjugated diene and monovinyl aromatic monomers have been used in crosslinked microcellular rubber compositions to avoid this shrinkage defect.

GB 1,249,220 discloses un-crosslinked elastic foams based on block copolymers, with block configuration of the form $(B-S)_n$, or $(B-S)_nB$, or $(S-B)_m$, wherein B represents substantially a 1-3,butadiene polymer, S represents substantially a styrene polymer, n is an integer ranging from 2 to 10 and m is an integer ranging from 1 to 10. The compositions also include polystyrene homopolymer. Nevertheless, the compositions are disadvantageous, since they include chloro-hydrofluorocarbons as blowing agents, which are harmful to the environment, and exhibit quite large cell size of 0.6 to 1.1 mm.

EP 0,323,653 A1 discloses crosslinked rubber foam compositions comprising block copolymers of monovinyl aromatic and conjugated diene monomers with the general formula $(A-E)_nA$, $(A-E)_n$ or $((A-E)_n)_mX$, wherein n ranges from 1 to 4, m ranges from 2 to 8, A represents a monovinyl aromatic polymer block, E represents a conjugated diene polymer block and/or selectively hydrogenated product thereof, and X represents a coupling agent residue. The compositions also include other rubbers, such as natural rubber, diene type synthetic rubber and non-diene synthetic rubber.

EP 2,546,291 discloses crosslinked rubber foam compositions comprising a block copolymer comprising vinyl aromatic monomer units and conjugated diene monomer units and/or a block copolymer comprising vinyl aromatic monomer units, conjugated diene monomer units and alkylene monomer units. The composition also includes an olefin-based copolymer (like polyethylene, ethylene-1-butene copolymers, ethylene-octene copolymers, etc.), and optionally an ethylene-based copolymer having an unsaturated group, as EPDM. Among a variety of sequence structures disclosed for the block copolymers, the preferred block configurations have end blocks rich in vinyl aromatic repeating units and elastomeric repeating unit mid-blocks.

WO 2008/083451 A1 discloses rubber vulcanized foam compounds containing block copolymers with molecular configuration consisting of polystyrene end-blocks and elastomeric mid-blocks; the elastomeric mid-blocks being butadiene, isoprene, ethylene, butylene or propylene based. This compounds additionally incorporate styrene-butadiene random copolymers with high and/or mean bound styrene content, as well as ethylene-propylene copolymer (EPR) or ethylene-propylene-diene terpolymer (EPDM).

Compositions disclosed in EP 0,323,653 A1, EP 2,546,291 and WO 2008/083451 A1 comprise block copolymers with end-blocks rich in vinyl aromatic repeating units surrounding mid-blocks rich in conjugated diene repeating units (or their hydrogenated products). Therefore, all of them have the disadvantage of requiring high compounding temperatures. This is because end-blocks rich in vinyl aromatic repeating units of the block copolymers therein disclosed, form an intermolecular physical network that softens adequately as to flow only above 120° C. This high operating compounding temperature may cause premature decomposition of the chemical blowing agent and/or premature crosslinking onset. This is particularly restrictive when compounding is performed in batch mixers, such as in a Banbury.

GB 1,111,250 discloses crosslinked microcellular rubber foam compositions comprising tapered di-block copolymers of conjugated diene and vinyl aromatic monomers. The tapered di-block copolymers disclosed therein are produced in a batch anionic solution polymerization process. The compositions also include random copolymers of conjugated diene and vinyl aromatic monomers, either obtained by anionic solution polymerization or by free radical emulsion polymerization.

U.S. Pat. No. 4,003,860 discloses crosslinked microcellular rubber foam compositions comprising tapered di-block copolymers of conjugated diene and monovinyl aromatic monomers. The tapered di-block copolymers disclosed therein are produced in a batch anionic polymerization process. The compositions also include an ethylene/vinyl acetate copolymer.

The main advantage of the compositions disclosed in GB 1,111,250 and U.S. Pat. No. 4,003,860 is adequate processability in a batch mixer equipment and shrinkage minimization of foamed compounds. Nevertheless, crosslinked microcellular rubber compounds comprising the kind of block copolymers disclosed therein have the disadvantages of non-homogeneous cell size, blister appearance defects, low softness and low resilience.

BRPI 0601080-6 A discloses formulations of vulcanized microporous rubber compounds including a block copolymer of styrene and butadiene as the main component. A minor amount of a resin with 40 to 80% of styrene content is included to add hardness to the formulation. The formulation is told to be advantageous for the molding of microporous or microcellular sandal soles. This patent lacks a description of the molecular configuration of the block copolymer and information about its composition range.

EP 0674578 B1, U.S. Pat. No. 8,772,414 B2 and US 2015/0259491 A1 show various polymeric foaming compositions where the polymers employed have preferred Tan delta values (the ratio of loss modulus to storage modulus, also known as dissipation factor) slightly below 1, in the melt state, for appropriate closed-cell foaming.

Microcellular crosslinked rubber compounds comprising tapered block copolymers of butadiene and styrene produced by anionic solution polymerization in continuous reactor process, are known to have a good balance of shrinkage and surface aesthetics, as well as adequate processability in batch compounding equipment. Nevertheless, they still confer hardness and low resilience to microcellular crosslinked rubber compounds. Moreover, the continuous anionic polymerization process lacks the flexibility of a batch process to switch polymerization recipes to get different rubber grades without expending off-grade transition production.

As discussed above, there is a need for block copolymers of conjugated diene and vinyl aromatic repeating units that can be adequately compounded with further ingredients to produce microcellular crosslinked rubber compounds, without problems of premature blow or premature crosslinking. There is also a need for compositions based on block copolymers of conjugated diene and vinyl aromatic repeating units that render crosslinked microcellular rubber compounds without shrinkage problems during their production. There is a further need for crosslinked rubber foam compounds, comprising block copolymers of conjugated diene and vinyl aromatic repeating units, which can be shaped into articles with excellent surface appearance, absent of blister defects, with improved softness and high resilience. There is additional need for batch polymerization processes to produce block copolymers of conjugated diene and vinyl aromatic repeating units with excellent foaming attributes.

SUMMARY OF THE INVENTION

The present invention provides novel dual composition block copolymers made from monovinyl aromatic and conjugated diene monomers by alkyllithium initiated solution polymerization. The terms "dual composition block copolymer" or "dual composition block copolymers" used in the specification for and claims to the present invention refer to polymeric blends that comprise two kinds of block copolymer molecules that differ between each other in molecular weight, block arrangement structure, and monovinyl aromatic repeating unit content.

Each kind of block copolymer molecules in the dual composition block copolymer can be distinguished as a peak in the molecular weight distribution of the whole dual composition block copolymer. The fraction with the peak at the highest the molecular weight in its molecular weight distribution corresponds to coupled block copolymer molecules. In these coupled block copolymer molecules, the coupling agent residue is covalently bonded to two or more inner monovinyl aromatic homopolymer blocks, only. The rest of each coupled block copolymer molecule is comprised by polymer blocks made of conjugated diene with interspersed monovinyl aromatic repeating units, or incorporating only conjugated diene repeating units. Adjacent to the coupled block copolymer peak in the molecular weight distribution of the dual composition block copolymer, in a lower molecular weight range, it can be distinguished an additional peak, or a couple of peaks, grouping uncoupled block copolymer molecules. These uncoupled block copolymer molecules have a single monovinyl aromatic homopolymer end-block per molecule, and the reminder portion of each uncoupled block copolymer molecule is built by polymer blocks, comprising either conjugated diene repeating units with interspersed monovinyl aromatic diene repeating units or only conjugated diene repeating units. Average monovinyl aromatic repeating unit content in the coupled block copolymer molecules is lower than in the uncoupled block copolymer molecules. Moreover, average molecular weight of the individual monovinyl aromatic homopolymer inner blocks in the coupled block copolymer molecules is lower than that of monovinyl aromatic homopolymer end-blocks found in the uncoupled block copolymer molecules. Also, the average molecular weight of outer blocks comprising conjugated diene repeating units in the coupled block copolymer is about the same as the molecular weight of blocks comprising conjugated diene repeating units found in uncoupled block copolymer.

The invention also provides processes to obtain the novel dual composition block copolymers in a batch polymerization reactor.

The invention also provides compositions to produce crosslinked microcellular rubber compounds comprising a novel dual composition block copolymer, among other typical ingredients for this class of compounds.

The compositions of the invention enable to accomplish the compounding stage of crosslinked microcellular rubber production in internal batch mixers, such as a Banbury, at reduced temperature, which is beneficial to avoid premature expansion of the chemical blowing agent and to avoid premature crosslinking problems. The compounding stage also proceeds at lower torque than with prior art block copolymers of same Mooney viscosity, thus incorporation of dual composition block copolymers in this kind of formulations is beneficial as energy savings are obtained in the compounding process. The compositions of the invention also provide the advantage of negligible shrinking of the microcellular compound during the crosslinking stage. Shaped articles produced with the compositions of the invention exhibit excellent surface appearance, absent of blisters, high softness and high resilience.

The invention also provides hot-melt pressure sensitive adhesive formulations comprising a novel dual composition block copolymer, among other typical ingredients for this class of adhesives. It has been un-expectedly found that hot-melt pressure sensitive adhesive comprising this novel dual composition block copolymers have improved tack and service temperature range.

BRIEF DESCRIPTION OF THE DRAWINGS

In FIG. 1 to FIG. 8, black bars denote sequences of monovinyl aromatic repeating units, gray bars depict sequences of conjugated diene repeating units, and X is the residue of a tetrafunctional coupling agent. In FIG. 1 to FIG. 6 black lines among sequences of conjugated diene repeating units represent different arrangements in which monovinyl aromatic repeating units are copolymerized with conjugated diene repeating units; their location and spacing are not specific locations of individual monovinyl aromatic repeating units, rather, they show the trend of concentration of monovinyl aromatic repeating units interspersed along blocks also containing conjugated diene repeat units. Thus, a slight gradient followed by steep gradient concentration profile, characteristic of tapered copolymerization, is shown in FIG. 1 and FIG. 2; a randomization with only a portion of the conjugated diene repeating units is depicted in FIG. 3 and FIG. 4; and a fully randomized arrangement with all the conjugated diene repeating units appears in FIG. 5 and FIG. 6.

DETAILED DESCRIPTION OF THE EXEMPLARY EMBODIMENTS

Figure 1:
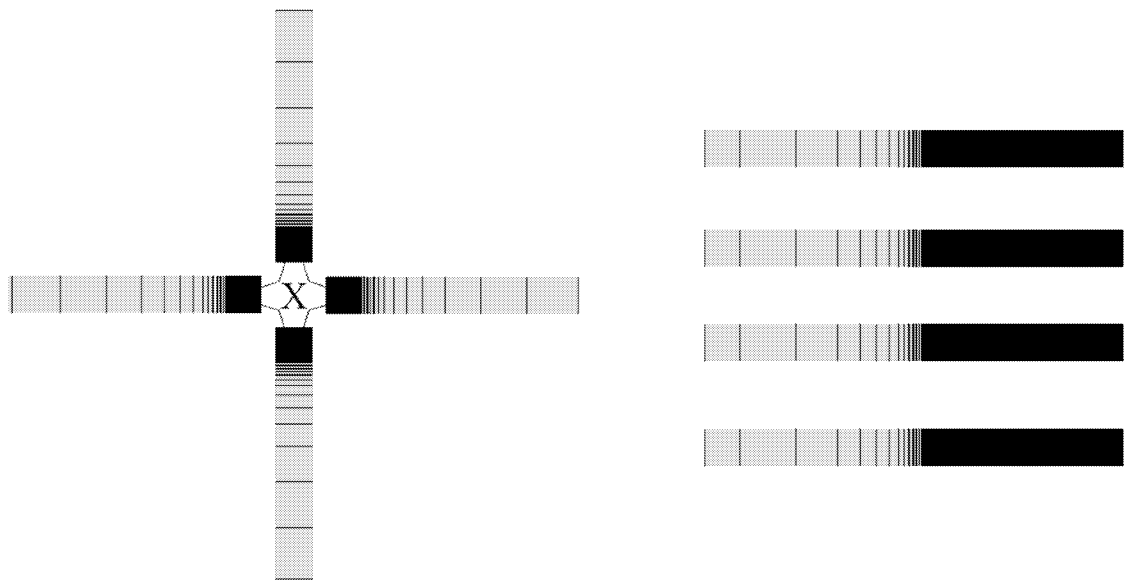
FIG. 1 shows a schematic of dual composition block copolymer comprised of about 38 wt. % of coupled block copolymer C of formula $[D-(D/A)-A_1]_4-X$ (on the left) and about 62 wt. % of un-coupled block copolymer U of formula $D-(D/A)-A_2$ (on the right).

The present invention provides novel dual composition block copolymers made from monovinyl aromatic and conjugated diene monomers, comprising two types of block copolymer molecules C and U.

In one embodiment, the dual composition block copolymers of the invention have a molecular weight distribution with at least two distinguishable fractions, each with a peak in the molecular distribution, as obtained by gel permeation chromatography technique, using a 3-column set, employing a differential refractive index detector, and relying on universal calibration molecular weight curve referred to polystyrene standards (GPC-RI). Adjacent fractions are delimited from each other at local minimums in the molecular weight distribution curve. Block copolymer C is constituted by the fraction with the peak of highest molecular weight in the molecular weight distribution, and block copolymer U constitutes the remainder of the molecular weight distribution.

In one embodiment, the dual composition block copolymers of the invention have an amount of block copolymer C, quantified by integration of the fraction with the peak at highest molecular weight relative to the whole dual composition block copolymer molecular weight distribution obtained by GPC-RI, from 20% to 80%, more preferably from 30% to 60%, and most preferably from 35% to 45%. Complementary, the dual composition block copolymers of the invention have an amount of block copolymer U, quantified by the integration of the rest of the molecular weight distribution obtained by GPC-RI relative to the whole dual composition block copolymer molecular weight distribution, from 80% to 20%, more preferably from 70% to 40%, and most preferably from 65 to 55%. In one embodiment, the dual composition block copolymers of the invention have a total monovinyl aromatic repeating unit content, % A$_t$, from 20% to 50% on a weight percent basis, as determined by proton NMR analysis.

Dual composition block copolymers of the invention have a characteristic monovinyl aromatic repeating unit blockiness degree, as determined by proton NMR analysis. Monovinyl aromatic repeating unit blockiness degree is quantified as the mole percent of monovinyl aromatic repeating units in the block copolymer that are not covalently bonded to conjugated diene repeating units, on a total monovinyl aromatic repeating unit basis. In one embodiment, the dual composition block copolymers of the invention have a monovinyl aromatic repeating unit blockiness degree from about 76 mole % to about 100 mole %, more preferably from about 81 mole % to about 100 mole %, and most preferably from about 85 mole % to about 100 mole %, on a total monovinyl aromatic repeating unit basis.

A distinctive characteristic of the dual composition block copolymers of the invention is that the monovinyl aromatic repeating unit content in block copolymer U is higher than the monovinyl aromatic repeating unit content in block copolymer C. The monovinyl aromatic repeating unit weight percent content in the block copolymer U, % A$_U$, the monovinyl aromatic repeating unit weight percent content of block copolymer C, % A$_C$, and the monovinyl aromatic repeating unit weight percent compositional difference between block copolymer fractions U and C, % CD, are calculated as follows:

$$\% A_U = \frac{(100 - \% C_{uv}) \times \% A_t}{(100 - \% C_{ri})}$$

$$\% A_C = \frac{\% C_{uv} \times \% A_t}{\% C_{ri}}$$

$$\% CD = \% A_U - \% A_C$$

where % C$_{uv}$ is the percent amount of the fraction with the peak of highest molecular weight, which corresponds to block copolymer C, relative to the whole molecular weight distribution of the dual block copolymer of the invention obtained by GPC technique with a 3-column set, employing UV absorbance detector at a wavelength of 261 nm and relying on universal calibration molecular weight curve referred to polystyrene standards (GPC-UV);

% $A_t$ is the total monovinyl aromatic content of the whole dual composition block copolymer of the invention on a weight basis, obtained by proton NMR analysis; and % $C_{rt}$ is the percent amount of the fraction with the peak of highest molecular weight, which corresponds to block copolymer C, relative to the whole molecular weight distribution of the dual block copolymer of the invention, as obtained by gel permeation chromatography technique using a 3-column set, employing differential refractive index detector, and relying on universal calibration molecular weight curve referred to polystyrene standards (GPC-RI).

In one embodiment, the dual composition block copolymers of the invention exhibit a monovinyl aromatic repeating unit weight percent compositional difference between block copolymer fractions U and C, % CD, of at least 10 wt. %, preferably of at least 15 wt. %, and most preferably of at least 20 wt. %.

Tan delta, which is defined as the ratio of loss modulus to storage modulus, is well known in the art as a very appropriate indicator of the balance between the ability to flow and melt strength, and therefore of foaming capability for a variety of polymeric materials. Without being limited by any particular theory, polymeric materials with Tan delta values below 1.0 may have enough melt strength to keep closed cell structure during expansion of blowing agent, which would be beneficial to narrow cell size distribution, producing improved foam surface aesthetics. As opposite, polymeric materials with Tan delta values above 1.0, at processing conditions, would therefore be prone to incur in cell membrane rupture and cell coalescence during foaming, which may widen cell size distribution, even up to a point that blistering surface defects could appear in foamed moldings.

After extensive study, it has been confirmed that prior art copolymers obtained by batch alkyllithium solution copolymerization of monovinyl aromatic and conjugated diene monomers fail to get appropriate Tan delta profile, and also it has been found that their viscoelastic behavior is tied to poor foaming performance. Several prior art block copolymer structures have been tested (tapered linear block copolymers, partially coupled tapered block copolymers, various levels of monovinyl aromatic repeating unit blockiness degrees, various levels of monovinyl aromatic content, various molecular weights, oil-extended block copolymers, and even mixtures of tapered linear block copolymers of different monovinyl aromatic repeating unit content) and all of them conducted to Tan delta profiles with values slightly above 1.0 in a considerable wide oscillating shear frequency range. These prior art alternatives, when formulated into crosslinked microcellular foam compositions, produced moldings that lacked neat surface aesthetics, as blistering defects were evident. Nevertheless, it has been surprisingly found that dual composition block copolymers of the present invention have a characteristic viscoelastic behavior that makes them advantageous for foaming purposes, as they exhibit Tan delta values only below 1.00 over a wide range of shear rate and processing temperatures, before any crosslinking has taken place. Correspondingly, it has been found that crosslinked microcellular compositions based on dual composition block copolymers have very homogeneous cell size, and their moldings have excellent surface aesthetics, free of blistering defects.

In one embodiment, the dual composition block copolymers of the invention exhibit maximum Tan delta values, when performing a dynamic oscillatory shear test sweeping oscillation frequency from 0.25 rad/s to 200 rad/s, at 100° C. and at a strain of 13.95%, from 0.74 to 0.95, more preferably from 0.74 to 0.88, and most preferably from 0.74 to 0.81. In general, for the dynamic oscillatory shear test, the dual composition block copolymer of the present invention have Tan delta values of less than 1.00, when oscillation frequency is varied from 0.25 to 200 rad/s, at a temperature of 100° C., and at strain of 13.95%. At a higher temperature, it was also found that for the dynamic oscillatory shear test, the dual composition block copolymer of the present invention have Tan delta values of less than 1.00, 0.95, 0.90 or 0.85 when oscillation frequency is varied from 0.25 to 200 rad/s, at a temperature of 140° C., and at strain of 13.95%.

In one embodiment, the dual composition block copolymer of the invention has a Mooney viscosity (ML 1+4 at 100° C.) from 25 to 90, preferably from 30 to 60, and more preferably from 35 to 55.

In one embodiment, the dual composition block copolymer of the invention has a complex shear dynamic viscosity, evaluated at a strain of 13.95%, at an oscillation frequency of 0.99 rad/s, and a temperature of 100° C., from 50000 Pa·s to 360000 Pa·s. In one embodiment, the dual composition block copolymer of the invention has a complex dynamic viscosity, evaluated at 100 rad/s at 100° C., from 3000 Pa·s to 12000 Pa·s.

Alkyllithium initiated batch copolymerization of conjugated diene and monovinyl aromatic monomers, either in bulk or in non-polar hydrocarbon solvent solution, in the absence of polar modifier compounds or randomizers, produces what is known as tapered or graded di-block copolymers of the type D-(D/A)-A, wherein D is a polymer block rich in conjugated diene repeating units; wherein (D/A) is a polymer block that is richer in conjugated diene repeating units towards its end adjacent to D block and that gradually changes its composition until it becomes substantially richer in monovinyl aromatic repeating units towards its opposite end; and wherein A is a polymer block made only of monovinyl aromatic repeating units. Production and application of such tapered or graded di-block copolymers of conjugated diene and monovinyl aromatic monomers is well known by those skilled in the art defined and described in H. L. Hsie, R. P. Quirk, Anionic Polymerization: Principles and Practical Applications, Marcel Dekker, Inc., Pag. 239-251 and 448-454.

In a preferred embodiment, the dual composition block copolymer of the invention comprises a block copolymer C and a block copolymer U, where block copolymer C has the general formula:

[D-(D/A)-A$_1$]$_n$-X; and block copolymer U has the general formula:

D-(D/A)-A$_2$; or

D-(D/A)-A$_2$ and D-(D/A)-A$_1$, where

D is a polymer block made from at least a conjugated diene monomer and at least a monovinyl aromatic monomer, where conjugated diene repeating units are in greater molar amount than monovinyl aromatic repeating units along the whole polymer block length;

(D/A) is a polymer block made from at least a conjugated diene monomer and at least a monovinyl aromatic monomer, where the polymer block end opposite to A$_1$ or A$_2$ is predominantly composed of conjugated diene repeating units and that gradually changes its composition along its length until it becomes substantially composed of monovinyl aromatic repeating units towards its end adjacent to $A_1$ or $A_2$;

$A_1$ and $A_2$ are polymer blocks made from monovinyl aromatic monomer only;

polymer block $A_2$ has a greater molecular weight than polymer block $A_1$;

X is the residue of a coupling agent;

n is an integer with a value from 2 to 30;

coupled block copolymer molecules of formula [D-(D/A)-$A_1$]$_n$-X account for from about 20 to about 80 wt. % of the molecular weight distribution of the dual composition block copolymer, as determined by GPC-RI;

uncoupled block copolymer molecules of formula D-(D/A)-$A_2$ account for from about 20 to about 80 wt. % of the molecular weight distribution of the dual composition block copolymer, as determined by GPC-RI; and uncoupled block copolymer molecules of formula D-(D/A)-$A_1$ account for from about 0 to about 20 wt. % of the molecular weight distribution of the dual composition block copolymer, as determined by GPC-RI.

In another embodiment, the dual composition block copolymer of the invention comprises a block copolymer C and a block copolymer U, where:

block copolymer C has the general formula:

[B-(B/A)-$A_1$]$_n$-X; and block copolymer U has the general formula:

B-(B/A)-$A_2$; or

B-(B/A)-$A_2$ and B-(B/A)-$A_1$, where:

B is a polymer block made from one or more conjugated diene monomers only;

(B/A) is a polymer block made from at least a conjugated diene monomer and at least a monovinyl aromatic monomer, where the conjugated diene and monovinyl aromatic repeating units are randomly arranged along the polymer block;

$A_1$ and $A_2$ are polymer blocks made from monovinyl aromatic monomer only, where polymer block $A_2$ has greater molecular weight than polymer block $A_1$;

X is the residue of a coupling agent;

n is an integer with a value from 2 to 30;

coupled block copolymer molecules of formula [B-(B/A)-$A_1$]$_n$-X account for from about 20 to about 80 wt. % of the molecular weight distribution of the dual composition block copolymer, as determined by GPC-RI;

uncoupled block copolymer molecules of formula B-(B/A)-$A_2$ account for from about 20 to about 80 wt. % of the molecular weight distribution of the dual composition block copolymer, as determined by GPC-RI; and uncoupled block copolymer molecules of formula B-(B/A)-$A_1$ account for from about 0 to about 20 wt. % of the molecular weight distribution of the dual composition block copolymer, as determined by GPC-RI.

In another embodiment, the dual composition block copolymer of the invention comprises a block copolymer C and a block copolymer U, where:

block copolymer C has the general formula

[B-$A_1$]$_n$-X; and block copolymer U has the general formula

B-$A_2$; or

B-$A_2$ and B-$A_1$, where:

B is a polymer block made from one or more conjugated diene monomers only;

$A_1$ and $A_2$ are polymer blocks made from monovinyl aromatic monomer only;

polymer block $A_2$ has a greater molecular weight than polymer block $A_1$;

X is the residue of a coupling agent;

n is an integer with a value from 2 to 30;

coupled block copolymer molecules of formula [B-$A_1$]$_n$-X account for from about 20 to about 80 wt. % of the molecular weight distribution of the dual composition block copolymer, as determined by GPC-RI;

uncoupled block copolymer molecules of formula B-$A_2$ account for from about 20 to about 80 wt. % of the molecular weight distribution of the dual composition block copolymer, as determined by GPC-RI; and uncoupled block copolymer molecules of formula B-$A_1$ account for from about 0 to about 20 wt. % of the molecular weight distribution of the dual composition block copolymer, as determined by GPC-RT.

In another embodiment, the dual composition block copolymer of the invention comprises a block copolymer C and a block copolymer U, where:

block copolymer C has the general formula:

[(B/A)-$A_1$]$_n$-X; and block copolymer U has the general formula:

(B/A)-$A_2$; or (B/A)-$A_2$ and (B/A)-$A_1$, where:

(B/A) is a polymer block made from at least a conjugated diene monomer and at least a monovinyl aromatic monomer, where conjugated diene and monovinyl aromatic repeating units are randomly arranged along polymer block;

$A_1$ and $A_2$ are polymer blocks made from monovinyl aromatic monomer only, where polymer block $A_2$ has a greater molecular weight than polymer block $A_1$;

X is the residue of a coupling agent;

n is an integer with a value from 2 to 30;

coupled block copolymer molecules of formula [(B/A)-$A_1$]$_n$-X account for from about 20 to about 80 wt. % of the molecular weight distribution of the dual composition block copolymer, as determined by GPC-RI;

uncoupled block copolymer molecules of formula (B/A)-$A_2$ account for from about 20 to about 80 wt. % of the molecular weight distribution of the dual composition block copolymer, as determined by GPC-RI; and uncoupled block copolymer molecules of formula (B/A)-$A_1$ account for from about 0 to about 20 wt. % of the molecular weight distribution of the dual composition block copolymer, as determined by GPC-RI.

Another aspect of the invention provides processes for making novel dual composition block copolymers in a batch reactor, comprising: reacting at least one conjugated diene monomer and one monovinyl aromatic monomer under anionic polymerization conditions, and forming a dual composition block copolymer, comprising two types of block copolymer molecules C and U.

A preferred embodiment of the present invention is a process for producing a novel dual composition block copolymer in a batch reactor, comprising:

adding a hydrocarbon solvent, at least a monovinyl aromatic monomer and at least a conjugated diene monomer to a reactor, in any order;

adding a monofunctional organolithium initiator compound to the reactor and anionically polymerizing the monomer mixture to full conversion, to form a block copolymer anion of formula $D\text{-}(D/A)\text{-}A_1^{(-)}$;

adding to the reactor a coupling agent in a limited amount to couple only a fraction of copolymer anions $D\text{-}(D/A)\text{-}A_1^{(-)}$, thus producing a mixture of uncoupled block copolymer anions $D\text{-}(D/A)\text{-}A_1^{(-)}$ and coupled block copolymer molecules with formula $[D\text{-}(D/A)\text{-}A_1]_n\text{-}X$;

adding a monovinyl aromatic monomer to the reactor and anionically polymerizing this monomer, which adds to the remaining block copolymer anions $D\text{-}(D/A)\text{-}A_1^{(-)}$, thus forming a mixture of chain extended tapered block copolymer anions with formula $D\text{-}(D/A)\text{-}A_2^{(-)}$ and coupled block copolymer molecules with formula $[D\text{-}(D/A)\text{-}A_1]_n\text{-}X$; and adding to the reactor a proton donor compound or an electrophilic monofunctional additive in enough amount as to terminate all the remaining block copolymer anions $D\text{-}(D/A)\text{-}A_2^{(-)}$.

In this way, a dual composition block copolymer comprising two types of block copolymer molecules C and U is produced in-situ in a batch reactor, where:

C is a block copolymer with general formula $[D\text{-}(D/A)\text{-}A_1]_n\text{-}X$;

U is a block copolymer with general formula $D\text{-}(D/A)\text{-}A_2$;

D is a polymer block made from conjugated diene and monovinyl aromatic monomers, with conjugated diene repeating units being in predominant molar amount;

(D/A) is a polymer block that is richer in conjugated diene repeating units towards its end adjacent to D block and that gradually changes its composition until it becomes substantially rich in monovinyl aromatic repeating units towards its opposite end;

$A_1$ and $A_2$ are polymer blocks comprising monovinyl aromatic repeating units only;

polymer block $A_2$ has greater molecular weight than polymer block $A_1$;

X is the residue of a coupling agent;

n is an integer that spans from 2 to about 30, depending on the coupling agent employed; and block copolymer C has greater molecular weight and lower monovinyl aromatic repeating unit content than block copolymer U.

An additional embodiment of the present invention is a process for producing a novel dual composition block copolymer in a batch reactor, comprising: adding hydrocarbon solvent, at least a monovinyl aromatic monomer and at least a conjugated diene monomer to a reactor, in any order; adding monofunctional organolithium initiator compound to the reactor and anionically polymerizing the monomer mixture to full conversion to form a block copolymer anion of formula $D\text{-}(D/A)\text{-}A_1^{(-)}$; adding to the reactor a coupling agent to couple only a fraction of block copolymer anions $D\text{-}(D/A)\text{-}A_1^{(-)}$, thus producing a mixture of block copolymer anions $D\text{-}(D/A)\text{-}A_1^{(-)}$ and coupled tapered block copolymer molecules with formula $[D\text{-}(D/A)\text{-}A_1]_n\text{-}X$; adding a proton donor compound or an electrophilic monofunctional compound to the reactor, in a limited amount to terminate only part of the block copolymer anions, thus producing a mixture of block copolymer anions with formula $D\text{-}(D/A)\text{-}A_1^{(-)}$, coupled block copolymer molecules with formula $[D\text{-}(D/A)\text{-}A_1]_n\text{-}X$, and block copolymers $D\text{-}(D/A)\text{-}A_1$; adding monovinyl aromatic monomer to the reactor and anionically polymerizing this monomer, which adds to the remaining block copolymer anions $D\text{-}(D/A)\text{-}A_1^{(-)}$, thus forming a mixture of chain extended block copolymer anions with formula $D\text{-}(D/A)\text{-}A_2^{(-)}$, coupled block copolymer molecules with formula $[D\text{-}(D/A)\text{-}A_1]_n\text{-}X$ and block copolymer molecules with formula $D\text{-}(D/A)\text{-}A_1$; adding to the reactor a proton donor compound or an electrophilic monofunctional compound, or mixtures thereof, in enough amount as to terminate all the remaining block copolymer anions $D\text{-}(D/A)\text{-}A_2^{(-)}$.

By this way, a dual composition block copolymer comprising two types of block copolymer molecules C and U is produced in-situ in a batch reactor: wherein C is a block copolymer with general formula $[D\text{-}(D/A)\text{-}A_1]_n\text{-}X$, and U is a block copolymer with general formula $D\text{-}(D/A)\text{-}A_2$ and $D\text{-}(D/A)\text{-}A_1$; and wherein, D is a polymer block made from conjugated diene and monovinyl aromatic monomers, with conjugated diene repeating units being in predominant molar amount; and wherein, (D/A) is a polymer block that is richer in conjugated diene repeating units towards its end adjacent to D block and that gradually changes its composition until it is substantially richer in monovinyl aromatic repeating units towards its opposite end; and wherein, $A_1$ and $A_2$ are polymer blocks comprising monovinyl aromatic repeating units only; and wherein polymer block $A_2$ has greater molecular weight than polymer block $A_1$; and wherein X is the residue of a coupling agent; and wherein, n is an integer that spans from 2 to about 30, depending on the coupling agent employed; and wherein, block copolymer C has greater molecular weight and lower monovinyl aromatic repeating unit content than block copolymer U.

Another embodiment of the present invention is a process for producing a novel dual composition block copolymer comprising: adding a hydrocarbon solvent, a randomizer or polar modifier, and at least a conjugated diene monomer to a reactor, in any order; adding a monofunctional organolithium initiator compound to the reactor and anionically polymerizing the conjugated diene monomer to reach a conversion level from about 80% to about 95% to form a polymer anion of formula $B^{(-)}$; adding monovinyl aromatic monomer to the reactor, which initially randomly copolymerizes with the remaining conjugated butadiene monomer, generating a block copolymer anion $B\text{-}(B/A)^{(-)}$ up to a point where conjugated diene gets completely converted, thereafter incorporating only monovinyl aromatic monomer to the block copolymer anions up to full conversion of monovinyl aromatic monomer, thus forming polymer anions of formula $B\text{-}(B/A)\text{-}A_1^{(-)}$; adding to the reactor a coupling agent in a limited amount to couple only a fraction of copolymer anions $B\text{-}(B/A)\text{-}A_1^{(-)}$, thus producing a mixture of block copolymer anions $B\text{-}(B/A)\text{-}A_1^{(-)}$ and coupled block copolymer molecules with formula $[B\text{-}(B/A)\text{-}A_1]_n\text{-}X$; adding a monovinyl aromatic monomer to the reactor and anionically polymerizing this monomer, which adds to the block copolymer anions $B\text{-}(B/A)\text{-}A_1^{(-)}$, thus forming a mixture of monovinyl aromatic chain extended block copolymer anions with formula $B\text{-}(B/A)\text{-}A_2^{(-)}$ and coupled block copolymer molecules with formula $[B\text{-}(B/A)\text{-}A_1]_n\text{-}X$; adding to the reactor a proton donor compound or an electrophilic monofunctional additive in enough amount as to terminate all the remaining block copolymer anions $B\text{-}(B/A)\text{-}A_2^{(-)}$.

In this way, a dual composition block copolymer comprising two types of block copolymer molecules C and U is produced in-situ in a batch reactor: wherein C is a block copolymer with general formula $[B\text{-}(B/A)\text{-}A_1]_n\text{-}X$, and U is a block copolymer with general formula $B\text{-}(B/A)\text{-}A_2$; and wherein, B is a polymer block containing conjugated diene repeating units, only; and wherein, (B/A) is a polymer block containing monovinyl aromatic and conjugated diene repeating units that are randomly arranged along the polymer block; and wherein $A_1$ and $A_2$ are polymer blocks comprising monovinyl aromatic repeating units, only; and wherein, polymer block $A_2$ has greater molecular weight than polymer block $A_1$; and wherein, X is the residue of a coupling agent; and wherein, n is an integer that spans from 2 to about 30, depending on the coupling agent employed; and wherein, block copolymer C has greater molecular weight and lower monovinyl aromatic repeating unit content than block copolymer U.

Another embodiment of the present invention is a process for producing a novel dual composition block copolymer comprising: adding a hydrocarbon solvent, a randomizer or polar modifier, and at least a conjugated diene monomer to a reactor, in any order; adding a monofunctional organolithium initiator compound to the reactor and anionically polymerizing the conjugated diene monomer to reach a conversion level from about 80% to about 95% to form a polymer anion of formula $B^{(-)}$; adding monovinyl aromatic monomer to the reactor, which initially copolymerizes randomly with the remaining conjugated butadiene monomer, generating a block copolymer anion $B-(B/A)^{(-)}$ up to a point where conjugated diene gets completely converted, thereafter adding only monovinyl aromatic monomer to the block copolymer anions up to full conversion of monovinyl aromatic monomer, thus forming polymer anions of formula $B-(B/A)-A_1^{(-)}$; adding to the reactor a coupling agent in a limited amount to couple only a fraction of copolymer anions $B-(B/A)-A_1^{(-)}$, thus producing a mixture of block copolymer anions $B-(B/A)-A_1^{(-)}$ and coupled block copolymer molecules with formula $[B-(B/A)-A_1]_n-X$; adding a proton donor compound or an electrophilic monofunctional compound to the reactor, in a limited amount to terminate only part of the block copolymer anions, thus producing a mixture of block copolymer anions with formula $B-(B/A)-A_1^{(-)}$, coupled block copolymer molecules with formula $[B-(B/A)-A_1]_n-X$, and block copolymers with formula $B-(B/A)-A_1$; adding a monovinyl aromatic monomer to the reactor and anionically polymerizing this monomer, which adds to the block copolymer anions $B-(B/A)-A_1^{(-)}$, thus forming a mixture of chain extended block copolymer anions with formula $B-(B/A)-A_2^{(-)}$, coupled block copolymer molecules with formula $[B-(B/A)-A_1]_n-X$ and block copolymer molecules with formula $B-(B/A)-A_1$; adding to the reactor a proton donor compound or an electrophilic monofunctional additive in enough amount as to terminate all the remaining block copolymer anions $B-(B/A)-A_2^{(-)}$.

In this way, a dual composition block copolymer comprising two types of block copolymer molecules C and U is produced in-situ in a batch reactor: wherein C is a block copolymer with general formula $[B-(B/A)-A_1]_n-X$, and U is a block copolymer with general formula: $B-(B/A)-A_2$ and $B-(B/A)-A_1$; and wherein, B is a polymer block containing conjugated diene repeating units, only; and wherein, (B/A) is a polymer block containing monovinyl aromatic and conjugated diene repeating units randomly arranged along the polymer block; and wherein, $A_1$ and $A_2$ are polymer blocks comprising monovinyl aromatic repeating units, only; and wherein, polymer block $A_2$ has greater molecular weight than polymer block $A_1$; and wherein, X is the residue of a coupling agent; and wherein, n is an integer that spans from 2 to about 30, depending on the coupling agent employed; and wherein, block copolymer C has greater molecular weight and lower monovinyl aromatic repeating unit content than block copolymer U.

Another embodiment of the present invention is a process for producing a novel dual composition block copolymer comprising: adding a hydrocarbon solvent, a randomizer or polar modifier, at least a monovinyl aromatic monomer and at least a conjugated diene monomer to a reactor, in any order; adding a monofunctional organolithium initiator compound to the reactor and anionically copolymerizing the monovinyl aromatic and conjugated diene monomers to full conversion to form a random copolymer anion of formula $(B/A)^{(-)}$; adding monovinyl aromatic monomer to the reactor and anionically polymerizing this monomer, which adds to the random copolymer anions $(B/A)^{(-)}$, thus forming block copolymer anions of formula $(B/A)-A_1^{(-)}$; adding to the reactor a coupling agent in a limited amount to couple only a fraction of block copolymer anions $(B/A)-A_1^{(-)}$, thus producing a mixture of block copolymer anions $(B/A)-A_1^{(-)}$ and coupled block copolymer molecules with formula $[(B/A)-A_1]_n-X$; adding a monovinyl aromatic monomer to the reactor and anionically polymerizing this monomer, which adds to the block copolymer anions $(B/A)-A_1^{(-)}$, thus forming a mixture of chain extended block copolymer anions with formula $(B/A)-A_2^{(-)}$ and coupled block copolymer molecules with formula $[(B/A)-A_1]_n-X$; adding to the reactor a proton donor compound or an electrophilic monofunctional additive in enough amount as to terminate all the remaining block copolymer anions $(B/A)-A_2^{(-)}$.

In this way, a dual composition block copolymer comprising two types of block copolymer molecules C and U is produced in-situ in a batch reactor: wherein C is a block copolymer with general formula $[(B/A)-A_1]_n-X$, and U is a block copolymer with general formula $(B/A)-A_2$; and wherein, (B/A) is a polymer block containing randomized monovinyl aromatic and conjugated diene repeating units; and wherein, $A_1$ and $A_2$ are polymer blocks comprising monovinyl aromatic repeating units only; and wherein, polymer block $A_2$ has greater molecular weight than polymer block $A_1$; and wherein, X is the residue of a coupling agent; and wherein, n is an integer that spans from 2 to about 30, depending on the coupling agent employed; and wherein, block copolymer C has greater molecular weight and lower monovinyl aromatic repeating unit content than block copolymer U.

Another embodiment of the present invention is a process for producing a novel dual composition block copolymer comprising: adding a hydrocarbon solvent, a randomizer or polar modifier, at least a monovinyl aromatic monomer, and at least a conjugated diene monomer to a reactor, in any order; adding a monofunctional organolithium initiator compound to the reactor and anionically copolymerizing the monovinyl aromatic and conjugated diene monomers to full conversion to form random copolymer anions of formula $(B/A)^{(-)}$; adding monovinyl aromatic monomer to the reactor and anionically polymerizing this monomer, which adds to the random copolymer anions $(B/A)^{(-)}$, thus forming block copolymer anions of formula $(B/A)-A_1^{(-)}$; adding to the reactor a coupling agent in a limited amount to couple only a fraction of the block copolymer anions $(B/A)-A_1^{(-)}$, thus producing a mixture of block copolymer anions $(B/A)-A_1^{(-)}$ and coupled block copolymer molecules with formula $[(B/A)-A_1]_n-X$; adding a proton donor compound or an electrophilic monofunctional compound to the reactor, in a limited amount to terminate only part of the block copolymer anions, thus producing a mixture of block copolymer anions with formula $(B/A)-A_1^{(-)}$, coupled block copolymer molecules with formula $[(B/A)-A_1]_n-X$, and block copolymers with formula $(B/A)-A_1$; adding monovinyl aromatic monomer to the reactor and anionically polymerizing this monomer, which adds to the remaining block copolymer anions $(B/A)-A_1^{(-)}$, thus forming a mixture of chain extended block copolymer anions with formula $(B/A)-A_2^{(-)}$, coupled block copolymer molecules with formula $[(B/A)-A_1]_n-X$ and block copolymer molecules with formula $(B/A)-$ $A_1$; adding to the reactor a proton donor compound or an electrophilic monofunctional compound, or mixtures thereof, in enough amount as to terminate all the remaining block copolymer anions $(B/A)-A_2^{(-)}$.

By this way, a dual composition block copolymer comprising two types of block copolymer molecules C and U is produced in-situ in a batch reactor: wherein C is a block copolymer with general formula $[(B/A)-A_1]_n-X$, and U is a block copolymer with general formula $(B/A)-A_2$ and $(B/A)-A_1$; and wherein, $(B/A)$ is a random copolymer block containing monovinyl aromatic and conjugated diene repeating units; and wherein, $A_1$ and $A_2$ are polymer blocks comprising only monovinyl aromatic repeating units; and wherein, polymer block $A_2$ has greater molecular weight than polymer block $A_1$; and wherein, X is the residue of a coupling agent; and wherein, n is an integer that spans from 2 to about 30, depending on the coupling agent employed; and wherein, block copolymer C has greater molecular weight and lower monovinyl aromatic repeating unit content than block copolymer U.

Another embodiment of the present invention is a process for producing a novel dual composition block copolymer comprising: adding a hydrocarbon solvent, a randomizer or polar modifier, and at least a conjugated diene monomer to a reactor, in any order; adding a monofunctional organolithium initiator compound to the reactor and anionically polymerizing the conjugated diene monomer to full conversion to form a polymer anion of formula $B^{(-)}$; adding monovinyl aromatic monomer to the reactor and anionically polymerizing this monomer, which adds to the polymer anions $B^{(-)}$, thus forming a block copolymer anions of formula $B-A_1^{(-)}$; adding to the reactor a coupling agent in a limited amount to couple only a fraction of copolymer anions $B-A_1^{(-)}$, thus producing a mixture of block copolymer anions $B-A_1^{(-)}$ and coupled block copolymer molecules with formula $[B-A_1]_n-X$; adding a monovinyl aromatic monomer to the reactor and anionically polymerizing this monomer, which adds to the block copolymer anions $B-A_1^{(-)}$, thus forming a mixture of chain extended block copolymer anions with formula $B-A_2^{(-)}$ and coupled block copolymer molecules with formula $[B-A_1]_n-X$; adding to the reactor a proton donor compound or an electrophilic monofunctional additive in enough amount as to terminate all the remaining block copolymer anions $B-A_2^{(-)}$.

In this way, a dual composition block copolymer comprising two types of block copolymer molecules C and U is produced in-situ in a batch reactor: wherein C is a block copolymer with general formula $[B-A_1]_n-X$, and U is a block copolymer with general formula $B-A_2$; and wherein B is a polymer block containing conjugated diene repeating units, only; and wherein $A_1$ and $A_2$ are polymer blocks rich in monovinyl aromatic repeating units; and wherein, polymer block $A_2$ has greater molecular weight than polymer block $A_1$; and wherein, X is the residue of a coupling agent; and wherein, n is an integer that spans from 2 to about 30, depending on the coupling agent employed; and wherein block copolymer C has greater molecular weight and lower monovinyl aromatic repeating unit content than block copolymer U.

Another embodiment of the present invention is a process for producing a novel dual composition block copolymer comprising: adding a hydrocarbon solvent, a randomizer or polar modifier, and at least a conjugated diene monomer to a reactor, in any order; adding a monofunctional organolithium initiator compound to the reactor and anionically polymerizing the conjugated diene monomer to full conversion to form a polymer anion of formula $B^{(-)}$; adding monovinyl aromatic monomer to the reactor and anionically polymerizing this monomer, which adds to the polymer anions $B^{(-)}$, thus forming block copolymer anions of formula $B-A_1^{(-)}$; adding to the reactor a coupling agent in a limited amount to couple only a fraction of copolymer anions $B-A_1^{(-)}$, thus producing a mixture of block copolymer anions $B-A_1^{(-)}$ and coupled block copolymer molecules with formula $[B-A_1]_n-X$; adding a proton donor compound or an electrophilic monofunctional compound to the reactor, in a limited amount to terminate only part of the block copolymer anions, thus producing a mixture of block copolymer anions with formula $B-A_1^{(-)}$, coupled block copolymer molecules with formula $[B-A_1]_n-X$, and block copolymers with formula $B-A_1$; adding monovinyl aromatic monomer to the reactor and anionically polymerizing this monomer, which adds to the remaining block copolymer anions $B-A_1^{(-)}$, thus forming a mixture of chain extended block copolymer anions with formula $B-A_2^{(-)}$, coupled block copolymer molecules with formula $[B-A_1]_n-X$ and block copolymer molecules with formula $B-A_1$; adding to the reactor a proton donor compound or an electrophilic monofunctional compound, or mixtures thereof, in enough amount as to terminate all the remaining block copolymer anions $B-A_2^{(-)}$.

By this way, a dual composition block copolymer comprising two types of block copolymer molecules C and U is produced in-situ in a batch reactor: wherein C is a block copolymer with general formula $[B-A_1]_n-X$, and U is a block copolymer with general formula $B-A_2$ and $B-A_1$; and wherein, B is a polymer block containing conjugated diene repeating units, only; and wherein, $A_1$ and $A_2$ are polymer blocks rich in monovinyl aromatic repeating units; and wherein, polymer block $A_2$ has greater molecular weight than polymer block $A_1$; and wherein, X is the residue of a coupling agent; and wherein, n is an integer that spans from 2 to about 30, depending on the coupling agent employed; and wherein, block copolymer C has greater molecular weight and lower monovinyl aromatic repeating unit content than block copolymer U.

In some embodiments of the processes to obtain the dual composition block copolymers of the invention, proton donors and/or monofunctional electrophilic terminating agents are fed to partially deactivate block copolymer anions before block copolymerization of a last charge of monovinyl aromatic monomer. Such terminating agents can be added to the reactor before the last charge of monovinyl aromatic monomer or simultaneously to the last charge of monovinyl aromatic monomer. Examples of such terminating agents are water, polymerization inhibitors as tert-butil catechol, phenolic antioxidants, alcohols, organic acids, inorganic acids, chlorotrimethylsilane, and the like.

Block copolymerization is typically carried out in inert hydrocarbon solvents under inert atmosphere with highly purified reagents to prevent the premature termination of the polymerization reaction. Suitable solvents to practice this invention include, but are not limited to, pentane, hexane, heptane, octane, decane, cyclopentane, cyclohexane, cycloheptane, methylcyclohexane, methylcycloheptane, benzene, naphthalene, toluene, ethylbenzene, o-xylene, m-xylene, p-xylene, n-propylbenzene, isopropylbenzene, n-butylbenzene, and the like or mixtures thereof. Cyclohexane is a preferred solvent for this present invention.

In some of the embodiments, randomizers, also known as polar modifiers, are employed to promote random copolymerization of monovinyl aromatic and conjugated diene monomers to form (B/A) random polymer blocks as well as to accelerate addition of monovinyl aromatic monomers to polymer anions ending in conjugated dienyl lithium units. Randomizers also raise 1,2 and 3,4-addition of conjugated dienes anionically polymerized. Nevertheless, 1,2-vinyl and 3,4-vinyl added conjugated diene repeating units are more reactive towards crosslinking/vulcanizing reactions. Therefore, an optimal amount of polar modifier compound should be selected to balance the rate of copolymerization in the process to make the dual composition block copolymer of the invention and the crosslinking kinetics of the microcellular rubber compound of the invention. Acceleration of block polymerization kinetics and enrichment of 1,2-vinyl and 3,4-vinyl addition during conjugated diene polymerization varies depending on the polar modifier selected, a behavior that is well known by the skilled in the art. Polar modifiers that may be used to produce the dual composition block copolymer of the present invention include Lewis bases such as ethers, tertiary amines, aminoethers and group IA alkali metal alkoxides, and combinations thereof. Specific examples of these suitable ether polar modifiers include, but are not limited to, monofunctional, multifunctional and oligomeric alkyl and cyclic ethers, such as dimethyl ether, diethyl ether, ethyl methyl ether, ethyl propyl ether, di-n-propyl ether, methyl tert-butyl ether, tetramethylene oxide (tetrahydrofuran), 1,2-dimethoxyethane, bis-tetrahydrofuran, ditetrahydrofurylpropane (DTHFP), ethyl tetrahydrofurfuryl ether. Specific examples of suitable tertiary amine polar modifiers include, but are not limited to, monofunctional, multifunctional or oligomeric alkyl and cyclic tertiary amines such as dimethylethyl amine, trimethyl amine, triethylamine, N,N,N',N'-tetramethyl ethylene diamine (TMEDA), N,N,N',N'',N'''-Pentamethyldiethylenetriamine, 1,3,5-trimethylhexahydro-1,3,5-triazine, combinations thereof, and the like. Specific examples of these suitable aminoether polar modifiers include, but are not limited to, tetrahydrofurfuryl-N,N-dimethylamine, bis(2-(Dimethylamino)ethyl) ether, 2,2-dimorpholinoethyl ether, and the like, and mixtures thereof. Specific examples of these suitable Group IA alkali metal alkoxides (lithium, sodium, potassium, rubidium and cesium salts) include, but are not limited to, monofunctional, multifunctional and oligomeric alkyl and cyclic metal alkoxides such as sodium tert-butoxide, sodium tert-amylate, sodium mentholate, potassium tert-butoxide, potassium tert-amylate, potassium mentholate, potassium 3,7-dimethyl-3-octanolate and the like, and mixtures thereof. Polar modifiers can be loaded directly to the reactor or can be previously dissolved in the solvent for use in the process. Polar modifier concentration in the reaction system of the invention is from 5 to 5000 parts per million weight parts of solvent, more preferably from 10 to 1000 parts per million weight parts of solvent, most preferably from 20 to 100 parts per million weight parts of solvent.

Suitable conjugated diene monomers for use in making the dual composition block copolymers of the present invention include, but are not limited to, 1,3-butadiene, isoprene, 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene, and combinations thereof.

Suitable monovinyl aromatic monomers for use in making the dual composition block copolymers of the present invention include, but are not limited to, styrene, 3-methylstyrene, α-methyl styrene, p-methyl styrene, α,4-dimethyl styrene, t-butyl styrene, o-chlorostyrene, 2-butenyl naphthalene, 4-t-butoxystyrene, 3-isopropenyl biphenyl, 4-vinylpyridine, 2-vinylpyridine, isopropenyl naphthalene, 4-n-propylstyrene, and combinations thereof.

The dual composition block copolymer of the invention is prepared by anionic polymerization by contacting anionically polymerizable monomers with a monofunctional organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Many anionic polymerization initiators are well known and commercially available. Monofunctional organolithium compounds, such as butyllithium, are examples of commonly used initiators. Specific examples of these initiators include methyllithium, ethyllithium, tert-butyllithium, sec-butyllithium, n-butyllithium, n-decyllithium, isopropyllithium, eicosyllithium, cycloalkyllithium compounds, such as cyclohexyllithium, and aryllithium compounds, such as phenyllithium, naphthllithium, p-toluyllithium, 1,1-diphenylhexyllithium, and the like. Monofunctional organolithium compounds substituted with protected polar functional groups may also be used as initiators for anionic polymerization.

In the embodiments related to the process for making the dual block copolymer of the present invention, the amount of monofunctional organolithium initiator varies depending upon the desired viscosity of the dual composition block copolymer and the purity levels of the solvent and monomers employed in the process for making it. Preferably, the amount of monofunctional organolithium initiator in the process of making the dual composition block copolymer of the invention is from about 2 millimoles to about 30 millimoles per kilogram of total conjugated diene monomer plus monovinyl aromatic monomer loaded to the reactor, more preferably from about 12 millimoles to about 26 millimoles per kilogram of total conjugated diene monomer plus monovinyl aromatic monomer loaded to the reactor, most preferably from about 16 millimoles to about 22 millimoles per kilogram of total conjugated diene monomer plus monovinyl aromatic monomer loaded to the reactor.

The anionic polymerization is normally carried out at temperatures in the range from −100° C. to 150° C., preferably between 25° C. and 120° C. Normally 50 to 90% by weight of a reaction solvent is used to control the viscosity inside the reaction zone, preferably 70 to 85%. Typical residence times for anionic polymerization vary depending on the reaction temperature, monomer concentration and initiator level between 0.1 and 5 hours, preferable from 0.2 to 1 hour.

In the embodiments of the processes provided by the present invention, the anionically polymerized block copolymer anions undergo partial coupling. Partial coupling means that a portion of the total living anionically polymerized polymer chain-ends undergo coupling with coupling agents. Reaction of living anionically polymerized block copolymer chain-ends with suitable coupling agents render coupled block copolymers without anionic active centers for further polymerization. The coupling agents desirably couple between 2 and 30 anionically polymerized polymer chains, although coupling agents capable of coupling a greater number of chains may also be employed. Suitable coupling agents for use in the partial coupling step include, but are not limited to, epoxidized soybean oil, silicon halides, functionalized silicon compound such as a silane compound and functionalized oligomeric compounds such as the ones listed in U.S. Pat. No. 7,517,934. The entire disclosure of U.S. Pat. No. 7,517,934 is incorporated herein by reference. Silicon tetrachloride, methyl silicon trichloride and dimethyl silicon dichloride are specific examples of suitable coupling agents, with silicon tetrachloride being particularly well-suited for this application. The partial coupling is achieved by controlling the stoichiometric ratio of coupling agent to living polymer. The partial coupling provides a block copolymer blend with desired properties.

At the completion of the polymerization reaction the total reaction mixture is then treated to terminate block copolymer anions and recover the dual composition block copolymer of the present invention. This termination is accomplished by feeding to the reactor a proton donor compound, such as water, an alcohol, or an organic or inorganic acid. The amount of terminating agent to be added needs to be at least in a stoichiometric amount respective to the amount of block copolymer anions remaining in the reactor.

A further step in all the embodiments of the process of making the dual composition block copolymer of the present invention is that it is desirable to add an antioxidant system while the dual composition block copolymer is still in hydrocarbon solution. The antioxidant system protects the dual composition block copolymer from degradation during later processing steps to isolate it from solvent and to prolong the shelf life of the final product. A wide variety of antioxidant systems are well known in the art, and any system can be used without limiting the scope of the present invention. Preferred antioxidant systems consist of a synergistic blend of hindered phenolic and phosphite type antioxidants. Examples of suitable hindered phenolic type antioxidants include, but are not limited to, octadecyl 3-(3,5-di-tert-butyl-4-hydroxyphenyl) propionate, 1,3,5-trimethyl-2,4,6-tris(3,5-di-tert-butyl-4-hydroxylbenzyl)benzene, pentaerythritol tetrakis(3-(3,5-di-tert-butyl-4-hydroxypheyl) propionate, 2,4-bis(octylmercapto)-6-(4-hydroxy-3,5-di-tert-butylanilino)-1,3,5-triazine, 2,4-bis(octylthiomethyl)-6-methylphenol, 2,4-bis(dodecylthiomethyl)-6-methylphenol, 2-(1-(2-hydroxy-3,5-di-tert-pentylphenyl)ethyl)-4,6-di-tert-pentylphenyl acrylate, alpha-tocopherol, and the like, and mixtures thereof. Examples of suitable phospite type antioxidants include, but are not limited to, tris(nonylphenyl) phosphite, tris(2,4-ditert-butylphenyl) phosphite, butylidenebis[2-tert-butyl-5-methyl-p-phenylene]-P,P,P',P'-tetratridecylbis(phosphine), 3,9-Bis(2,4-di-tert-butylphenoxy)-2,4,8,10-tetraoxa-3,9-diphosphaspiro[5.5]undecane, mixed 2,4-bis(1,1-dimethylpropyl)phenyl and 4-(1,1-dimethylpropyl) phenyl triesters of phosphorous acid, 3,9-Bis(octadecyloxy)-2,4,8,10-tetraoxa-3,9-diphosphaspiro[5.5]undecane, 3,9-Bis (isodecyloxy)-2,4,8,10-tetraoxa-3,9-diphosphaspiro[5.5] undecane, 2-(1,1-Dimethylethyl)-6-methyl-4-[3-[[2,4,8,10-tetrakis(1,1-dimethylethyl)dibenzo[d,f][1,3,2] dioxaphosphepin-6-yl]oxy]propyl]phenol, and the like, and mixtures thereof. Preferred antioxidant system dosage is from 0.1 to 1.5 part per hundred weight parts of dual composition block copolymer of the present invention.

An additional step in all the embodiments of the process of making the dual composition block copolymer of the invention, is to isolate the dual composition block copolymer from the solvent by any of the finishing process well known in the art, such as roll milling, vacuum assisted devolatilization, precipitation and drying, steam stripping followed by dewatering and drying, and the like.

An optional step in all the embodiments of the process of making the dual composition block copolymer of the invention is to incorporate extender oil to the dual composition block copolymer. Oil can be added while the dual composition block copolymer is still in hydrocarbon solvent solution, or afterwards at any stage of its finishing process. Suitable oils to perform oil extension include, but are not limited to: mineral oil, paraffinic oil, naphthenic oils, relatively naphthenic oil, relatively aromatic oil, aromatic oil, highly aromatic oil, extremely high aromatic oil and the like, or mixtures of thereof. Preferred oil content is from 0 to 12 parts per hundred weight parts of the dual composition block copolymer, more preferably from 0 to 10 parts per hundred weight parts of the dual composition block copolymer, and most preferably from 0 to 8 parts per hundred weight parts of the dual composition block copolymer.

Another aspect of the invention provides compositions to produce crosslinked microcellular rubber compounds, comprising:
  a dual composition block copolymer;
  a blowing agent, or mixture of blowing agents; and
  a crosslinking agent or a mixture of crosslinking agents.

Optionally, the composition includes other additives, such as styrene-butadiene random copolymers, styrene-isoprene-butadiene random copolymers, natural rubbers, polybutadienes, polyisoprene rubbers, ethylene/α-olefin/non-conjugated diene terpolymers, ethylene-propylene copolymers, ethylene-vinyl acetate copolymers, ground crosslinked microcellular rubber compounds, fillers, plasticizers, blowing agent activators, crosslinking agent activators, crosslinking accelerators, vulcanization retarders, antioxidants, antiozonants, UV stabilizers, light stabilizers, fragrances or odorants, anti-termite agents, antimicrobials, metal deactivators, dyes, pigments, mold release agents, and the like, or mixtures thereof.

A preferred embodiment of the present invention is a composition to produce crosslinked microcellular compound, comprising:
  (1) a dual composition block copolymer, comprising: two types of block copolymer molecules C and U, where:
    C is a block copolymer with general formula $[D\text{-}(D/A)\text{-}A_1]_n\text{-}X$ and U is a block copolymer with general formula $D\text{-}(D/A)\text{-}A_2$ or $D\text{-}(D/A)\text{-}A_2$ and $D\text{-}(D/A)\text{-}A_1$,
    D is a polymer block made from at least a conjugated diene monomer and at least a monovinyl aromatic monomer, whose conjugated diene repeating units are in greater molar amount than its monovinyl aromatic repeating units along the whole polymer block length,
    (D/A) is a polymer block made from at least a conjugated diene monomer and at least a monovinyl aromatic monomer, with the polymer block end opposite to $A_1$ or $A_2$ predominantly composed of conjugated diene repeating units and that gradually changes its composition along its length until it becomes substantially composed of monovinyl aromatic repeating units towards its end adjacent to $A_1$ or $A_2$,
    $A_1$ and $A_2$ are polymer blocks made from monovinyl aromatic monomer only, polymer block $A_2$ has greater molecular weight than polymer block $A_1$,
    X is the residue of a coupling agent,
    n is an integer with a value from 2 to 30, and
    the amount of dual composition block copolymer is from 50 to 100 parts per hundred weight parts of polymeric raw materials comprised in the formulation to produce the crosslinked microcellular rubber compound;
  (2) a blowing agent, or a mixture of chemical blowing agents, in an amount from 1 to 10 parts per hundred weight parts of polymeric raw materials included in the formulation to produce the crosslinked microcellular rubber compound; and
  (3) a crosslinking agent, or a mixture of crosslinking agents, in an amount from 0.5 to 5 parts per hundred weight parts of polymeric raw materials included in the formulation to produce the crosslinked microcellular rubber compound.

The composition may include one or more optional additives, such as:
- other polymers, including styrene-butadiene random copolymers, styrene-isoprene-butadiene random copolymers, natural rubbers, polybutadienes, polyisoprene rubbers, ethylene/α-olefin/non-conjugated diene terpolymers, ethylene-propylene copolymers, ethylene-vinyl acetate copolymers, or any mixture thereof, where such polymers preferably comprise from 0 to about 50 parts per hundred weight parts of polymeric raw materials in the formulation to produce the crosslinked microcellular rubber compound;
- a filler or a mixture of fillers or rubber vulcanized compound powder, preferably in an amount from 0 to about 200 parts per hundred weight parts of polymeric raw materials comprised in the formulation to produce the crosslinked microcellular rubber compound;
- a plasticizer or a mixture of plasticizers in an amount from 0 to 40 parts per hundred weight parts of polymeric raw materials comprised in the formulation to produce the crosslinked microcellular rubber compound;
- an antioxidant or a mixture of antioxidants, preferably in an amount of from 0 to 2 parts per hundred weight parts of polymeric raw materials included in the formulation to produce the crosslinked microcellular rubber compound;
- a blowing agent activator or a mixture of chemical blowing agent accelerators, preferably in an amount from 0 to about 5 parts per hundred weight parts of polymeric raw materials included in the formulation to produce the crosslinked microcellular rubber compound;
- a crosslinking agent activator or a mixture of crosslinking agent activators, preferably in an amount from 0 to 5 parts per hundred weight parts of polymeric raw materials included in the formulation to produce the crosslinked microcellular rubber compound;
- a crosslinking accelerator or a mixture of crosslinking accelerators, preferably in an amount from 0 to 5 parts per hundred weight parts of polymeric raw materials included in the formulation to produce the crosslinked microcellular rubber compound; and
- other additives such as vulcanization retarders, antiozonant, UV stabilizers, light stabilizers, fragrances or odorants, anti-termite agents, antimicrobials, metal deactivators, dyes, pigments, mold release agents, and the like and mixtures thereof.

Another embodiment of the present invention is a composition for making a crosslinked microcellular compound, comprising:
(1) a dual composition block copolymer, comprising two types of block copolymer molecules C and U, where block copolymer C has the general formula $[B\text{-}(B/A)\text{-}A_1]_n\text{-}X$ and block copolymer U has the general formula $B\text{-}(B/A)\text{-}A_2$ or $B\text{-}(B/A)\text{-}A_2$ and $B\text{-}(B/A)\text{-}A_1$, where B is a polymer block made from one or more conjugated diene monomers only, where (B/A) is a polymer block made from at least a conjugated diene monomer and at least a monovinyl aromatic monomer, where conjugated diene and monovinyl aromatic repeating units are randomly arranged along the polymer block, where $A_1$ and $A_2$ are polymer blocks made from monovinyl aromatic monomer only, where polymer block $A_2$ has greater molecular weight than polymer block A1, where X is the residue of a coupling agent, where n is an integer with a value from 2 to 30, where the amount of dual composition block copolymer is from 50 to 100 parts per hundred weight parts of polymeric raw materials comprised in the formulation to produce the crosslinked microcellular rubber compound;
(2) a blowing agent or a mixture of chemical blowing agents, preferably in an amount from 1 to 10 parts per hundred weight parts of polymeric raw materials comprised in the formulation to produce the crosslinked microcellular rubber compound; and
(3) a crosslinking agent or a mixture of crosslinking agents, preferably in an amount from 0.5 to 5 parts per hundred weight parts of polymeric raw materials comprised in the formulation to produce the crosslinked microcellular rubber compound.

The composition may include one or more optional additives, such as:
- other polymers, including styrene-butadiene random copolymers, styrene-isoprene-butadiene random copolymers, natural rubbers, polybutadienes, polyisoprene rubbers, ethylene/α-olefin/non-conjugated diene terpolymers, ethylene-propylene copolymers, ethylene-vinyl acetate copolymers, or any mixture thereof, where such polymers preferably comprise from 0 to about 50 parts per hundred weight parts of polymeric raw materials in the formulation to produce the crosslinked microcellular rubber compound;
- a filler or a mixture of fillers or rubber vulcanized compound powder, preferably in an amount from 0 to about 200 parts per hundred weight parts of polymeric raw materials comprised in the formulation to produce the crosslinked microcellular rubber compound;
- a plasticizer or a mixture of plasticizers in an amount from 0 to 40 parts per hundred weight parts of polymeric raw materials comprised in the formulation to produce the crosslinked microcellular rubber compound;
- an antioxidant or a mixture of antioxidants, preferably in an amount of from 0 to 2 parts per hundred weight parts of polymeric raw materials included in the formulation to produce the crosslinked microcellular rubber compound;
- a blowing agent activator or a mixture of chemical blowing agent accelerators, preferably in an amount from 0 to about 5 parts per hundred weight parts of polymeric raw materials included in the formulation to produce the crosslinked microcellular rubber compound;
- a crosslinking agent activator or a mixture of crosslinking agent activators, preferably in an amount from 0 to 5 parts per hundred weight parts of polymeric raw materials included in the formulation to produce the crosslinked microcellular rubber compound;
- a crosslinking accelerator or a mixture of crosslinking accelerators, preferably in an amount from 0 to 5 parts per hundred weight parts of polymeric raw materials included in the formulation to produce the crosslinked microcellular rubber compound; and
- other additives such as vulcanization retarders, antiozonant, UV stabilizers, light stabilizers, fragrances or odorants, anti-termite agents, antimicrobials, metal deactivators, dyes, pigments, mold release agents, and the like and mixtures thereof.

Another embodiment of the present invention is a composition to produce crosslinked microcellular compound, comprising:
(1) a dual composition block copolymer, comprising two types of block copolymer molecules C and U, where: block copolymer C has the general formula $[B\text{-}A_1]_n\text{-}X$ and block copolymer U has the general formula $B\text{-}A_2$ or B-A$_2$ and B-A$_1$; B is a polymer block made from one or more conjugated diene monomers; A$_1$ and A$_2$ are polymer blocks made from monovinyl aromatic monomer; polymer block A$_2$ has greater molecular weight than polymer block A$_1$; X is the residue of a coupling agent; and n is an integer with a value from 2 to 30, preferably where the amount of dual composition block copolymer is from 50 to 100 parts per hundred weight parts of polymeric raw materials in the formulation to produce the crosslinked microcellular rubber compound;

(2) a blowing agent or a mixture of chemical blowing agents, preferably in an amount from 1 to 10 parts per hundred weight parts of polymeric raw materials in the formulation; and (3) a crosslinking agent or a mixture of crosslinking agents, preferably in an amount from 0.5 to 5 parts per hundred weight parts of polymeric raw materials in the formulation.

Other polymers can be added to the formulation, such as: as styrene-butadiene random copolymers, styrene-isoprene-butadiene random copolymers, natural rubbers, polybutadienes, polyisoprene rubbers, ethylene/α-olefin/non-conjugated diene terpolymers, ethylene-propylene copolymers, ethylene-vinyl acetate copolymers, and any mixture thereof, preferably where such polymers comprise from 0 to about 50 parts per hundred weight parts of polymeric raw materials in the formulation to produce the crosslinked microcellular rubber compound.

Optional additions to the polymeric raw materials in the formulation to produce the crosslinked microcellular rubber compound include:

a filler or a mixture of fillers or rubber vulcanized compound powder, preferably in an amount from 0 to about 200 parts per hundred weight;

a plasticizer or a mixture of plasticizers, preferably in an amount from 0 to 40 parts per hundred weight;

an antioxidant or a mixture of antioxidants, preferably in an amount from 0 to 2 parts per hundred weight;

a blowing agent activator and/or a mixture of chemical blowing agent accelerators, preferably in an amount from 0 to about 5 parts per hundred weight;

a crosslinking agent activator or a mixture of crosslinking agent activators, preferably in an amount from 0 to 5 parts per hundred weight;

a crosslinking accelerator or a mixture of crosslinking accelerators, preferably in an amount from 0 to 5 parts per hundred weight; and other additives such as vulcanization retarders, antiozonant, UV stabilizers, light stabilizers, fragrances or odorants, anti-termite agents, antimicrobials, metal deactivators, dyes, pigments, mold release agents, and the like, and mixtures thereof.

Another embodiment of the present invention is a composition to produce a crosslinked microcellular compound, comprising: a dual composition block copolymer; blowing agent; and a crosslinking agent. The dual composition block copolymer comprises block copolymer molecules C and U, where:

block copolymer C has the general formula [(B/A)-A$_1$]$_n$-X and block copolymer U has the general formula (B/A)-A$_2$ or (B/A)-A$_2$ and (B/A)-A$_1$;

(B/A) is a polymer block made from at least a conjugated diene monomer and at least a monovinyl aromatic monomer, preferably where conjugated diene and monovinyl aromatic repeating units are randomly arranged along the polymer block;

A$_1$ and A$_2$ are polymer blocks made from monovinyl aromatic monomer only, where polymer block A$_2$ has a greater molecular weight than polymer block A$_1$;

X is the residue of a coupling agent; and n is an integer with a value from 2 to 30, preferably where the amount of dual composition block copolymer is from 50 to 100 parts per hundred weight parts of polymeric raw materials comprised in the formulation to produce the crosslinked microcellular rubber compound. The blowing agent is preferably added in an amount from 1 to 10 parts per hundred weight, and the crosslinking agent is preferably added in an amount from 0.5 to 5 parts per hundred weight.

Optionally ingredients in the formulation in parts per hundred weight of polymeric raw materials in the formulation to produce the crosslinked microcellular rubber compound include:

other polymers such as styrene-butadiene random copolymers, styrene-isoprene-butadiene random copolymers, natural rubbers, polybutadienes, polyisoprene rubbers, ethylene/α-olefin/non-conjugated diene terpolymers, ethylene-propylene copolymers, ethylene-vinyl acetate copolymers, and any mixture thereof, preferably in an amount of from 0 to about 50;

a filler, a mixture of fillers, or rubber vulcanized compound powder, preferably in an amount from 0 to about 200 parts;

a plasticizer or a mixture of plasticizers, preferably in an amount from 0 to 40 parts;

an antioxidant or a mixture of antioxidants, preferably in an amount from 0 to 2 parts;

a blowing agent activator or a mixture of chemical blowing agent accelerators, preferably in an amount from 0 to about 5 parts;

a crosslinking agent activator or a mixture of crosslinking agent activators, preferably in an amount from 0 to 5 parts per hundred weight parts;

a crosslinking accelerator or a mixture of crosslinking accelerators, preferably in an amount from 0 to 5 parts; and other additives such as vulcanization retarders; antiozonants; UV stabilizers; light stabilizers; fragrances or odorants; anti-termite agents; biocide agents; antifungal agents; antimicrobial agents; antibacterial agents; metal deactivators; dyes; pigments; mold release agents, and the like, and mixtures thereof.

Suitable fillers for use in crosslinked microcellular rubber foam composition of the present invention include, but are not limited to, carbon black, silica, calcium silicate, aluminum silicate, magnesium silicate, sodium silicate, potassium silicate, chalk, dolomite, kaolin clay, calcined clay, hard clay, activated clay, halloysite, sericite, wollastonite, bentonite, light calcium carbonate, heavy calcium carbonate, magnesium carbonate, talc, diatomaceous earth, titanium oxide, zinc oxide, calcium oxide, aluminum hydroxide, magnesium hydroxide, gypsum, mica, barium sulfate, calcium sulfate, alumina trihydrate, natural fibers, synthetic fibers, and combinations thereof.

Suitable plasticizers for use in crosslinked microcellular rubber foam composition of the present invention include, but are not limited to, mineral oils, such as paraffinic oil, naphthenic oil, relatively naphthenic oil, relatively aromatic oil, aromatic oil, highly aromatic oil and extremely aromatic oil; paraffins, such as unbranched paraffins, isoparaffins, ceresines, isoceresines, paraffin wax, and other mineral waxes; petroleum distillation residues, such as montan waxes, ozocerite, asphaltines, bitumens and pitches; fatty acids, such as stearic acid or palmitic acid; fatty acid metal salts, such zinc soap of unsaturated fatty acid, zinc soap of saturated fatty acid, calcium soap of unsaturated fatty acid, zinc stearate and calcium stearate; organic acid monoesters, such as alkyl or alkoxyalkyl oleates and stearates; organic acid diesters, such as dialkyl, dialkoxyalkyl, and alkyl aryl phthalates, terephtalates, sebacates, adipates, and glutarates; cumarone and indene resins; trialkyl, trialkoxyalkyl, alkyl diaryl, and triarylphosphates; polyhydric alcohol esters of fatty acids, such as pentaerythritol tetrastearate; castor oil, linseed oil, rape seed oil, coconut oil, palm oil, soybean oil, epoxidized soybean oil, tall oil, pine tars, bees wax, carnauba wax, lanolin, factice, and combinations thereof.

Suitable antioxidants for use in crosslinked microcellular rubber foam composition of the present invention include, but are not limited to, hindered phenols such as 2,6-di-t-butyl-p-cresol (BHT), 2,4-dimethyl-6-t-butyl phenol, 2,4-dimethyl-6-(α-methyl-cyclohexyl)-phenol, 4-methoxymethyl-2,6-di-t-butyl-phenol, butylated reaction product of p-cresol and dicyclopentadiene, alkylated phenol, styrenated and alkylated phenol, styrenated phenol (SPH), pentaerythritol tetrakis(3-(3,5-di-tert-butyl-4-hydroxyphenyl)propionate), 2-(1,1-dimethylethyl)-6-[[3-(1,1-dimethylethyl)-2-hydroxy-5-methylphenyl]methyl]-4-methylphenyl acrylate; bisphenols, such as 2,2'-methylene-bis-(4-methyl-6-t-butyl-phenol) (BPH), 2,2'-methylene-bis(4-methyl-6-cyclohexyl-phenol) (CPH), 2,2'-isobutylidene-bis-(4,6-dimethyl-phenol) (IBPH), 2,2'-dicyclopentyl-bis(4-methyl-6-t-butyl-phenol) (DBPH), 2,2'-methylene-bis(4-ethyl-6-t-butyl-phenol), 4,4'-thio-bis(3-methyl-6-t-butyl-phenol); benzimidazole derivatives, such as 2-mercapto-benzimidazole (MBI), 4-methyl-2-mercaptobenzoimidazole and 5-methyl-2-mercaptobenzoimidazole (MMBI), zinc-2-mercaptobenzimidazole (ZMBI), zinc-4-methyl-2-mercaptobenzoimidazole and zinc-5-methyl-2-mercaptobenzoim idazole (ZMMBI).

Suitable blowing agents for use in crosslinked microcellular rubber foam composition of the present invention include, but are not limited to organic chemical blowing agents, such as azodicarbonamide (ADC), N,N'dinitrosopentamethylenetetramine (DNPT), benzenesulfohydrazide (BSH), benzene-1,3-disulfohydrazide, 4,4'-oxybis(benzenesulfonyl hydrazide), p-toluenesulfonic acid hydrazide, toluenesulfonylsemicarbazide, 5-phenyltetrazole, trihydrazine triazine; inorganic chemical blowing agents such as sodium hydrogen carbonate, sodium carbonate, ammonium hydrogen carbonate, ammonium carbonate, potassium hydrogen carbonate, potassium carbonate; physical blowing agents, such as highly pressurized nitrogen or supercritical carbon dioxide, and combinations thereof.

Suitable chemical blowing agent activators for use in crosslinked microcellular rubber foam composition of the present invention include, but are not limited to zinc oxide, zinc benzenesulphinate, zinc stearate, zinc 2-ethylhexanoate, zinc carbonate, zinc ditolyl sulfonate, calcium carbonate, calcium oxide, magnesium oxide, silica, urea, stearic acid, adipic acid, triethanolamine, diphenylamine derivatives, and combinations thereof.

Suitable crosslinking agents for use in the crosslinked microcellular rubber foam composition of the present invention include, but are not limited to sulfur; sulfur donors, such as dithiodimorpholine (DTDM), caprolactamdisulfide, N,N'-dithio bis-(hexahydro-2H-azepinone) (CLD), 2-morpholino-dithio-benzothiazole (MBSS), dipentamethylene thiuramtetrasulfide (DPTT), N-oxydiethylene dithiocarbamyl-N'-oxydiethylene sulfonamide (OTOS), and tetramethyl thiuramdisulfide (TMTD); and organic peroxides, such as dicumyl peroxide, t-butyl perbenzoate, t-butyl cymyl peroxide, di-t-butylperoxide, lauroyl peroxide, 2,5-dimethyl-2,5-di-(t-butylperoxy)hexane, α,α'-bis(t-butylperoxy)-1,3-diisopropylbenzene, α,α'-bis(t-butylperoxy)-1,4-diisopropylbenzene, n-butyl-4,4-bis(t-butylperoxy)valerate, t-butyl peroxyisopropyl carbonate, 1,4-Bis-(t-butylperoxyisopropyl)-benzene, di-t-amyl peroxide, t-butyl peroxybenzoate, t-amyl peroxybenzoate, 1,1-bis(t-butylperoxy)-3,3,5-trimethylcyclohexane, and the like, or mixtures thereof.

Suitable crosslinking accelerators for use in crosslinked microcellular rubber foam composition of the present invention include, but are not limited to mercapto accelerators, such as 2-mercaptobenzothiazole (MBT), dibenzothiazyl disulfide (MBTS), zinc-2-mercaptobenzothiazole (ZMBT); sulfonamide accelerators, such as N-cyclohexyl-2-benzothiazylsulfenamide (CBS), N-tert-butyl-2-benzothiazylsulfenamide (TBBS), and 2-benzothiazyl-N-sulfenemorpholide (MBS); thiuram accelarators, such as tetramethylthiuram disulfide (TMTD), tetramethylthiuram monosulfide (TMTM) and tetraethylthiuram disulfide (TETD); dithiocarbamate accelerators, such as zinc dimethyldithiocarbamate (ZDMC), zinc diethyldithiocarbamate (ZDEC) and zinc dibutyldithiocarbamate (ZDBC); dithiocarbamylsulfenamide accelerators, such as N-oxydiethylenedithiocarbamyl.N'-oxydiethylene sulfonamide (OTOS); guanidine accelerators, such as diphenylguanidine (DPG), di-o-tolylguanidine (DOTG) and o-tolylbiguanidine (OTBG), triazine accelerators, xanthate accelerators, aldehyde-amine accelerators, amine accelerators, thiourea accelerators, dithiophosphate accelerators, and mixtures thereof.

Suitable crosslinking agent activators for use in the crosslinked microcellular rubber foam composition of the present invention include, but are not limited to, zinc oxide, magnesium oxide, $Ca(OH)_2$, stearic acid, zinc stearate, zinc laureate, dibutylaminooleate, 1,3-diphenylguanidinephthalate, monoethanolamine, diethanolamine, triethanolamine, dibutylamine, dibenzylamine, and mixtures thereof.

Another aspect of the invention provides compositions to produce hot-melt pressure sensitive adhesives, comprising:
 a dual composition block copolymer;
 a tackifier resin; and
 an extender oil or plasticizer; and
 an antioxidant.

Optionally, the hot-melt pressure sensitive adhesive composition includes other additives, such: fillers, waxes, photoinitiators, crosslinking agents, crosslinking coagents, crosslinking retarders, adhesion promoters or coupling agents, UV stabilizers, light stabilizers, ozone stabilizers, epoxy resins, asphalt, reinforcing resins, fragrances or odorants, anti-termite agents, biocide agents, antifungal agents, antibacterial agents, metal deactivators, dyes, pigments, colorants, flame retardants, blowing agents, blowing agent activators, or refractive index adjusting agents.

A preferred embodiment of the present invention is a hot-melt pressure sensitive adhesive composition, comprising:
 (a) from about 20 wt. % to about 50 wt % of a dual composition block copolymer, with molecular weight distribution exhibiting at least two peaks totally or partially resolved, and comprising C and U, wherein C is encompassed by the peak with higher molecular weight in the molecular weight distribution of the dual composition block copolymer and comprises coupled block copolymer molecules of formula:

[D-(D/A)-$A_1$]$_n$-X; or

[B-(B/A)-$A_1$]$_n$-X; or

[(B/A)-$A_1$]$_n$-X; or

[B-A$_1$]$_n$-X, or a mixture of the foregoing, and wherein U is encompassed by the remainder low molecular weight peak, or peaks, of the molecular weight distribution of the dual composition block copolymer and comprises uncoupled block copolymer molecules of formula:

D-(D/A)-A$_2$ or D-(D/A)-A$_2$ and D-(D/A)-A$_1$; or

B-(B/A)-A$_2$ or B-(B/A)-A$_2$ and B-(B/A)-A$_1$; or (B/A)-A$_2$ or (B/A)-A$_2$ and (B/A)-A$_1$; or B-A$_2$ or B-A$_2$ and B-A$_1$, or a mixture of the foregoing, wherein
  B is a polymer block made from only conjugated diene monomer, wherein
  (B/A) is a random polymer block made from at least a conjugated diene monomer and at least a monovinyl aromatic monomer, wherein
  D is a polymer block made from at least a conjugated diene monomer and at least a monovinyl aromatic monomer, wherein conjugated diene repeating units are in a greater molar amount than monovinyl aromatic repeating units along the whole polymer block length, wherein
  (D/A) is a polymer block made from at least a conjugated diene monomer and at least a monovinyl aromatic monomer, wherein an end of the polymer block opposite to A$_1$ or A$_2$ is predominantly composed of conjugated diene repeating units, wherein the composition of the polymer block gradually changes along the length of the block until it becomes composed substantially of monovinyl aromatic repeating units at an end adjacent to A$_1$ or A$_2$, wherein
  A$_1$ and A$_2$ are polymer blocks made from monovinyl aromatic monomer only, wherein polymer block A$_2$ has a greater molecular weight than polymer block A$_1$, wherein
  X is the residue of a coupling agent, and wherein
  n is an integer with a value from 2 to 30;
(b) from about 30 wt. % to about 70 wt. % of tackifier resin;
(c) from about 10 wt. % to about 30 wt. % of an extender oil or plasticizer;
(d) from about 0.05 wt. % to about 3.0 wt. of an antioxidant;
(e) optionally, other additives, such as: fillers, waxes, photoinitiators, crosslinking agents, crosslinking coagents, crosslinking retarders, adhesion promoters or coupling agents, UV stabilizers, light stabilizers, ozone stabilizers, epoxy resins, asphalt, reinforcing resins, fragrances or odorants, anti-termite agents, biocide agents, antifungal agents, antibacterial agents, metal deactivators, dyes, pigments, colorants, flame retardants, blowing agents, blowing agent activators, or refractive index adjusting agents.

Suitable tackifier resins for use in the formulation of hot-melt pressure sensitive adhesive of the present invention include, but are not limited to: rosin esters, such as Sylvalite® RE100L, Sylvalite® RE115, Sylvalite® RE85L, Foral® 85, Foral® 105, Pentalyn® H, and Permalyn® 3100; styrenated terpenes, such as Sylvares® ZT5100, Sylvares® ZT105LT, and Sylvares® ZT115LT; polyterpene resins, such as Sylvares® TR1100, and Sylvares® TR7115; terpene phenolics, such as Sylvares® TP2040, and Sylvares® TP115; aliphatic hydrocarbon resins, such as Piccotac® 1100, Piccotac® 115, and Wingtack® 95; hydrogenated hydrocarbon resins, such as Regalrez® 1094, Eastotac® H100, and Eastotac® H130. Sylvalite® and Sylvares®; terpene-phenolic resins; synthetic C5 resins; alkyl-aryl resins; phenol-formaldehyde resins; and the like, and mixtures thereof. Tackifier resins are commercially available from Kraton Corporation. Foral®, Pentalyn®, Permalyn®, Piccotac®, Regalrez®, and Eastotac® tackifiers are commercially available from Eastman Chemical Company. Wingtack® tackifiers are commercially available from Total CrayValley.

Suitable extender oils for use in the formulation of hot-melt pressures sensitive adhesive of the present invention include, but are not limited to: mineral oils; naphtenic oils; paraffinic oils; aromatic oils; vegetable oils; animal oils, and the like, and mixtures thereof.

Suitable plasticizers for use in the formulation of hot-melt pressure sensitive adhesive of the present invention include, but are not limited to: olefin oligomers; epoxidized oils; phthalates such as dioctylphthalates, di-iso-undecyl phthalate, di-isononylphtalate; dialkyl esters of aliphatic dicarboxylic acids; polybutene or polyisobutylene molecular weight lower than 3000, and the like, and mixtures thereof.

Suitable antioxidants for use in the formulation of hot-melt pressure sensitive adhesive of the present invention include, but are not limited to: phenolic antioxidants, such as Irganox® 1010, Irganox® 1076, Irganox® 565, Irganox® 1520, Irganox® 1098, Anox® 20, or Ultranox® 276; phosphite antioxidants, such as: Alkanox® TNPP, Alkanox® 240, Ultranox® 626, or Weston® 618F; thioester antioxidants, such as Naugard® DSTDP; and mixtures of them, such as Ultranox® 877A. Irganox® antioxidants are commercially available from BASF; Anox®, Ultranox®, Alkanox®, Weston® and Naugard® antioxidants are commercially available from Addivant.

EXAMPLES

The following examples have the purpose of showing the features of the present invention and are not intended to limit the scope thereof. Comparative examples using previous art technologies are included as reference. Dual composition block copolymers, as well as previous art copolymers synthetized in the following examples and comparative examples, are characterized by the following techniques: Proton nuclear magnetic resonance ($^1$H-NMR or proton NMR), employing a 300 MHz Bruker, model Fourier 300 Spectrometer, to quantify total styrene repeating unit content, as well as block styrene content. Total styrene repeating unit content in the block copolymers is measured as indicated by International Standard ISO 21561-1. In the following examples, total styrene repeating unit content is reported as weight percentage, on a total block copolymer weight basis. Block styrene content measurement accounts for styrene repeating units incorporated as homopolymer blocks; i.e. the amount of styrene repeating units forming part of a given block copolymer which have no covalent bonds to conjugated diene monomer. Block styrene content is measured by proton NMR as reported in U.S. Pat. No. 9,771,473 B2. In the following examples block styrene content is reported as weight percent, on a total block copolymer basis. As in these examples styrene is the only monovinyl aromatic monomer employed, the total monovinyl aromatic repeating unit content (% A$_t$) quantitatively corresponds to the total styrene content measured in the examples. Analogously, monovinyl aromatic repeating unit blockiness degree in these examples is calculated from the quotient of block styrene content to total styrene content, and reported as a mole percent on a monovinyl aromatic repeating unit basis.

Gel permeation chromatography (GPC), employing an Alliance e2695 HPLC from Waters, coupled to a three-column set to cover molecular weight measurement range from 1000 to 4000000 g/mol, referred to narrow MWD polystyrene standards, was operated with a differential refractive index detector and a diode array detector in series. In the GPC-RI modality, the signal of the differential refractive index detector and a universal calibration curve of molecular weight vs. elution time, constructed from narrow MWD polystyrene standards, were employed to measure molecular weight distribution, weight average molecular weight ($M_w$) and the polydispersity index of molecular weight distribution (the ratio of weight average molecular weight and number average molecular weight, $M_w/M_n$) of the different block copolymer analyzed. GPC-RI was also used to quantify the amount of coupled block copolymer (% $C_{ri}$) by integration of the peak with highest molecular weight, and reported as percentage of the whole GPC-RI molecular weight distribution of the block copolymer analyzed, whenever multiple peaks appeared in the molecular weight distribution. In the GPC-UV modality, the signal of the diode array detector at a wavelength of 261 nm, which only responds to the amount of monovinyl aromatic repeating units in the block copolymer, as well as a universal molecular weight calibration curve referred to narrow MWD polystyrene standards, was employed to measure the monovinyl aromatic repeating unit weighted coupled block copolymer content (% $C_{uv}$); % $C_{uv}$ is obtained by integration of the highest molecular weight peak in the monovinyl aromatic repeating unit weighted molecular weight distribution, and reported as percentage of the whole GPC-UV monovinyl aromatic repeating unit weighted molecular weight distribution, whenever multiple peaks appeared in the molecular weight distribution.

The % $A_t$ (i.e. total styrene repeating content) resulting from proton NMR, the % $C_{ri}$ resulting from GPC-RI, and the % $C_{uv}$ resulting from GPC-UV are then used to calculate the monovinyl aromatic repeating unit weight percent content in the block copolymer uncoupled fraction, % $A_U$, and are also used to calculate the monovinyl aromatic repeating unit weight percent content of the block copolymer coupled fraction, % $A_C$. Finally, they are used to calculate the monovinyl aromatic repeating unit compositional difference between uncoupled and coupled fractions of the block copolymers, % CD, as follows:

$$\% A_U = \frac{(100 - \% C_{uv}) \times \% A_t}{(100 - \% C_{ri})}$$

$$\% A_c = \frac{\% C_{uv} \times \% A_t}{\% C_{ri}}$$

$$\% CD = \% A_U - \% A_C$$

Viscoelastic properties of the block copolymers prepared in the examples are evaluated in an RPA 2000 equipment from Alpha Technologies. Oscillatory shear measurements were performed at a temperature of 100° C. or at 140° C., at maximum strain of 13.95%. Complex dynamic shear viscosity ($\eta^*$) is reported at oscillation frequencies of 0.99 and 100 rad/s, while Tan delta is reported at several oscillation frequencies, sweeping a frequency range from 0.25 to 200 rad/s. Mooney viscosity (ML 1+4) was determined at 100° C., using a Monsanto Mooney MV 2000 equipment, following to ASTM D1646.

Invention Example 1

Synthesis of dual composition block copolymer; prototype prepared with silicon tetrachloride as coupling agent. 0.896 kg of cyclohexane, 0.042 kg of styrene and 0.105 kg of butadiene were charged to a 2-liter reactor under nitrogen atmosphere and stirring. The initial reactor charge was heated to a temperature of 74.0° C. and then 2.845 millimoles of n-butyllithium were fed to the reactor. Polymerization of the first monomer charge reached a peak temperature of 110.8° C. After a 1-minute wait, 0.188 millimoles of silicon tetrachloride coupling agent were fed to the reactor. After a 5-minute wait, 0.028 kg of styrene was fed to the reactor, during this charge, reactor temperature dropped for a moment to 91.6° C. As result of the heat of polymerization of the second styrene charge, the reaction reached a peak temperature of 94.7° C. After a 1-minute wait, 1.782 millimoles of a monofunctional alcohol were fed to the reactor to terminate polymer anions. Specific formulation and polymerization process conditions for this dual composition block copolymer synthesis example is shown in Table 1. Rubber solution was then added 0.5 phr of a phenolic antioxidant and 0.6 phr of phosphite antioxidant. Block copolymer was recovered by roll milling. Weight average molecular weight ($M_w$) of the dual composition block copolymer synthetized was 169.8 kg/mol. Molecular weight distribution exhibited a polydispersity index of 1.26. Molecular weight distribution of the block copolymer exhibited two peaks: a low molecular weight peak corresponding to an un-coupled linear tapered block copolymer of formula D-(D/A)-$A_2$ and a high molecular weight peak corresponding to the coupled tapered styrene-butadiene block copolymer [D-(D/A)-$A_1]_{n=2-4}$-Si. Coupled tapered block copolymer content (% $C_{ri}$) was 27.4% of total block copolymer molecular weight distribution, as determined by GPC-RI. Monovinyl aromatic repeating unit weighted coupling level by GPC-UV (% $C_{uv}$) was 22.0%. Total styrene repeating unit content of the dual composition block copolymer was 40.0 wt. %, whereas block styrene content was 31.8 wt %. Therefore, the monovinyl aromatic repeating unit blockiness degree in the dual composition block copolymer was 79.5 mole %. Monovinyl aromatic repeating unit content in the coupled tapered block copolymer fraction (% $A_C$) was 32.2 wt. %, whereas in the un-coupled tapered block copolymer fraction (% $A_U$) was 42.9 wt. %, as revealed by calculation using coupling levels measured by GPC-RI and GPC-UV, as well as total styrene content measured by proton NMR. Monovinyl aromatic repeating unit compositional difference between un-coupled and coupled tapered block copolymer fractions (% CD) was 10.7%. Specific GPC and NMR characterization of this dual composition block copolymer is depicted in Table 2. Complex dynamic shear viscosity of dual composition block copolymer at 0.99 rad/s was 76198 Pa-s and dropped to 4744 Pa-s when evaluated at oscillating frequency of 100 rad/s. Tan delta of dual composition block copolymer revealed predominately elastic behavior (Tan delta smaller than 1.00) in the whole frequency sweep from 0.25 to 200 rad/s, with a maximum value of 0.81 at 2.51 rad/s (Tan delta$_{max}$). Details of rheological characterization of this dual composition block copolymer is shown in Table 3.

EMBODIMENTS OF THE INVENTION

The terms dual composition block copolymer or dual composition block copolymers (DCBC) as used herein refer to polymeric blends that comprise two kinds of block copolymer molecules that differ between each other in molecular weight, block arrangement structure, and monovinyl aromatic repeating unit content. A molecular weight distribution with two peaks, such as shown for comparative example C-2 in FIG. 9, does not fulfill alone the characteristics needed to have a DCBC. Various other characteristics are also needed for a DCBC according to the present invention. Aspects to consider for DCBCs include: greater monovinyl aromatic repeating unit content in un-coupled fraction; coupling agent linking inner monovinyl aromatic homopolymer blocks; a certain coupling range; a certain total monovinyl aromatic repeating unit content range; defined conjugated diene block structures; mooney viscosity range; complex viscosity range; and tan delta profile, although not all of these aspects are required for defining a dual composition block copolymer, according to the present invention. Some embodiments of processes for making DCBCs are provided below. The claims submitted for a patent on this invention are incorporated by reference into this specification to ensure express, literal support in the specification for the claims.

1. A process for making a dual composition block copolymer, comprising the steps of:
   charging a solvent such as cyclohexane, a monovinyl aromatic monomer such as styrene and a conjugated diene monomer such as butadiene in a batch reactor to provide initial contents [with or without a randomizer or a polar modifier for alternative embodiments];
   [in alternative embodiments, only conjugated diene is initially charged, without the monovinyl aromatic monomer, and is either fully or partially converted]
   mixing and heating the initial contents;
   adding n-butyllithium or a similar lithium initiator to the reactor;
   polymerizing the initial contents and forming polymeric anions;
   partially coupling the polymeric anions by adding a coupling agent such as a silicon tetrachloride or methyl silicon trichloride to the reactor and, preferably, waiting for less than 10 minutes, more preferably less than about 1 minute;
   [in another embodiment, the polymeric anions are partially terminated at this stage]
   adding additional monovinyl aromatic monomer such as styrene to the reactor;
   [the same or a different monovinyl aromatic monomer can be used]
   adding a terminator to the reactor such as a monofunctional alcohol, thereby terminating polymeric anions.
   adding, preferably, an antioxidant, such as a phenolic antioxidant and/or a phosphite antioxidant to the reactor; and
   recovering a block copolymer, by any of the methods well known in the art, such as steam stripping-dewatering-drying, direct desolventization, vacuum assisted desolventization, and the like.

2. The process of embodiment 1, wherein the weight average molecular weight ($M_w$) of the dual composition block copolymer synthetized is in the range of 70 to 500, preferably 120 to 230 and more preferably 150 to 180 kg/mol, where one example is 169.8 kg/mol.

3. The process of embodiment 1 or 2, wherein the dual composition block copolymer has a molecular weight distribution with two peaks and with a polydispersity index of between 1.00 and 1.90, preferably between 1.10 and 1.40, more preferably between 1.20 and 1.33, with a value of 1.26 being a particular example.

4. The process of embodiment 3, wherein one of the two peaks is referred to as a lower molecular weight peak and the other peak is referred to as a higher molecular weight peak, wherein the lower molecular weight peak corresponds to an un-coupled linear tapered block copolymer having a formula of D-(D/A)-$A_2$, wherein the higher molecular weight peak corresponds to a coupled tapered, preferably styrene-butadiene, block copolymer having a formula of [D-(D/A)-$A_1]_{n=2\text{-}4}$-Si.

5. The process of embodiment 4, wherein the content of coupled tapered block copolymer (% $C_{rt}$) in the total block copolymer molecular weight distribution, as determined by GPC-RI, is between 20 and 80%, preferably between 25 and 50%, more preferably between 30 and 45% with values between 35 and 42% being typical and 38.6% being a particular example.

6. The process of embodiment 1 or 5, wherein monovinyl aromatic repeating unit compositional difference between uncoupled and coupled fractions of the dual composition block copolymers, % CD is between 10 and 35%, preferably between 15 and 30%, more preferably between 17 and 28% with 20 to 26% being typical and 25.6% being a particular example.

7. The process of embodiment 1, 5 or 6, wherein the monovinyl aromatic repeating unit blockiness degree is between 76 and 88 mole %, preferably between 78 and 86 mole %, more preferably between 80 and 83 mole % with 82.3 mole % being a particular example.

8. The process of embodiment 1, 5, 6 or 7, wherein the total monovinyl aromatic repeating unit content, % $A_t$, of the dual composition block copolymer is between 20 and 50 wt. %, preferably between 30 and 50 wt. %, more preferably between 38 and 48 wt. % with 40.1 wt. % being a particular example.

9. The process of embodiment 1, 7 or 8, wherein the total monovinyl aromatic repeating unit content of the coupled tapered block copolymer fraction (% $A_C$) is between 5 and 35 wt %, preferably between 15 and 30 wt %, more preferably between 20 and 25 wt. % with 24.8 wt. % being a particular example.

10. The process of embodiment 1, 7, 8 or 9, wherein the complex dynamic shear viscosity of dual composition block copolymer at 0.99 rad/s is between 50,000 and 360,000 Pa-s, preferably between 60,000 and 90,000 Pa-s and more preferably between 70,000 and 82,000 with 76,198 Pa-s being one example.

11. The process of embodiment 10, wherein the complex dynamic shear viscosity of dual composition block copolymer at oscillating frequency of 100 rad/s is between 3,000 and 12,000 Pa-s, preferably between 4,200 and 5,200 Pa-s and more preferably between 4,500 and 4,900 Pa-s with 4,744 Pa-s being one example.

12. The process of any one of embodiments 1 to 11, wherein the coupling agent is silicon tetrachloride.

13. The process of any one of embodiments 1 to 11, wherein the coupling agent is methyl silicon trichloride.

14. The process of embodiment 1 or 2, wherein the dual composition block copolymer has a molecular weight distribution with three peaks.

15. The process of embodiment 14, wherein the weight average molecular weight ($M_w$) of the dual composition block copolymer synthetized is in the range of 70 to 500, preferably 140 to 190 and more preferably 150 to 180 kg/mol, where one example is 159.6 kg/mol.

16. The process of embodiment 15, wherein the dual composition block copolymer has a polydispersity index of between 1.00 and 1.90, preferably between 1.10 and 1.40, more preferably between 1.15 and 1.30, with a value of 1.22 being a particular example.

Invention Example 2

Synthesis of dual composition block copolymer; prototype prepared with methyl silicon trichloride as coupling agent. Same procedure was employed to prepare a dual composition block copolymer as in Example 1, but 0.230 millimoles of methyl silicon trichloride were used instead of silicon tetrachloride as coupling agent. Specific formulation and polymerization process conditions for this dual composition block copolymer synthesis example are shown in Table 1. Rubber solution was then added 0.5 phr of a phenolic antioxidant and 0.6 phr of phosphite antioxidant. Block copolymer was recovered by roll milling. Weight average molecular weight ($M_w$) of the dual composition block copolymer synthesized was 171.8 kg/mol. Molecular weight distribution exhibited a polydispersity index of 1.19. Molecular weight distribution of the block copolymer exhibited two peaks: a low molecular weight peak corresponding to an un-coupled linear tapered block copolymer of formula D-(D/A)-$A_2$ and a high molecular weight peak corresponding to the coupled tapered styrene-butadiene block copolymer [D-(D/A)-$A_1$]$_{n=2-3}$-Si—$CH_3$. Coupled tapered block copolymer content (% $C_{ri}$) was 25.5% of total block copolymer molecular weight distribution, as determined by GPC-RI. Total styrene repeating content of the dual composition block copolymers was 40.2 wt. %, whereas styrene block contents was 32.1 wt %. Therefore, monovinyl aromatic repeating unit blockiness degree was 79.9 mole %. Specific GPC and NMR characterization of this dual composition block copolymer is depicted in Table 2. Complex dynamic shear viscosity of dual composition block copolymer at 0.99 rad/s was 72962 Pa-s and dropped to 4833 Pa-s when evaluated at oscillating frequency of 100 rad/s. Tan delta of dual composition block copolymer revealed predominately elastic behavior (Tan delta less than 1.00) in the whole frequency sweep from 0.25 to 200 rad/s, with a maximum value of 0.86 at 0.99 rad/s. Details of rheological characterization of this dual composition block copolymers is shown in Table 3.

Invention Examples 3 to 12

Figure 9:
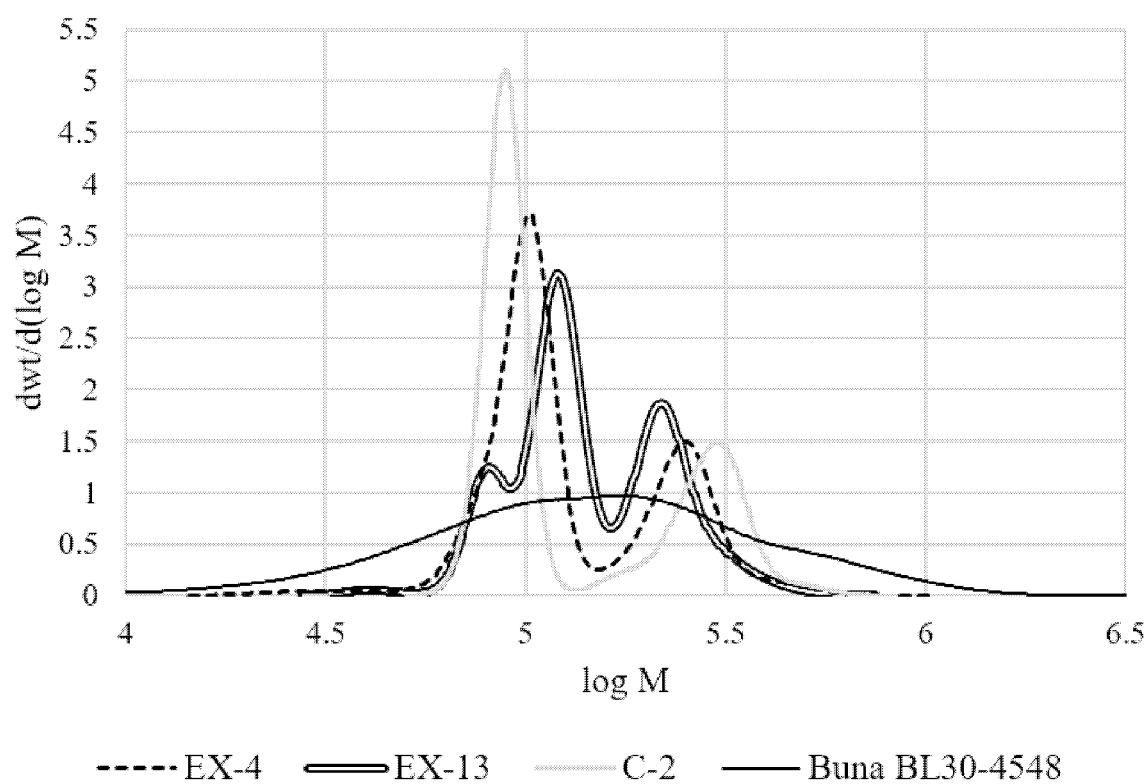
FIG. 9 shows the molecular weight distribution of dual composition block copolymers of Examples 4 and 13 compared to the state of the art block copolymers of Comparative Example C-2 and Buna® BL 30-4548.

Synthesis of dual composition block copolymers; prototypes sweeping viscosity, coupling and compositional difference levels. 71.50±0.14 kg of cyclohexane, either about 1.58 or about 2.56 kg of styrene and 6.64±0.02 kg of butadiene was charged to a 189-liter reactor under nitrogen atmosphere and stirring. The initial reactor temperature was set from about 56.0 to about 66.0° C. and then from about 273.0 to about 321.0 millimoles of n-butyllithium were fed to the reactor. Polymerization of the first monomer charge reached a peak temperature from about 99.7 to about 104.8° C. After a 1-minute wait, from about 13.88 to about 31.42 millimoles of silicon tetrachloride coupling agent were fed to the reactor. After a 5-minute wait, either about 2.78 or about 1.82 kg of styrene was fed to the reactor. While charging the last monomer reactor temperature dropped to about 98.1±2.4° C. As result of heat of the reaction of the polymerization of the second styrene charge, reaction temperature raised to about 102.0±1.5° C. After a 1-minute wait, 143.3±23.3 millimoles of a monofunctional alcohol were fed to the reactor to terminate polymer anions. Specific formulation and polymerization process conditions for each dual composition block copolymer synthesis example are shown in Table 1. Rubber solution was then added 0.5 phr of a phenolic antioxidant and 0.6 phr of phosphite antioxidant. Block copolymer was recovered by steam stripping and oven drying. Weight average molecular weight ($M_w$) of block copolymers synthetized varied from 147.4 to 225.5 kg/mol. Molecular weight distribution exhibited a polydispersity index from 1.24 to 1.40. Molecular weight distribution of the block copolymer exhibited two peaks: a low molecular weight peak corresponding to an un-coupled linear tapered block copolymer of formula D-(D/A)-$A_2$ and a high molecular weight peak corresponding to the coupled tapered styrene-butadiene block copolymer [D-(D/A)-$A_1$]$_{n=2-4}$-Si. Coupled tapered block copolymer content (% $C_{ri}$) varied from 23.0 to 38.6% of total block copolymer molecular weight distribution as determined by GPC-RI. Monovinyl aromatic weighted coupling level by GPC-UV (% $C_{uv}$) was in a range from about 14.6 to about 24.6%. Total styrene repeating unit contents of the dual composition block copolymers were from 39.9 to 40.8 wt %, whereas styrene block contents were from 30.5 wt % to 35.6%. Therefore, monovinyl aromatic repeating unit blockiness degrees of the dual composition block copolymers varied from 76.5 mole % to 87.5 mole %. Vinyl aromatic repeating contents in the coupled tapered block copolymer fraction (% $A_C$) were from about 24.8 to about 32.6 wt. %, whereas in the un-coupled tapered block copolymer fraction (% Au) were from about 43.6 to about 50.5 wt. %, as revealed by calculation using coupling levels measured by GPC-RI and GPC-UV, as well as total styrene content measured by proton NMR. Monovinyl aromatic repeating unit compositional difference between un-coupled and coupled tapered block copolymer fractions (% CD) ranged from about 11.1 wt. % to 25.6 wt. %. Molecular weight distribution of Invention Example 4 is shown in FIG. 9. Specific GPC and NMR characterization of these dual composition block copolymers is depicted in Table 2. Complex dynamic shear viscosity of block copolymers at 0.99 rad/s varied from 52210 to 142236 Pa-s, and dropped to values from 3571 to 6241 Pa-s when evaluated at oscillating frequency of 100 rad/s. Mooney viscosity of block copolymers (ML 1+4 at 100° C.) were from 28.6 to 66.0. Tan delta of dual composition block copolymer revealed predominately elastic behavior (Tan delta smaller than 1.00) in the whole frequency sweep from 0.25 to 200 rad/s, exhibiting maximum values in the range from 0.75 to 0.93, at diverse frequencies. Details of rheological characterization of these dual composition block copolymers are shown in Table 3.

Invention Example 13

Synthesis of dual composition block copolymer; prototype with partial deactivation of block copolymer anions prior to monovinyl aromatic chain extension. The recipe used in example 4 was scaled-up by a factor of 272.7 to an industrial reactor. Nevertheless, a fraction of block copolymer anions remaining alive after coupling was deactivated before performing second styrene charge polymerization. Weight average molecular weight ($M_w$) of dual composition block copolymer was 159.6 kg/mol. Molecular weight distribution exhibited a polydispersity index of 1.22. Molecular weight distribution of the block copolymer exhibited three peaks: a low molecular weight peak corresponding to an un-coupled linear tapered block copolymer of formula D-(D/A)-$A_1$ product of partial deactivation of block copolymer anions before second styrene charge polymerization, a high molecular weight peak corresponding to coupled tapered styrene-butadiene block copolymer [D-(D/A)-$A_1]_{n=2-4}$-Si, and an intermediate molecular weight peak corresponding to un-coupled linear tapered block copolymer of formula D-(D/A)-$A_2$ produced after second styrene charge polymerization. Molecular weight distribution by GPC-RI of dual composition block copolymer produced in Example 13 is shown in FIG. 9. Coupled tapered block copolymer content (% $C_{ri}$) was 37.4% of total block copolymer molecular weight distribution as determined by GPC-RI. Monovinyl aromatic weighted coupling level by GPC-UV (% $C_{uv}$) was 24.8%. Un-coupled linear tapered block copolymer D-(D/A)-$A_1$ accounted for 15.6% of total block copolymer molecular weight distribution as determined by GPC-RI. Total styrene repeating unit content of the dual composition block copolymer was 39.8 wt. %, whereas block styrene content was 34.2 wt. %. Therefore, monovinyl aromatic repeating unit blockiness degree was 86.0 mole %. Vinyl aromatic repeating unit content in the coupled tapered block copolymer fraction (% $A_C$) was 26.4 wt. %, whereas in the un-coupled tapered block copolymer fraction, accounting the two lower molecular weight peaks, was 47.7 wt. %, as revealed by calculation using coupling levels measured by GPC-RI and GPC-UV, as well as total styrene content measured by NMR. Monovinyl aromatic repeating unit compositional difference between un-coupled and coupled tapered block copolymer fractions (% CD) was 21.3%. Specific GPC and NMR characterization of these dual composition block copolymers is depicted in Table 2. Complex dynamic shear viscosity of block copolymer at 0.99 rad/s was 71321 Pa-s, and dropped to 4709 Pa-s when evaluated at oscillating frequency of 100 rad/s. Mooney viscosity of block copolymer (ML 1+4 at 100° C.) was 39.0. Tan delta of dual composition block copolymer revealed predominately elastic behavior (Tan delta smaller than 1.00) in the whole frequency sweep from 0.25 to 200 rad/s, exhibiting a maximum value of 0.85, at 2.51 rad/s. Details of rheological characterization of this dual composition block copolymer are shown in Table 3.

Comparative Example C-1

Synthesis of linear tapered block copolymer; prototype with low viscosity level. 71.56 of cyclohexane, 4.32 of styrene and 6.64 kg of butadiene were charged to a 189-liter reactor under nitrogen atmosphere and stirring. The reactor charge temperature was adjusted to 50.5° C. and then 286.6 millimoles of n-butyllithium were fed to the reactor. Polymerization of the first monomer charge reached a peak temperature of 106.3° C. After a 1-minute wait, 347.4 millimoles of a monofunctional alcohol were fed to the reactor to terminate polymer anions. Specific formulation and polymerization process conditions for this un-coupled tapered block copolymer synthesis example are shown in Table 1. Rubber solution was then added 0.5 phr of a phenolic antioxidant and 0.6 phr of phosphite antioxidant. Un-coupled tapered block copolymer was recovered by steam stripping and oven drying. Weight average molecular weight ($M_w$) of the un-coupled tapered block copolymer synthesized was 93.2 kg/mol. Molecular weight distribution exhibited a polydispersity index of 1.03, with a single narrow peak corresponding to an un-coupled linear tapered block copolymer of formula D-(D/A)-A. Total styrene repeating unit content of the un-coupled tapered block copolymer was 40.5 wt. %, whereas styrene block content was 30.0 wt %. Therefore, monovinyl aromatic repeating unit blockiness degree was 73.9 mole %. Specific GPC and NMR characterization of this un-coupled tapered block copolymer is depicted in Table 2. Complex dynamic shear viscosity of the un-coupled tapered block copolymer at 0.99 rad/s was 49951 Pa-s, and dropped to 4927 Pa-s when evaluated at oscillating frequency of 100 rad/s. Mooney viscosity of the un-coupled tapered block copolymer (ML 1+4 at 100° C.) was 32.4. Tan delta of dual composition block copolymer revealed predominately viscous behavior (Tan delta greater than 1.00) in the frequency range from 0.84 to 25 rad/s, exhibiting a maximum Tan delta of 1.36 at 5.0 rad/s. Details of rheological characterization of this un-coupled tapered block copolymer are shown in Table 3.

Comparative Example C-2

Synthesis of coupled tapered block copolymer; prototype with medium viscosity level. 71.41 kg of cyclohexane, 4.36 kg of styrene and 6.63 kg of butadiene were charged to a 189-liter reactor under nitrogen atmosphere and stirring. The initial reactor charge was heated to a temperature of 51.5° C. and then 285.5 millimoles of n-butyllithium were fed to the reactor. Polymerization reached a peak temperature of 108.6° C. After a 1-minute wait, 19.9 millimoles of silicon tetrachloride coupling agent were fed to the reactor. After a 5-minute wait, 178.1 millimoles of a monofunctional alcohol were fed to the reactor to terminate block copolymer anions. Specific formulation and polymerization process conditions of this partially coupled tapered block copolymer synthesis example are shown in Table 1. Rubber solution was then added 0.5 phr of a phenolic antioxidant and 0.6 phr of phosphite antioxidant. Block copolymer was recovered by steam stripping and oven drying. Weight average molecular weight ($M_w$) of block copolymer was 160.1 kg/mol. Molecular weight distribution exhibited a polydispersity index of 1.39. Molecular weight distribution of the block copolymer exhibited two peaks: a low molecular weight peak corresponding to an un-coupled linear tapered block copolymer of formula D-(D/A)-A and a high molecular weight peak corresponding to the coupled tapered styrene-butadiene block copolymer of formula [D-(D/A)-A]$_{n=2-4}$-Si. Coupled tapered block copolymer content (% $C_{ri}$) accounted for 34.5% of the total molecular weight distribution of the partially coupled tapered block copolymer, as determined by GPC-RI. Monovinyl aromatic repeating unit weighted coupling level obtained by GPC-UV (% $C_{uv}$) was 35.5%, which very well matched the coupling level obtained by GPC-RI, as result of same monovinyl aromatic repeating unit content of un-coupled and coupled fractions. Total styrene repeating unit content of the partially coupled tapered block copolymer was 42.2 wt. %, whereas its block styrene content was 31.6 wt %. Therefore, monovinyl aromatic repeating unit blockiness degree was 74.7 mole %. Specific GPC and NMR characterization of this partially coupled tapered block copolymer is depicted in Table 2. Complex dynamic shear viscosity of the partially coupled tapered block copolymer at 0.99 rad/s was 75924 Pa-s, and dropped to 6128 Pa-s when evaluated at oscillating frequency of 100 rad/s. Mooney viscosity of the partially coupled tapered block copolymer (ML 1+4 at 100° C.) was 40.6. Tan delta of dual composition block copolymer revealed predominately viscous behavior (Tan delta greater than 1.00) in the frequency range from 0.84 to 25 rad/s, exhibiting a maximum Tan delta of of 1.27, at 5.0 rad/s. Details of rheological characterization of this partially coupled tapered block copolymer are shown in Table 3. Molecular weight distribution of Comparative Example C-2 is shown in FIG. 9.

Comparative Example C-3

Synthesis of linear tapered block copolymer, of high viscosity level, in pilot plant reactor. The same procedure of Comparative Example C-1 was performed, but dosage of n-butyllithium was reduced to 264.4 millimoles as to increase molecular weight. Specific formulation and polymerization process conditions for each un-coupled tapered block copolymer synthesis example are shown in Table 1. Weight average molecular weight ($M_w$) of the un-coupled tapered block copolymer synthetized was 107.8 kg/mol. Molecular weight distribution exhibited a polydispersity index of 1.03, with a single narrow peak corresponding to an un-coupled linear tapered block copolymer of formula D-(D/A)-A. Total styrene repeating unit content of the un-coupled tapered block copolymer was 38.9 wt %, whereas block styrene content was 28.8%. Therefore, monovinyl aromatic repeating unit blockiness degree was 74.0 mole %. Specific GPC and NMR characterization of this un-coupled tapered block copolymers is depicted in Table 2. Complex dynamic shear viscosity of the un-coupled tapered block copolymer at 0.99 rad/s was 96249 Pa-s and dropped to 6269 Pa-s when evaluated at oscillating frequency of 100 rad/s. Mooney viscosity of the un-coupled tapered block copolymer (ML 1+4 at 100° C.) was 53.1. Tan delta of dual composition block copolymer revealed predominately viscous behavior (Tan delta greater than 1.00) in the frequency range from 0.25 to 5 rad/s, exhibiting a maximum Tan delta of 1.17 at 0.99 rad/s. Details of rheological characterization of this un-coupled tapered block copolymer are shown in Table 3.

TABLE 1

Formulations and block copolymerization conditions.

| Formulation and block copolymerization conditions | EX-1 | EX-2 | EX-3 | C-1 | EX-4 | C-2 | EX-5 | C-3 |
|---|---|---|---|---|---|---|---|---|
| Cyclohexane, kg | 0.9 | 0.9 | 71.5 | 71.56 | 71.4 | 71.41 | 71.4 | 71.5 |
| First styrene load, kg | 0.04 | 0.04 | 1.63 | 4.32 | 1.65 | 4.36 | 1.64 | 4.31 |
| Butadiene, kg | 0.11 | 0.11 | 6.62 | 6.64 | 6.62 | 6.63 | 6.63 | 6.64 |
| n-butyllithium, mmoles | 2.85 | 2.79 | 276 | 286.6 | 279 | 285.5 | 273 | 264 |
| Polymerization initial temperature, ° C. | 74 | 74.2 | 56 | 50.5 | 57.3 | 51.5 | 56.4 | 48.8 |
| First monomer load peak polymerization temperature, ° C. | 111 | 113 | 101 | 106.3 | 103 | 108.6 | 104 | 107 |
| Silicon tetrachloride, mmoles | 0.19 | 0 | 26.2 | 0 | 22.7 | 19.9 | 23.6 | 0 |
| Methyl silicon trichloride, mmoles | 0 | 0.23 | 0 | 0 | 0 | 0 | 0 | 0 |
| Second styrene load, kg | 0.03 | 0.03 | 2.78 | 0 | 2.76 | 0 | 2.75 | 0 |
| Minimum temperature during second styrene load, ° C. | 91.6 | N.A. | N.A. | — | 97.8 | — | 98.5 | — |
| Second styrene load peak polymerization temperature, ° C. | 94.7 | 99.7 | 101 | — | 102 | — | 103 | — |
| Monofunctional alcohol, mmoles | 1.78 | 1.61 | 167 | 347.4 | 134 | 178.1 | 143 | 241 |

| Formulation and block copolymerization conditions | EX-6 | EX-7 | EX-8 | EX-9 | EX-10 | EX-11 | EX-12 |
|---|---|---|---|---|---|---|---|
| Cyclohexane, kg | 71.6 | 71.4 | 71.6 | 71.5 | 71.47 | 71.58 | 71.64 |
| First styrene load, kg | 1.65 | 1.66 | 1.59 | 1.58 | 2.53 | 2.56 | 2.52 |
| Butadiene, kg | 6.62 | 6.66 | 6.63 | 6.61 | 6.63 | 6.61 | 6.62 |
| n-butyllithium, mmoles | 288 | 280 | 304 | 291 | 321 | 306.7 | 286.6 |
| Polymerization initial temperature, ° C. | 56.6 | 56.4 | 66 | 62.2 | 59.4 | 59.6 | 56.7 |
| First monomer load peak polymerization temperature, ° C. | 103 | 103 | 99.7 | 101 | 103 | 104.8 | 103 |
| Silicon tetrachloride, mmoles | 28.8 | 31.4 | 14.1 | 14.1 | 13.88 | 14.14 | 14.14 |
| Methyl silicon trichloride, mmoles | 0 | 0 | 0 | 0 | 0 | 0 | 0 |
| Second styrene load, kg | 2.77 | 2.73 | 2.71 | 2.75 | 1.83 | 1.86 | 1.82 |
| Minimum temperature during second styrene load, ° C. | N.A. | 98.6 | 95.7 | 96.3 | 98.5 | 100.5 | 98.3 |
| Second styrene load peak polymerization temperature, ° C. | 103 | 103 | 101 | 101 | 101.3 | 103.5 | 101.1 |
| Monofunctional alcohol, mmoles | 154 | 143 | 122 | 122 | 121.9 | 120 | 123.3 |

N.A = Not available

TABLE 2

Block copolymer GPC and NMR characterization. Invention Examples 1 to 13 and Comparative Examples C-1 to C-3

| Block copolymer GPC-NMR characterization | EX-1 | EX-2 | EX-3 | C-1 | EX-4 | C-2 | EX-5 | C-3 | EX-6 |
|---|---|---|---|---|---|---|---|---|---|
| $M_w$ by GPC-RI | 170 | 172 | 147 | 93.2 | 152 | 160 | 170 | 107.8 | 148 |
| Polydispersity index by GPC-RI | 1.26 | 1.19 | 1.28 | 1.03 | 1.32 | 1.39 | 1.29 | 1.03 | 1.24 |
| % $C_{ri}$ | 27.4 | 25.5 | 35.4 | — | 32.9 | 34.5 | 35.8 | — | 36.9 |
| % $C_{uv}$ | 22 | N.A. | 21.8 | — | 21.5 | 35.5 | 23.6 | — | N.A. |
| Total styrene repeating unit content, % $A_t$, wt. % | 40 | 40.2 | 40.5 | 40.5 | 40.8 | 42.2 | 40.7 | 38.9 | 40.1 |
| Block styrene content, wt. % | 31.8 | 32.1 | 35.4 | 30 | 35.6 | 31.6 | 35.1 | 28.8 | 35 |
| Monovinyl aromatic repeating unit blockiness degree, mole % | 79.5 | 79.9 | 87.5 | 73.9 | 87.3 | 74.7 | 86.3 | 74 | 87.3 |
| % $A_C$ | 32.2 | N.A. | 24.9 | — | 26.7 | 43.5 | 26.8 | — | N.A. |
| % $A_U$ | 42.9 | N.A. | 49 | — | 47.7 | 41.6 | 48.5 | — | N.A. |
| % CD | 10.7 | N.A. | 24.1 | — | 21 | -1.9 | 21.7 | — | N.A. |

| Block copolymer GPC-NMR characterization | EX-7 | EX-8 | EX-9 | EX-10 | EX-11 | EX-12 | EX-13 |
|---|---|---|---|---|---|---|---|
| $M_w$ by GPC-RI | 169 | 150 | 181 | 167 | 187.2 | 225.5 | 146.6 |
| Polydispersity index by GPC-RI | 1.28 | 1.35 | 1.34 | 1.29 | 1.34 | 1.4 | 1.21 |
| % $C_{ri}$ | 38.6 | 23 | 27.3 | 28.7 | 30.4 | 32.4 | 37.4 |
| % $C_{uv}$ | 23.6 | 14.6 | 18 | 22.2 | 24.6 | N.A. | 24.8 |
| Total styrene repeating unit content, % $A_t$, wt. % | 40.6 | 40.3 | 40.3 | 39.9 | 40.3 | 40.1 | 39.8 |
| Block styrene content, wt. % | 35.3 | 33.2 | 33.7 | 30.5 | 31.3 | 30.7 | 34.2 |
| Monovinyl aromatic repeating unit blockiness degree, mole % | 86.9 | 82.3 | 83.6 | 76.5 | 77.6 | 76.7 | 86 |
| % $A_C$ | 24.8 | 25.6 | 26.5 | 30.8 | 32.6 | N.A. | 26.4 |
| % $A_U$ | 50.5 | 44.6 | 45.5 | 43.6 | 43.7 | N.A. | 47.7 |
| % CD | 25.6 | 19 | 18.9 | 12.8 | 11.1 | N.A. | 21.3 |

N.A. = Not available

TABLE 3

Block copolymer rheological characterization. Invention Examples 1 to 13 and Comparative Examples C-1 to C-3

| Rheological characterization RPA | Frequency, rad/s | EX-1 | EX-2 | EX-3 | C-1 | EX-4 | C-2 | EX-5 | C-3 |
|---|---|---|---|---|---|---|---|---|---|
| $\eta^*$, Pa-s | 0.99 | 76198 | 72962 | 57486 | 49951 | 79460 | 75924 | 95081 | 96249 |
|  | 1.00 | 4744 | 4833 | 4168 | 4927 | 5298 | 6128 | 5586 | 6269 |
| Tan delta | 0.25 | 0.72 | 0.76 | 0.54 | 0.86 | 0.62 | 0.84 | 0.67 | 1.03 |
|  | 0.5 | 0.76 | 0.81 | 0.59 | 0.97 | 0.71 | 0.97 | 0.73 | 1.13 |
|  | 0.84 | 0.8 | 0.84 | 0.66 | 1.09 | 0.77 | 1.07 | 0.77 | 1.17 |
|  | 0.99 | 0.8 | 0.86 | 0.68 | 1.11 | 0.79 | 1.1 | 0.78 | 1.17 |
|  | 2.51 | 0.81 | 0.85 | 0.8 | 1.31 | 0.87 | 1.25 | 0.81 | 1.14 |
|  | 5 | 0.79 | 0.82 | 0.87 | 1.36 | 0.87 | 1.27 | 0.8 | 1.06 |
|  | 10 | 0.75 | 0.78 | 0.89 | 1.31 | 0.85 | 1.21 | 0.76 | 0.96 |
|  | 25.12 | 0.71 | 0.72 | 0.82 | 1.15 | 0.77 | 1.07 | 0.68 | 0.83 |
|  | 50 | 0.68 | 0.69 | 0.75 | 1 | 0.7 | 0.94 | 0.62 | 0.74 |
|  | 100 | 0.65 | 0.66 | 0.68 | 0.87 | 0.63 | 0.83 | 0.57 | 0.66 |
|  | 200 | 0.62 | 0.63 | 0.61 | 0.76 | 0.57 | 0.73 | 0.52 | 0.59 |
| Tan delta$_{max}$ from 0.25 to 200 rad/s |  | 0.81 | 0.86 | 0.89 | 1.36 | 0.87 | 1.27 | 0.81 | 1.17 |
| Mooney viscosity (ML 1 + 4 at 100° C.) |  | N.A. | N.A. | 32 | 32.4 | 39.2 | 40.6 | 47.9 | 53.1 |

| Rheological characterization RPA | Frequency, rad/s | EX-6 | EX-7 | EX-8 | EX-9 | EX-10 | EX-11 | EX-12 | EX-13 |
|---|---|---|---|---|---|---|---|---|---|
| $\eta^*$, Pa-s | 0.99 | 52120 | 76748 | 10045 | 12423 | 100709 | 125872 | 142236 | 71321 |
|  | 1.00 | 3571 | 4535 | 5582 | 5595 | 5716 | 6018 | 6241 | 4709 |
| Tan delta | 0.25 | 0.48 | 0.6 | 0.79 | 0.75 | 0.86 | 0.84 | 0.82 | 0.67 |
|  | 0.5 | 0.51 | 0.64 | 0.85 | 0.75 | 0.91 | 0.84 | 0.81 | 0.74 |

TABLE 3-continued

Block copolymer rheological characterization. Invention Examples 1 to 13 and Comparative Examples C-1 to C-3

| | | | | | | | | |
|---|---|---|---|---|---|---|---|---|
| 0.84 | 0.56 | 0.68 | 0.87 | 0.74 | 0.93 | 0.83 | 0.78 | 0.79 |
| 0.99 | 0.58 | 0.7 | 0.88 | 0.73 | 0.93 | 0.83 | 0.78 | 0.81 |
| 2.51 | 0.7 | 0.74 | 0.85 | 0.69 | 0.89 | 0.77 | 0.71 | 0.85 |
| 5 | 0.78 | 0.75 | 0.8 | 0.64 | 0.82 | 0.7 | 0.65 | 0.84 |
| 10 | 0.82 | 0.72 | 0.74 | 0.59 | 0.74 | 0.65 | 0.6 | 0.8 |
| 25.12 | 0.81 | 0.66 | 0.65 | 0.54 | 0.65 | 0.57 | 0.54 | 0.71 |
| 50 | 0.75 | 0.6 | 0.6 | 0.5 | 0.59 | 0.52 | 0.5 | 0.64 |
| 100 | 0.68 | 0.55 | 0.55 | 0.46 | 0.54 | 0.48 | 0.47 | 0.58 |
| 200 | 0.61 | 0.5 | 0.5 | 0.43 | 0.49 | 0.45 | 0.43 | 0.53 |
| Tan delta$_{max}$ from 0.25 to 200 rad/s | 0.82 | 0.75 | 0.88 | 0.75 | 0.93 | 0.84 | 0.82 | 0.85 |
| Mooney viscosity (ML 1 + 4 at 100° C.) | 28.6 | 39.8 | 51 | 60 | 52 | 62 | 66 | 39 |

N.A. = Not available

It can be noticed that the batch synthesis process performed in invention examples 1 to 13 renders dual composition block copolymers, each with at least two distinguishable fractions of differing molecular weights and monovinyl aromatic repeating unit contents, where the fraction with lower molecular weight has greater monovinyl aromatic repeating unit content than the fraction exhibiting higher molecular weight.

It can also be noticed that all the dual composition block copolymers prepared in Invention Examples 1 to 13 have higher monovinyl aromatic repeating unit blockiness degree than prior art tapered block copolymers, either linear or coupled, prepared in Comparative Examples 1 to 3. This comes as result of monovinyl aromatic block chain extension performed on remaining polymer anions after coupling step.

Polydispersity index of all the dual composition block copolymers prepared in the Invention Examples 1 to 13, which in the highest case reached 1.40, is in the typical low value range to be expected for organolithium initiated batch polymerization process followed by coupling. It is worthwhile to mention that these low levels of polydispersity are not feasible to be obtained by organolithium initiated continuous polymerization processes of the alternative prior art typically employed to produce block copolymers intended for crosslinked microcellular rubbery article manufacturing. A comparison of molecular weight distributions of dual composition block copolymers prepared in Invention Examples 4 and 13, and in Comparative Example 2, prepared in batch reactor, and the commercial reference Buna® BL 30-4548 (from ARLANXEO), which has unimodal but very wide molecular weight distribution, typical of block copolymers prepared by prior art process in continuous polymerization reactor, is presented in FIG. 9.

All the dual composition block copolymers prepared in Invention Examples 1 to 13 exhibit Tan delta values only below 1.0 across the whole frequency range evaluated, independently of their complex dynamic shear viscosity and Mooney viscosity levels, or independently of the type of coupling agent employed. It can be noticed by inspection of invention examples 1 and 11, that a monovinyl aromatic repeating unit compositional difference between uncoupled and coupled fractions of the dual composition block copolymers (% CD) as low as 11% is still enough to promote this Tan delta behavior. By contrast, linear tapered block copolymers according to the prior art, as prepared in Comparative Example 1, with low viscosity level, and in Comparative Example 3, with high viscosity level, exhibit predominantly viscous behavior in a significant wide portion of the spectrum of frequencies evaluated, as revealed by Tan delta values above 1.0. Likewise, the partially coupled tapered block copolymer of Comparative Example 2, with homogenous monovinyl aromatic repeating unit content between coupled and uncoupled fractions, and medium viscosity level, made according prior art technique, also exhibits Tan delta values above 1.0 in a wide portion of the frequency spectrum evaluated. As previously stated, it is well known in the art that polymeric materials with predominantly elastic behavior, i.e. with Tan delta values below 1.0, are better suited for foaming application, because of their higher melt strength during the expansion of blowing agent. By comparison of these Tan delta profiles, it can be concluded that dual composition block copolymers, according to the invention, are more apt for foaming purposes than prior art linear tapered block copolymers or than partially coupled tapered block copolymers of homogeneous composition.

In Invention Example 13, and FIG. 9, it is shown that dual composition block copolymers can have a tri-modal molecular weight distribution. Specifically, in Invention Example 13, uncoupled block copolymer fraction U is composed of tapered linear block copolymer molecules of formula D-(D/A)-A$_1$, accounting for about 15.6% of the molecular weight distribution, and tapered linear block copolymer molecules of formula D-(D/A)-A$_2$, accounting to about 47.0 wt % of the molecular weight distribution, where monovinyl aromatic blocks A$_2$ have greater molecular weight than monovinyl aromatic blocks A$_1$. Despite this tri-modal molecular weight distribution, the dual composition block copolymer prepared in Invention Example 13 exhibits Tan delta values only below 1.0 across the whole frequency range evaluated.

Invention Example 14

Synthesis of dual composition block copolymer with high monovinyl aromatic repeating unit content. About 65.98 kg of cyclohexane, about 1.88 kg of styrene and about 5.75 kg of butadiene were charged to a 189-liter reactor under nitrogen atmosphere and stirring. Reactor temperature was set to 55.7° C. and then 322.9 millimoles of n-butyllithium were fed to the reactor. Polymerization of the first monomer charge reached a peak temperature of 98.8° C. Then 31.42 millimoles of silicon tetrachloride coupling agent were fed to the reactor. After a 3-minute wait, about 3.08 kg of styrene was fed to the reactor. As result of heat of the reaction of the polymerization of the second styrene charge, reaction temperature raised to about 101.2° C. After a 1-minute wait, all polymer anions were terminated by charging monofunctional alcohol. Formulation and polymerization process conditions are shown in Table 4. Rubber solution was then added 0.5 phr of a phenolic antioxidant and 0.6 phr of phosphite antioxidant. A sample of the dual composition block copolymer was recovered by roll milling at 125° C. and characterized. Weight average molecular weight ($M_w$) of the dual composition block copolymer was 181.0 kg/mol, with a polydispersity $M_w/M_n$ of 1.23; molecular weight distribution by GPC-RI exhibited three peaks: 11.0% of low molecular weight peak corresponding to un-coupled linear tapered block copolymer of formula D-(D/A)-$A_1$, 51.6% of a medium molecular weight peak of un-coupled linear tapered block copolymer of formula D-(D/A)-$A_2$, and 37.4% of a high molecular weight peak (% $C_{rl}$) depicting the coupled tapered styrene-butadiene block copolymer [D-(D/A)-$A_1$]$_{n=2-4}$-Si. Total styrene repeating unit content of the dual composition block copolymer was 47.8 wt. %, whereas styrene block content was 39.9%. Therefore, monovinyl aromatic repeating unit blockiness degree of the dual composition block copolymer was 83.4 mole %. Specific GPC and NMR characterization of the dual composition block copolymer is depicted in Table 5. Complex dynamic shear viscosity of the dual composition block copolymer at 0.99 rad/s was 105345 Pa-s, and dropped to 5649 Pa-s when evaluated at oscillating frequency of 100 rad/s. Mooney viscosity (ML 1+4 at 100° C.) was 48. Tan delta of dual composition block copolymer revealed predominately elastic behavior (Tan delta smaller than 1.00) in the entire frequency sweep from 0.25 to 200 rad/s, exhibiting maximum value of 0.76 at a frequency of 2.51 rad/s when evaluated at 100° C. and 13.95% strain. Same oscillatory shear test, but at temperature of 140° C. revealed a maximum Tan delta value of 0.70 at frequency of 25.12 rad/s. Rheological characterization of this dual composition block copolymer is shown in Table 6.

Invention Example 15

Synthesis of dual composition block copolymer with high monovinyl aromatic repeating unit content and high molecular weight. About 48.02 kg of cyclohexane, about 1.40 kg of styrene and about 4.19 kg of butadiene were charged to a 189-liter reactor under nitrogen atmosphere and stirring. Reactor temperature was set to 54.1° C. and then 219.7 millimoles of n-butyllithium were fed to the reactor. Polymerization of the first monomer charge reached a peak temperature of 96.8° C. Then 18.33 millimoles of silicon tetrachloride coupling agent were fed to the reactor. After a 3-minute wait, about 2.35 kg of styrene was fed to the reactor. As result of heat of the reaction of the polymerization of the second styrene charge, reaction temperature raised to about 99.0° C. After a 1-minute wait, monofunctional alcohol was fed to the reactor to terminate all polymer anions. Formulation and polymerization process conditions are shown in Table 4. Rubber solution was then added 0.5 phr of a phenolic antioxidant and 0.6 phr of phosphite antioxidant. A sample of the dual composition block copolymer was recovered by roll milling at 125° C. and characterized. Weight average molecular weight ($M_w$) of the dual composition block copolymer was 233.7 kg/mol, with a polydispersity $M_w/M_n$ of 1.17; molecular weight distribution by GPC-RI exhibited three peaks: 4.0% of low molecular weight peak corresponding to un-coupled linear tapered block copolymer of formula D-(D/A)-$A_1$, 54.3% of a medium molecular weight peak of un-coupled linear tapered block copolymer of formula D-(D/A)-$A_2$, and 41.7% of a high molecular weight peak (% $C_{rl}$) depicting the coupled tapered styrene-butadiene block copolymer [D-(D/A)-$A_1$]$_{n=2-4}$-Si. Total styrene repeating unit content of the dual composition block copolymer was 48.4 wt. %, whereas styrene block content was 39.7%. Therefore, monovinyl aromatic repeating unit blockiness degree of the dual composition block copolymer was 82.0 mole %. GPC and NMR characterization of the dual composition block copolymer is depicted in Table 5. Complex dynamic shear viscosity of the dual composition block copolymer at 0.99 rad/s was 155221 Pa-s, and dropped to 6467 Pa-s when evaluated at oscillating frequency of 100 rad/s. Mooney viscosity (ML 1+4 at 100° C.) was 66. Tan delta of dual composition block copolymer revealed predominately elastic behavior (Tan delta smaller than 1.00) in the whole frequency sweep from 0.25 to 200 rad/s, exhibiting maximum value of 0.68 at a frequency of 0.50 rad/s, when evaluated at 100° C. and 13.95% strain. Same oscillatory shear test, but at temperature of 140° C. showed a maximum Tan delta value of 0.62 at 2.51 rad/s. Rheological characterization of this dual composition block copolymer is shown in Table 6.

Invention Example 16

Dual composition block copolymer comprising paraffinic oil. Rubber solution prepared in Invention Example 15 was formulated with 4 phr of paraffinic oil PRIMOL® 352 from ExxonMobil. A sample of the oil-extended dual composition block copolymer was recovered by roll milling at 125° C., and characterized. Complex dynamic shear viscosity of the dual composition block copolymer at 0.99 rad/s was 101760 Pa-s, and lowered to 4968 Pa-s when measured at oscillating frequency of 100 rad/s. Mooney viscosity (ML 1+4 at 100° C.) was 50. Tan delta of dual composition block copolymer revealed predominately elastic behavior (Tan delta smaller than 1.00) in the whole frequency sweep from 0.25 to 200 rad/s, exhibiting maximum value of 0.72 at a frequency of 0.99 rad/s, when evaluated at 100° C. and 13.95% strain. Same oscillatory shear test, but at temperature of 140° C. showed a maximum Tan delta value of 0.65 at 5.00 rad/s. Rheological characterization of this dual composition block copolymer is shown in Table 6.

Invention Example 17

Synthesis of dual composition block copolymer with high vinyl aromatic repeating unit content and low coupling. Monomer loadings, reaction sequence and reaction temperatures were practiced like in Invention Example 15, but charging 174.5 millimoles of n-butyllithium and 6.55 millimoles of silicon tetrachloride. Detailed recipe and reaction temperatures are shown in Table 4. A sample of rubber solution was taken from the batch, and dual composition block copolymer was isolated from solvent by roll milling at 125° C. Weight average molecular weight ($M_w$) of the dual composition block copolymer was 190.5 kg/mol, with a polydispersity $M_w/M_n$ of 1.18; molecular weight distribution by GPC-RI exhibited two peaks: 80.0% of low molecular weight peak corresponding to un-coupled linear tapered block copolymer of formula D-(D/A)-$A_2$, and 20.0% of a high molecular weight peak (% $C_{rl}$) depicting the coupled tapered styrene-butadiene block copolymer [D-(D/A)-$A_1$]$_{n=2-4}$-Si. Total styrene repeating unit content of the dual composition block copolymer was 48.7 wt. %, whereas styrene block content was 39.6%. Therefore, monovinyl aromatic repeating unit blockiness degree of the dual composition block copolymer was 81.3 mole %. Results from GPC and NMR characterization of the dual composition block copolymer is depicted in Table 5. Complex dynamic shear viscosity of the dual composition block copolymer at 0.99 rad/s was 248560 Pa-s, and dropped to 8761 Pa-s when evaluated at oscillating frequency of 100 rad/s. Mooney viscosity (ML 1+4 at 100° C.) was 83. Tan delta of dual composition block copolymer revealed predominately elastic behavior (Tan delta smaller than 1.00) in the whole frequency sweep from 0.25 to 200 rad/s, exhibiting maximum value of 0.69 at a frequency of 0.25 rad/s, when evaluated at 100° C. and 13.95% strain. Same oscillatory shear test, but at temperature of 140° C. showed a maximum Tan delta value of 0.70 at 0.25 rad/s. Rheological characterization of this dual composition block copolymer is shown in Table 6.

Invention Example 18

Dual composition block copolymer comprising naphthenic oil. Rubber solution prepared in Invention Example 15 was formulated with 9 phr of naphthenic oil NYFLEX® 223 from NYNAS. A sample of the oil-extended dual composition block copolymer was recovered by roll milling at 125° C., and characterized. Complex dynamic shear viscosity of the dual composition block copolymer at 0.99 rad/s was 124840 Pa-s, and lowered to 6594 Pa-s when measured at oscillating frequency of 100 rad/s. Mooney viscosity (ML 1+4 at 100° C.) was 49. Tan delta of dual composition block copolymer revealed predominately elastic behavior (Tan delta smaller than 1.00) in the whole frequency sweep from 0.25 to 200 rad/s, exhibiting maximum value of 0.87 at a frequency of 0.99 rad/s, when evaluated at 100° C. and 13.95% strain. Same oscillatory shear test, but at temperature of 140° C. showed a maximum Tan delta value of 0.80 at 0.84 rad/s. Rheological characterization of this dual composition block copolymer is shown in Table 6.

TABLE 4

Recipe and block copolymerization conditions of Invention Examples 14 to 18.

| Recipe and block copolymerization conditions | EX-14 | EX-15 | EX-16 | EX-17 | EX-18 |
|---|---|---|---|---|---|
| Cyclohexane, kg | 65.98 | 48.02 | | 48-03 | |
| First styrene load, kg | 1.88 | 1.40 | | 1.36 | |
| Butadiene, kg | 5.75 | 4.19 | | 4.16 | |
| n-butyllithium, mmoles | 322.9 | 219.7 | | 174.5 | |
| Polymerization initial temperature, ° C. | 55.7 | 54.1 | | 54.0 | |
| First monomer load peak polymerization temperature, ° C. | 98.8 | 96.8 | | 97.5 | |
| Silicon tetrachloride, mmoles | 31.42 | 18.33 | | 6.55 | |
| Second styrene load, kg | 3.08 | 2.35 | | 2.34 | |
| Second styrene load peak polymerization temperature, ° C. | 101.2 | 99.0 | | 100.6 | |
| Paraffinic oil, phr | 0 | 0 | 4.0 | 0 | 0 |
| Naphthenic oil, phr | 0 | 0 | 0 | 0 | 9.0 |

TABLE 5

GPC and NMR characterization of dual composition block copolymers of Invention Examples 14 to 17.

| Block copolymer GPC-NMR characterization | EX-14 | EX-15 | EX-17 |
|---|---|---|---|
| $M_w$ | 181.0 | 233.7 | 190.5 |
| $M_w/M_n$ | 1.23 | 1.17 | 1.18 |
| % $C_{ri}$ | 37.4 | 41.7 | 20.0 |
| Total styrene repeating unit content, % $A_t$, wt. % | 47.8 | 48.4 | 48.7 |
| Block styrene content, wt. % | 39.9 | 39.7 | 39.6 |
| Monovinyl aromatic repeating unit blockiness degree, mole % | 83.4 | 82.0 | 81.3 |

TABLE 6

Rheological characterization of dual composition block copolymers of Invention Examples 14 to 18.

| Rheological characterization RPA | Frequency, rad/s | EX-14 | EX-15 | EX-16 | EX-17 | EX-18 |
|---|---|---|---|---|---|---|
| $\eta^*$, Pa-s | 0.99 | 105345 | 155221 | 101760 | 248560 | 124840 |
| | 100 | 5649 | 6467 | 4968 | 8761 | 6594 |
| Tan delta at 100° C. | 0.25 | 0.63 | 0.68 | 0.65 | 0.69 | 0.79 |
| | 0.50 | 0.68 | 0.68 | 0.69 | 0.69 | 0.83 |
| | 0.84 | 0.72 | 0.68 | 0.71 | 0.68 | 0.86 |
| | 0.99 | 0.73 | 0.68 | 0.72 | 0.68 | 0.87 |
| | 2.51 | 0.76 | 0.65 | 0.71 | 0.65 | 0.87 |
| | 5.00 | 0.75 | 0.61 | 0.68 | 0.62 | 0.84 |
| | 10.00 | 0.73 | 0.57 | 0.64 | 0.59 | 0.80 |
| | 25.12 | 0.66 | 0.52 | 0.58 | 0.55 | 0.73 |
| | 50 | 0.60 | 0.48 | 0.53 | 0.53 | 0.67 |

TABLE 6-continued

Rheological characterization of dual composition
block copolymers of Invention Examples 14 to 18.

| RPA | Rheological characterization Frequency, rad/s | EX-14 | EX-15 | EX-16 | EX-17 | EX-18 |
|---|---|---|---|---|---|---|
| | 100 | 0.55 | 0.45 | 0.49 | 0.49 | 0.61 |
| | 200 | 0.50 | 0.42 | 0.45 | 0.46 | 0.56 |
| Tan delta$_{max}$ from 0.25 to 200 rad/s at 100° C. | | 0.76 | 0.68 | 0.72 | 0.69 | 0.87 |
| Tan delta at 140° C. | 0.25 | 0.49 | 0.53 | 0.54 | 0.70 | 0.75 |
| | 0.50 | 0.48 | 0.55 | 0.55 | 0.67 | 0.78 |
| | 0.84 | 0.50 | 0.58 | 0.57 | 0.67 | 0.80 |
| | 0.99 | 0.51 | 0.59 | 0.57 | 0.66 | 0.79 |
| | 2.51 | 0.58 | 0.62 | 0.62 | 0.62 | 0.78 |
| | 5.00 | 0.64 | 0.62 | 0.65 | 0.59 | 0.74 |
| | 10.00 | 0.69 | 0.61 | 0.65 | 0.55 | 0.69 |
| | 25.12 | 0.70 | 0.58 | 0.61 | 0.51 | 0.60 |
| | 50 | 0.68 | 0.56 | 0.58 | 0.49 | 0.54 |
| | 100 | 0.65 | 0.24 | 0.55 | 0.48 | 0.50 |
| | 200 | 0.62 | 0.53 | 0.53 | 0.47 | 0.47 |
| Tan delta$_{max}$ from 0.25 to 200 rad/s at 140° C. | | 0.70 | 0.62 | 0.65 | 0.70 | 0.80 |
| Mooney viscosity (ML 1 + 4 at 100° C.) | | 48 | 66 | 50 | 83 | 49 |

In Invention Examples 14 to 18 it is shown that rheological properties of oil-free dual composition block copolymers, such as that of Invention Example 14, can be matched by oil-extended dual composition block copolymers, such as those of Invention Examples 16 and 18, just by increasing molecular weight in proper amount depending on oil content. Regardless of oil type or coupling level, oil-extended dual composition block copolymers remain predominantly elastic, as revealed by Tan delta values below 1.0 across the complete oscillating shear frequency spectrum tested. These Invention Examples also demonstrate that predominant elastic behavior of dual composition block copolymers prevails even at temperature as high as 140° C.

Hypothetical Examples

The structure of dual composition block copolymers of the present invention is illustrated in FIGS. 1-8.

FIG. 1 shows schematic of dual composition block copolymer comprised by about 38 wt. % of coupled block copolymer C of formula [D-(D/A)-A$_1$]$_4$-X (on the left) and about 62 wt. % of un-coupled block copolymer U of formula D-(D/A)-A$_2$ (on the right). Total monovinyl aromatic repeating unit content, At, is about 41 wt. %. Monovinyl aromatic repeating unit blockiness degree is about 87.5 mole %. Monovinyl aromatic repeating unit weight percent content in the block copolymer C, % A$_C$, is about 21 wt. %. The monovinyl aromatic repeating unit weight percent content of block copolymer U, % A$_U$, is about 52 wt. %; therefore, the monovinyl aromatic repeating unit weight percent compositional difference between block copolymer fractions U and C, % CD, is about 31 wt. %.

Figure 2:
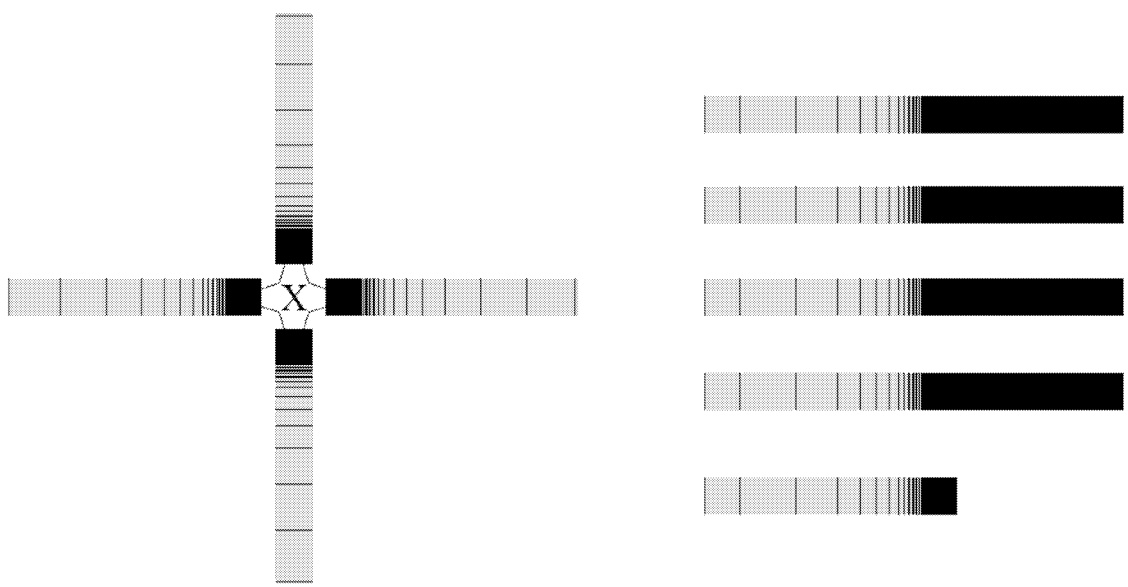
FIG. 2 shows a schematic of dual composition block copolymer comprised of about 34 wt. % of coupled block copolymer C of formula [D-(D/A)-A$_1$]$_4$-X (on the left) and about 66 wt. % of un-coupled block copolymer U of formulas D-(D/A)-A$_2$ (4 molecules on the upper right) and D-(D/A)-A$_1$ (on the bottom right).

FIG. 2 shows schematic of dual composition block copolymer comprised by about 34 wt. % of coupled block copolymer C of formula [D-(D/A)-A$_1$]$_4$-X (on the left) and about 66 wt. % of un-coupled block copolymer U of formulas D-(D/A)-A$_2$ (4 molecules on the upper right, equivalent to about 57 wt. %) and D-(D/A)-A$_1$ (on the bottom right, equivalent to about 9 wt. %). At, is about 39 wt. %. Monovinyl aromatic repeating unit blockiness degree is about 86.5 mole %. A$_C$ is about 21 wt. %, and A$_U$ is about 48 wt. %; therefore, % CD is about 27 wt. %.

Figure 3:
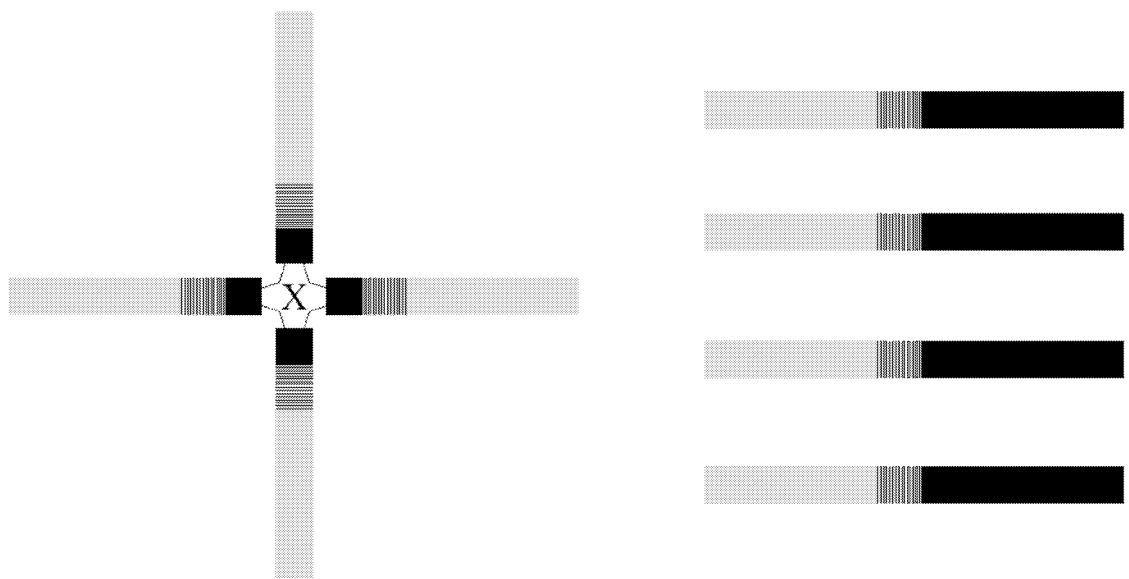
FIG. 3 shows a schematic of a dual composition block copolymer comprised of about 38 wt. % of coupled block copolymer C of formula [B-(B/A)-A$_1$]$_4$-X (on the left) and about 62 wt. % of un-coupled block copolymer U of formula B-(B/A)-A$_2$ (on the right).

FIG. 3 shows schematic of a dual composition block copolymer comprised by about 38 wt. % of coupled block copolymer C of formula [B-(B/A)-A$_1$]$_4$-X (on the left) and about 62 wt. % of un-coupled block copolymer U of formula B-(B/A)-A$_2$ (on the right). A$_t$, is about 41 wt. %. Monovinyl aromatic repeating unit blockiness degree is about 87.5 mole %. A$_C$ is about 21 wt. %, and A$_U$ is about 52 wt. %; therefore, % CD is about 31 wt. %.

Figure 4:
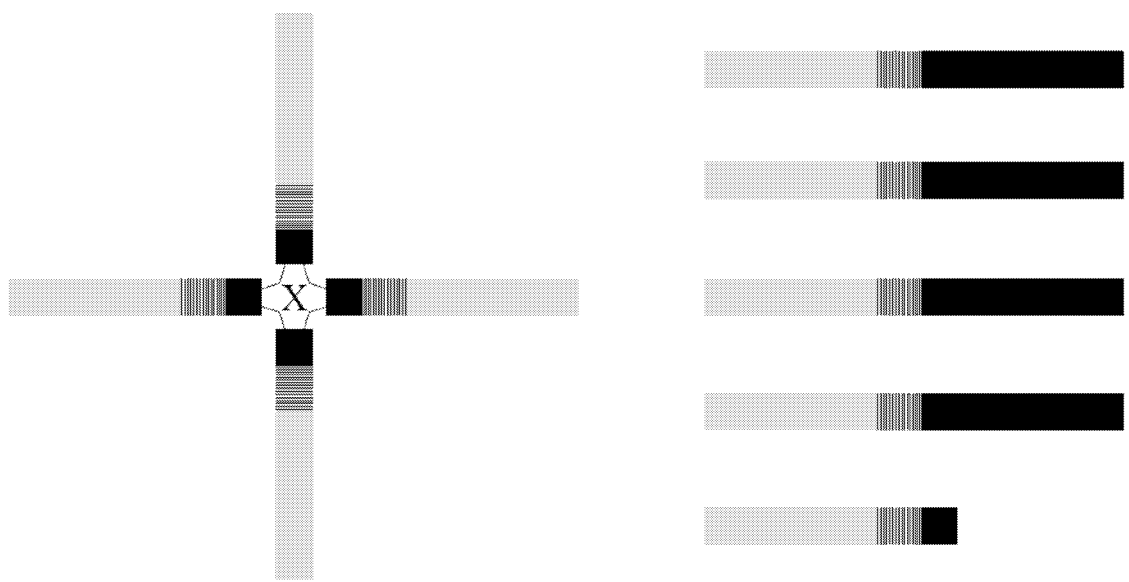
FIG. 4 shows a schematic of dual composition block copolymer comprised by about 34 wt. % of coupled block copolymer C of formula [B-(B/A)-A$_1$]$_4$-X (on the left) and about 66 wt. % of un-coupled block copolymer U of formulas B-(B/A)-A$_2$ (4 molecules on the upper right) and B-(B/A)-A$_1$ (on the bottom right). A$_t$, is about 39 wt. %.

FIG. 4 shows schematic of dual composition block copolymer comprised by about 34 wt. % of coupled block copolymer C of formula [B-(B/A)-A$_1$]$_4$-X (on the left) and about 66 wt. % of un-coupled block copolymer U of formulas B-(B/A)-A$_2$ (4 molecules on the upper right, equivalent to about 57 wt. %) and B-(B/A)-A$_1$ (on the bottom right, equivalent to about 9 wt. %). At, is about 39 wt. %. Monovinyl aromatic repeating unit blockiness degree is about 86.5 mole %. A$_C$ is about 21 wt. %, and Au is about 48 wt. %; therefore, % CD is about 27 wt. %.

Figure 5:
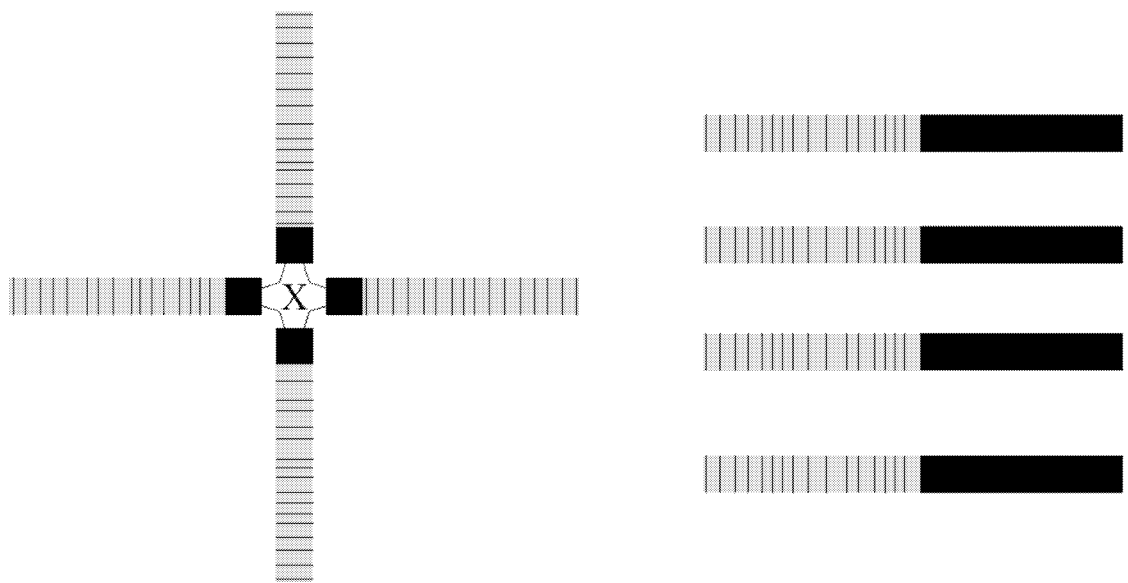
FIG. 5 shows a schematic of dual composition block copolymer comprised of about 38 wt. % of coupled block copolymer C of formula [(B/A)-A$_1$]$_4$-X (on the left) and about 62 wt. % of un-coupled block copolymer U of formula (B/A)-A$_2$ (on the right).

FIG. 5 shows schematic of dual composition block copolymer comprised by about 38 wt. % of coupled block copolymer C of formula [(B/A)-A$_1$]$_4$-X (on the left) and about 62 wt. % of un-coupled block copolymer U of formula (B/A)-A$_2$ (on the right). At, is about 41 wt. %. Monovinyl aromatic repeating unit blockiness degree is about 87.5 mole %. Ac is about 21 wt. %, and Au is about 52 wt. %; therefore, % CD is about 31 wt. %.

Figure 6:
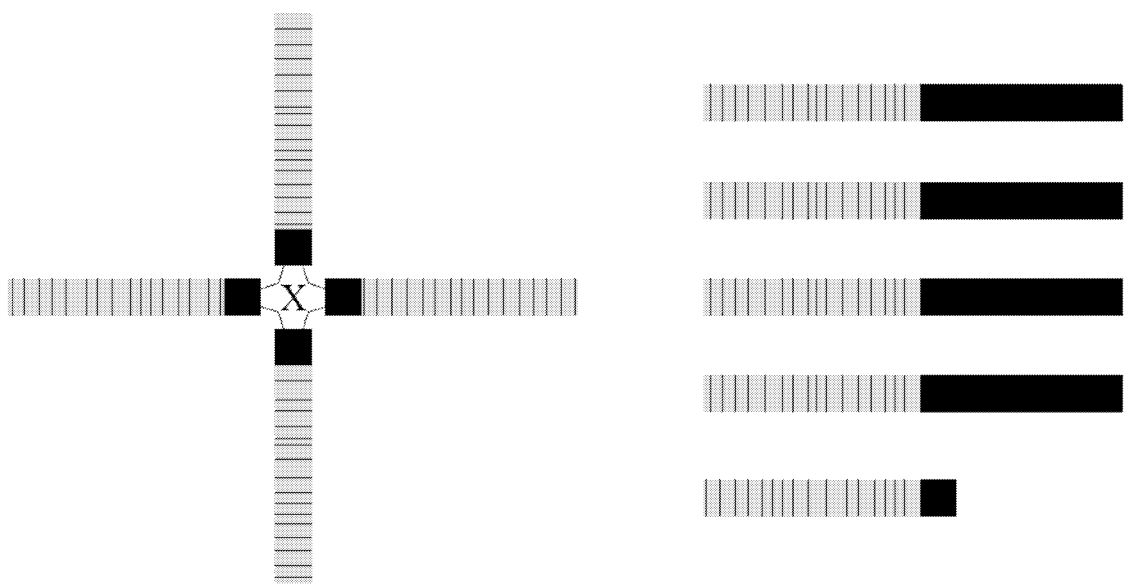
FIG. 6 shows a schematic of dual composition block copolymer comprised of about 34 wt. % of coupled block copolymer C of formula [(B/A)-A$_1$]$_4$-X (on the left) and about 66 wt. % of un-coupled block copolymer U of formulas (B/A)-A$_2$ (4 molecules on the upper right) and (B/A)-A$_1$ (on the bottom right).

FIG. 6 shows schematic of dual composition block copolymer comprised by about 34 wt. % of coupled block copolymer C of formula [(B/A)-A$_1$]$_4$-X (on the left) and about 66 wt. % of un-coupled block copolymer U of formulas (B/A)-A$_2$ (4 molecules on the upper right, equivalent to about 57 wt. %) and (B/A)-A$_1$ (on the bottom right, equivalent to about 9 wt. %). At, is about 39 wt. %. Monovinyl aromatic repeating unit blockiness degree is about 86.5 mole %. Ac is about 21 wt. %, and Au is about 48 wt. %; therefore, % CD is about 27 wt. %.

Figure 7:
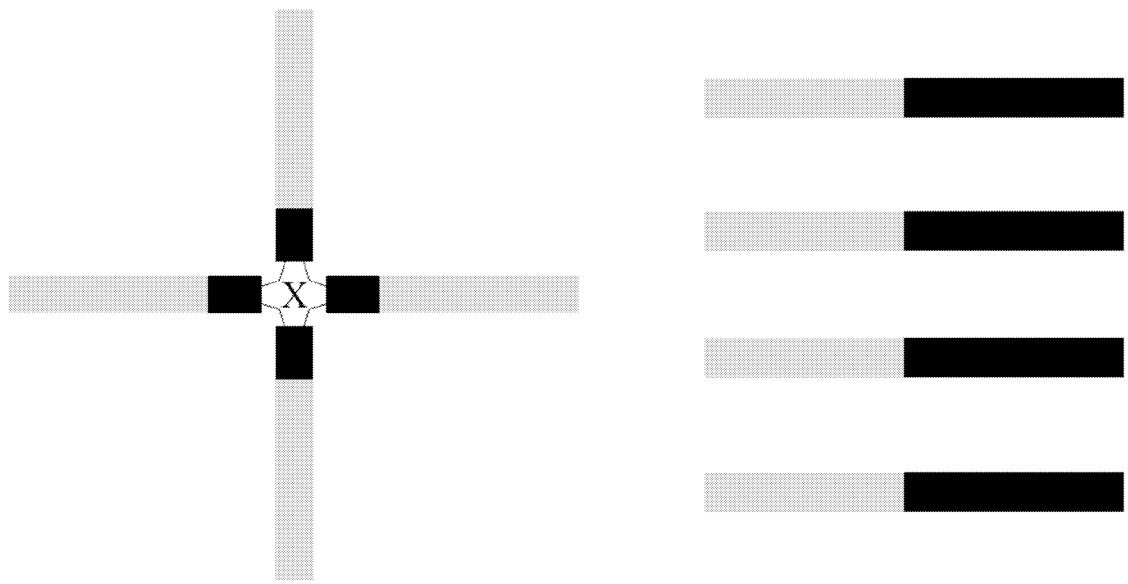
FIG. 7 shows a schematic of dual composition block copolymer comprised of about 38 wt. % of coupled block copolymer C of formula [B-A$_1$]$_4$-X (on the left) and about 62 wt. % of un-coupled block copolymer U of formula B-A$_2$ (on the right).

FIG. 7 shows schematic of dual composition block copolymer comprised by about 38 wt. % of coupled block copolymer C of formula $[B-A_1]_4$-X (on the left) and about 62 wt. % of un-coupled block copolymer U of formula $B-A_2$ (on the right). $A_t$, is about 41 wt. %. Monovinyl aromatic repeating unit blockiness degree is about 100 mole %. $A_C$ is about 21 wt. %, and $A_U$ is about 52 wt. %; therefore, % CD is about 31 wt. %.

Figure 8:
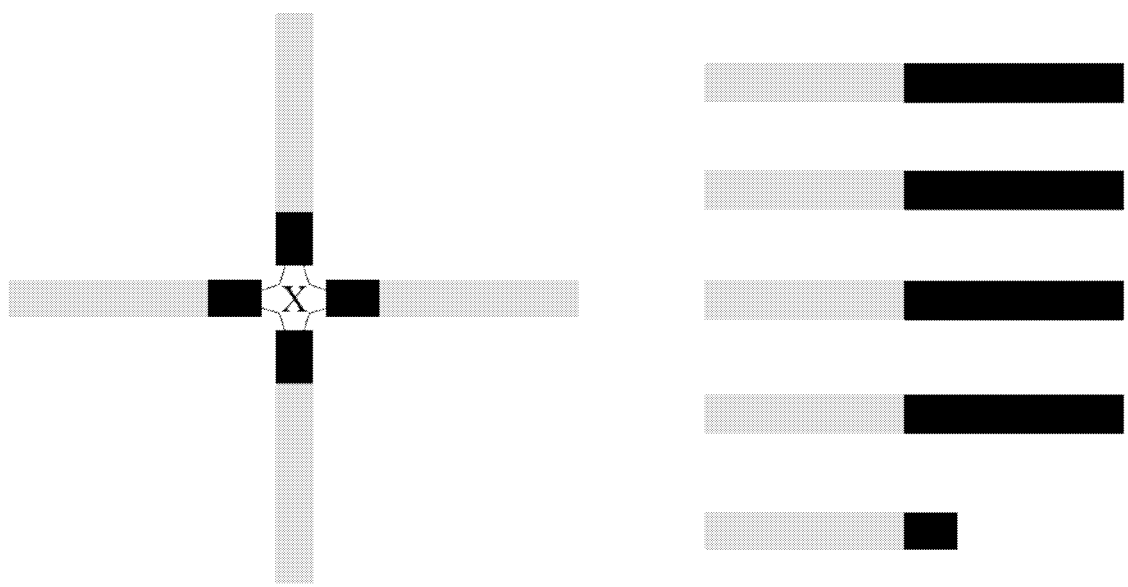
FIG. 8 shows a schematic of dual composition block copolymer comprised of about 34 wt. % of coupled block copolymer C of formula [B-A$_1$]$_4$-X (on the left) and about 66 wt. % of un-coupled block copolymer U of formulas B-A$_2$ (4 molecules on the upper right) and B-A$_1$ (on the bottom right).

FIG. 8 shows schematic of dual composition block copolymer comprised by about 34 wt. % of coupled block copolymer C of formula $[B-A_1]_4$-X (on the left) and about 66 wt. % of un-coupled block copolymer U of formulas $B-A_2$ (4 molecules on the upper right, equivalent to about 57 wt. %) and $B-A_1$ (on the bottom right, equivalent to about 9 wt. %). $A_t$, is about 39 wt. %. Monovinyl aromatic repeating unit blockiness degree is about 100 mole %. $A_C$ is about 21 wt. %, and $A_U$ is about 48 wt. %; therefore, % CD is about 27 wt. %.

In FIG. 1 to FIG. 8, black bars denote sequences of monovinyl aromatic repeating units, gray bars depict sequences of conjugated diene repeating units, and X is the residue of a tetrafunctional coupling agent. In FIG. 1 to FIG. 6 black lines among sequences of conjugated diene repeating units represent different arrangements in which monovinyl aromatic repeating units are copolymerized with conjugated diene repeating units; their location and spacing are not specific locations of individual monovinyl aromatic repeating units, rather, they show the trend of concentration of monovinyl aromatic repeating units interspersed along blocks also containing conjugated diene repeat units. Thus, a slight gradient followed by steep gradient concentration profile, characteristic of tapered copolymerization, is shown in FIG. 1 and FIG. 2; a randomization with only a portion of the conjugated diene repeating units is depicted in FIG. 3 and FIG. 4; and a fully randomized arrangement with all the conjugated diene repeating units appears in FIG. 5 and FIG. 6.

Examples for End-Use Applications

In the following Invention Examples, the formulation of rubber compounds comprising dual composition block copolymers, chemical blowing agent and crosslinking agent is shown. The compounds are pre-crosslinked in a sealed and heated compression mold, then sudden decompression and opening of the mold is performed to get microcellular rubber expansion; afterwards, crosslinking stage of the microcellular rubber probes is completed in a forced convection oven. The same formulation and process to obtain crosslinked microcellular rubber probes is employed in Comparative Examples, but using prior art block copolymers prepared in Comparative Examples 1 to 3, as well as using a commercial block copolymer reference exhibiting unimodal and very wide molecular weight distribution (Buna® BL 30-4548).

The crosslinked microcellular rubber probes were visually inspected to qualify surface appearance, they were also measured before and after crosslinking stage to ascertain volumetric shrinkage. In addition to this, the probes were analyzed by the following aspects:

Density was measured using an electronic densimeter, of MUVER brand, model 5085-2, under ISO 2781 standard method. Number average cell size and cell size standard deviation were measured by epi-fluorescence microscopy, using a Carl Zeiss AXIOTECH 100HD microscope and digital image analysis. Hardness was measured using a Bareiss brand Shore A durometer complying with DIN 53505 and ISO 868 standards, mounted on a MUVER 5019 holder. Resilience was measured using a Zwick 5109 Rebound resilience tester.

Invention Example 19

A rubber compound was prepared by compounding 100 phr of dual composition block copolymer prepared in Invention Example 3, 6 phr of azodicarbonamide as foaming agent (Celogen® AZ-130, from CelChem, LLC) and 1.1 phr of dicumyl peroxide as crosslinking agent in a roll mill. The rubber compound was compression molded, charging 3% excess to assure sealing of the mold. The mold was clamped with heated plates at 150° C., under a clamping pressure of 92.8 kgf/cm² for 3 minutes. Thereafter, the mold was cooled down to 120° C. while keeping it pressurized. Then, the clamping pressure over the mold was released and compression press plates were opened. Immediate foam expansion occurred, which could be noticed from lifting of upper mold plaque. Pre-crosslinked foamed probe was quenched in water at 23° C. Crosslinking was completed by placing the pre-crosslinked foamed probe in a forced convection oven at 100° C. for 6 hours. Then rubber foam probe was conditioned for 24 hours at 23° C. Crosslinked microcellular foamed rubber probes prepared in this way had smooth surface, without blister defects. Volumetric shrinkage by comparing pre-crosslinked and fully crosslinked probe volumes was 3.9%. The crosslinked microcellular rubber probe had a density of 0.446 g/cm³, number average cell size of 6.74 microns, with a cell size standard deviation of 2.09 microns, Shore A hardness of 28.0, and a resilience of 37.9%. Crosslinked microcellular rubber probe formulation and evaluation results are compared with the rest of the invention and comparative examples in Table 7.

Invention Example 20

A rubber compound and cross-linked microcellular rubber probe were prepared as in Invention Example 19, but comprising dual composition block copolymer prepared in Invention Example 4. Crosslinked microcellular rubber probe prepared in this way had smooth surface, without blister defects. Volumetric shrinkage by comparing pre-crosslinked and fully crosslinked probe volume was 3.9%. The crosslinked microcellular probe had density of 0.464 g/cm³, number average cell size of 8.08 microns, with a cell size standard deviation of 2.40 microns, Shore A hardness of 38, and a resilience of 37.9%. Crosslinked microcellular rubber probe formulation and evaluation results are compared with the rest of the invention and comparative examples in Table 7.

Invention Example 21

A rubber compound and cross-linked microcellular rubber probe were prepared as in Example 19, but comprising dual composition block copolymer prepared in Invention Example 5. Crosslinked microcellular rubber probe prepared in this way had smooth surface, without blister defects. Volumetric shrinkage by comparing pre-crosslinked and fully crosslinked probe volume was 4.0%. The crosslinked microcellular probe density of 0.662 g/cm³, Shore A hardness of 38.0, and a resilience of 37.0%. Crosslinked microcellular rubber probe formulation and evaluation results are compared with the rest of the invention and comparative examples in Table 7.

Comparative Example C-4

A rubber compound and cross-linked microcellular rubber probe were prepared as in Invention Example 19, but comprising the prior art un-coupled tapered block copolymer prepared in Comparative Example C-1. Crosslinked microcellular foamed rubber probe prepared in this way had irregular surface, with blister defects. Volumetric shrinkage by comparing pre-crosslinked and fully crosslinked probe volume was 3.9%. The crosslinked microcellular rubber probe had density of 0.526 g/cm$^3$, number average cell size of 13.1 microns, with a cell size standard deviation of 8.79 microns, Shore A hardness of 55.0, and a resilience of 28.2%. Crosslinked microcellular rubber probe formulation and evaluation results are compared with the rest of the invention and comparative examples in Table 7.

Comparative Example C-5

A rubber compound and cross-linked microcellular rubber probe were prepared as in Invention Example 19, but comprising prior art coupled tapered block copolymer prepared in Comparative Example C-2. Crosslinked microcellular rubber probe prepared in this way had an irregular surface, with blister defects. Volumetric shrinkage by comparing pre-crosslinked and fully crosslinked probe volume was 4.0%. The crosslinked microcellular rubber probe had density of 0.790 g/cm$^3$, number average cell size of 9.50 microns, with a cell size standard deviation of 3.38 microns, Shore A hardness of 76.0, and a resilience of 31.0%. Crosslinked microcellular rubber probe formulation and evaluation results are compared with the rest of the invention and comparative examples in Table 7.

Comparative Example C-6

A rubber compound and cross-linked microcellular rubber probe were prepared as in Invention Example 19, but comprising prior art un-coupled tapered block copolymer prepared in Comparative Example C-3. Crosslinked microcellular rubber probe prepared in this way had irregular surface, with blister defects. Volumetric shrinkage by comparing pre-crosslinked and fully crosslinked probe volume was 3.9%. The crosslinked microcellular rubber probe had density of 0.694 g/cm$^3$, number average cell size of 6.40 microns, with a cell size standard deviation of 2.00 microns, Shore A hardness of 53, and a resilience of 32.8%. Crosslinked microcellular rubber probe formulation and evaluation results are compared with the rest of the invention and comparative examples in Table 7.

Comparative Example C-7

A rubber compound and cross-linked microcellular rubber probe was attempted to be prepared as in Example 19, but comprising prior art block copolymer Buna® BL 30-4548 (block copolymer with unimodal and very wide molecular weight distribution shown in FIG. 9, commercial reference for microcellular rubber application), instead of dual composition block copolymer. Although compression molding, mold cooling, depressurization and mold opening conditions prevailed exactly as in Invention Example 19, when load pressure over the hot mold was released and press plates were opened, rubber compound expansion occurred to a very limited extent, as lifting of the mold upper plaque could not be noticed. Crosslinked rubber probe prepared in this way had smooth surface, without blister defects. Volumetric shrinkage by comparing pre-crosslinked and fully crosslinked probe volume was 0%. The crosslinked rubber probe had a very high density of 1.042 g/cm$^3$, which evidenced poor foaming performance of this rubber compound. Optical microscopy analysis revealed very scarce cell counts, with a number average cell size of 14.25 microns, with a cell size standard deviation of 5.04 microns. The crosslinked rubber probe had a Shore A hardness of 43, and a resilience of 37.5%. Crosslinked rubber probe formulation and evaluation results are compared with the rest of the invention and comparative examples in Table 7.

In Invention Example 19 and in Comparative Example C-4, the block copolymers employed in the formulation had very similar Mooney viscosity values, 32.0 and 32.4, respectively, and very similar complex shear viscosity profiles at 100° C., as can be reviewed in Table 3 (see Invention Example 3 and Comparative Example C-1). It can be noticed that usage of invention dual composition block copolymer in the rubber compound formulation in Invention Example 19 conducted to produce crosslinked microcellular rubber probe with smoother surface, with lower density, with smaller and more homogeneously sized cells, with lower hardness and higher resilience than when performing formulation than when using prior art uncoupled tapered block copolymer in Comparative Example C-4. Low volumetric shrinkage was obtained for both Invention Example 19 and Comparative Example C-4.

In Invention Example 20 and in Comparative Example C-5, the block copolymers employed in the formulation had very similar Mooney viscosity values, 39.2 and 40.6, respectively, and very similar complex shear viscosity profiles at 100° C., as can be reviewed in Table 3 (see Invention Example 4 and Comparative Example C-2). It can be noticed that usage of invention dual composition block copolymer in the rubber compound formulation in Invention Example 20 conducted to produce crosslinked microcellular rubber probe with smoother surface, with lower density, with smaller and more homogeneously sized cells, with much lower hardness and higher resilience than when performing formulation using prior art coupled tapered block copolymer in Comparative Example C-5. Low volumetric shrinkage was obtained for both Invention Example 20 and Comparative Example C-5.

In Invention Example 21 and in Comparative Example C-6, the block copolymers employed in the formulation had very similar complex shear viscosity profiles at 100° C., as can be reviewed in Table 3 (see Invention Example 3 and Comparative Example C-1). It can be noticed that usage of invention dual composition block copolymer in the rubber compound formulation in Invention Example 21 conducted to produce crosslinked microcellular rubber probe with smoother surface, with lower density, with lower hardness and higher resilience than when performing formulation than when using prior art uncoupled tapered block copolymer in Comparative Example C-6. Low volumetric shrinkage was obtained for both Invention Example 21 and Comparative Example C-6.

TABLE 7

Formulations and properties of crosslinked microcellular rubber compounds

| | | Crosslinked microcellular rubber compound examples | | | |
|---|---|---|---|---|---|
| | | EX-19 | C-4 | EX-20 | C-5 |
| Formulationn (weight parts) | Invention Example 3 | 100 | 0 | 0 | 0 |
| | Comparative Example 1 | 0 | 100 | 0 | 0 |
| | Invention Example 4 | 0 | 0 | 100 | 0 |
| | Comparative Example 2 | 0 | 0 | 0 | 100 |
| | Invention Example 5 | 0 | 0 | 0 | 0 |
| | Comparative Example 3 | 0 | 0 | 0 | 0 |
| | Buna ® BL 30-4548 | 0 | 0 | 0 | 0 |
| | Celogen ® AZ-130 | 6 | 6 | 6 | 6 |
| | Dicumyl peroxide | 1.1 | 1.1 | 1.1 | 1.1 |
| Properties of crosslinked microcellular rubber compound | Surface appearance | Smooth | Blistered | Smooth | Blistered |
| | Number average cell size, microns | 6.74 | 13.05 | 8.08 | 9.5 |
| | Cell size standard deviation, microns | 2.09 | 8.79 | 2.4 | 338 |
| | Volumetric shrinkage, % | 3.9 | 3.9 | 3.9 | 4 |
| | Density, g/cm$^3$ | 0.446 | 0.526 | 0.464 | 0.79 |
| | Hardness, Shore A | 28 | 55 | 38 | 76 |
| | Resilience, % | 37.9 | 28.2 | 37.9 | 31 |

| | | Crosslinked microcellular rubber compound examples | | |
|---|---|---|---|---|
| | | EX-21 | C-6 | C-7 |
| Formulationn (weight parts) | Invention Example 3 | 0 | 0 | 0 |
| | Comparative Example 1 | 0 | 0 | 0 |
| | Invention Example 4 | 0 | 0 | 0 |
| | Comparative Example 2 | 0 | 0 | 0 |
| | Invention Example 5 | 100 | 0 | 0 |
| | Comparative Example 3 | 0 | 100 | 0 |
| | Buna ® BL 30-4548 | 0 | 0 | 100 |
| | Celogen ® AZ-130 | 6 | 6 | 6 |
| | Dicumyl peroxide | 1.1 | 1.1 | 1.1 |
| Properties of crosslinked microcellular rubber compound | Surface appearance | Smooth | Blistered | Smooth |
| | Number average cell size, microns | N/A | 6.4 | 14.25 |
| | Cell size standard deviation, microns | N/A | 2 | 5.04 |
| | Volumetric shrinkage, % | 4 | 3.9 | 0 |
| | Density, g/cm$^3$ | 0.662 | 0.694 | 1.042 |
| | Hardness, Shore A | 38 | 53 | 43 |
| | Resilience, % | 37 | 32.8 | 37.5 |

N.A. = Not available

Invention Example 22

A foamable rubber compound was prepared by compounding 100 phr of dual composition block copolymer of Example 13, 6 phr of azodicarbonamide and 1.1 phr of dicumyl peroxide in a roll mill. The foamable rubber compound was compression molded, charging 3% rubber compound excess to assure sealing of the mold. The mold was clamped with heated plates at 170° C., under a clamping pressure of 92.8 kgf/cm$^2$ for 3 minutes. Then the pressure load over the mold was released and compression press plates were opened. Immediate foam expansion occurred, which could be noticed from lifting of upper mold plaque. Then, the mold and the crosslinked microcellular rubber probe were quenched in water at 23° C. The crosslinked microcellular rubber probe was taken out of the mold and dried with absorbing paper. The crosslinked microcellular rubber probe was then conditioned in controlled atmosphere room at 23° C. and 50% relative humidity for 7 days. The crosslinked microcellular rubber probe prepared in this way had smooth surface, without blister defects. It had density of 0.624 g/cm$^3$, and exhibited 0% shrinkage after the 7 days of conditioning in controlled atmosphere room; Formulation and properties of crosslinked microcellular rubber compound are summarized in Table 8.

Comparative Example 7

A foamable rubber compound and a cross-linked microcellular rubber probe were prepared as in Invention Example 22, but comprising Buna® BL 30-4548, instead of dual composition block copolymer. Although compression molding conditions prevailed exactly as in Invention Example 22, when load pressure over the hot mold was released and compression press plates were opened, rubber compound foam expansion occurred to a very limited extent, as lifting of the mold upper plaque could not be noticed. The crosslinked microcellular foamed rubber probe prepared in this way had smooth surface, without blister defects; Its density of 0.986 g/cm$^3$ revealed low foaming performance of this compound. Formulation and properties of crosslinked microcellular rubber compound are summarized in Table 8.

TABLE 8

Formulation and properties of crosslinked microcellular rubber compounds.

| | | EX-22 | C-7 |
|---|---|---|---|
| Formulation (weight parts) | Invention Example 13 | 100 | 0 |
| | Buna ® BL 30-4548 | 0 | 100 |
| | Celogen ® AZ-130 | 6.00 | 6.00 |
| | Dicumyl peroxide | 1.10 | 1.10 |

TABLE 8-continued

Formulation and properties of crosslinked microcellular rubber compounds.

| | | EX-22 | C-7 |
|---|---|---|---|
| Properties of crosslinked microcellular rubber compound | Surface appearance Density, g/cm³ | Smooth 0.624 | Smooth 0.986 |

Overall, in every case in which a dual composition block copolymer of the invention was used for producing crosslinked microcellular rubber probes, the obtained surface aesthetics where smooth, whereas when using prior art tapered block copolymers, either uncoupled or coupled, the microcellular rubber probes produced had blister defects in their surface. Better foaming performance was also evidenced when using dual composition block copolymers of the invention, as revealed by lower probe densities, and more homogeneously sized cells than when using prior art alternatives. Moreover, higher softness (lower Shore A hardness) and higher resilience was obtained in the crosslinked rubber compounds when comprising dual composition block copolymer of the invention. It is worthwhile mentioning that under the same pre-crosslinking/molding, decompression and crosslinking conditions, the formulations comprising dual composition block copolymers enabled the production of crosslinked microcellular rubber probes, whereas when using commercial reference Buna® BL 30-4548 microcellular foaming was not feasible.

In the following examples compounding evaluations were performed in a laboratory internal mixer. The formulations contained either dual composition block copolymers of the invention or prior art tapered block copolymers. Torque and temperature readings were collected to assess the compounding performance. The compounding evaluations were performed in an Intelli-Torque Plasti-Corder, equipped with Prep-Mixer measuring head, with CAM blades and net chamber volume of 420 ml, from Brabender brand. The standard formulation employed also comprised emulsion SBR, fillers, plasticizers, antioxidant, chemical blowing agent, blowing agent activator, crosslinking agent, crosslinking accelerator, crosslinking agent activator.

Invention Example 23

A compounding evaluation was performed in a laboratory internal mixer. Initial charge comprised 80 phr of dual composition block copolymer prepared in Example 3 and 20 phr Emulprene 1502 (cold emulsion styrene-butadiene random copolymer with 23.5% styrene repeating unit content, from Dynasol Group), mixing started with chamber temperature stabilized at 45° C. At a mixing time of 1 minute, 2.5 phr of naphthenic oil and 1.7 phr of paraffin wax were added. At a mixing time of 4 minutes, 70 phr of hard clay, 35 phr of aluminum silicate, 4.5 phr of azodicarbonamide (Celogen® AZ-130) and 1.0 phr of Wingstay® L (from OMNOVA Solutions Inc.) antioxidant were added. At a mixing time of 8 minutes, 3.0 phr sulfur, 3.5 phr of stearic acid and 3.5 phr of zinc oxide were added. At a mixing time of 10 minutes, 1 phr of diphenylguanidine (DPG) and 2.3 phr of 2-Benzothiazyl-N-sulfenemorpholide (MBS) were added. At a total mixing time of 12 minutes, torque reading was 106.2 N-m and mixing chamber internal temperature was 87° C. Compounding evaluation results are listed in Table 9.

Invention Example 24

A compounding evaluation was performed as in Invention Example 23, but using dual composition block copolymer of Invention Example 4. At a total mixing time of 12 minutes, torque reading was 110.2 N-m and mixing chamber internal temperature was 87° C. Compounding evaluation results are listed in Table 9.

Invention Example 25

A compounding evaluation was performed as in Invention Example 23, but using dual composition block copolymer of Invention Example 13. At a total mixing time of 12 minutes, torque reading was 110.0 N-m and mixing chamber internal temperature was 87° C. Compounding evaluation results are listed in Table 9.

Invention Example 26

A compounding evaluation was performed as in Invention Example 23, but using dual composition block copolymer of Invention Example 5. At a total mixing time of 12 minutes, torque reading was 115.6 N-m and mixing chamber internal temperature was 88° C. Compounding evaluation results are listed in Table 9.

Comparative Example C-9

A compounding evaluation was performed as in Invention Example 23, but using tapered linear block copolymer of Comparative Example 1. At a total compounding time of 12 minutes, torque reading was 109.9 N-m and mixing chamber internal temperature was 88° C. Compounding evaluation results are listed in Table 9.

Comparative Example C-10

A compounding evaluation was performed as in Invention Example 23, but using tapered coupled block copolymer of Comparative Example 2. At a total mixing time of 12 minutes, torque reading was 112.2 N-m and mixing chamber internal temperature was 87° C. Compounding evaluation results are listed in Table 9.

Comparative Example C-11

A compounding evaluation was performed as in Invention Example 23, but using tapered block copolymer of Comparative Example 3. At a total mixing time of 12 minutes, torque reading was 119.6 N-m and mixing chamber internal temperature was 90° C. Compounding evaluation results are listed in Table 9.

Comparative Example C-12

A compounding evaluation was performed as in Invention Example 23, but using Buna® BL 30-4548. At a total mixing time of 12 minutes, torque reading was 114.3 N–m and mixing chamber internal temperature was 90° C. Compounding evaluation results are listed in Table 9.

In Invention Example 23 and in Comparative Example 9, the block copolymers employed in the formulation had very similar Mooney viscosity values, 32.0 and 32.4, respectively, and very similar complex shear viscosity profiles at 100° C., as can be reviewed in Table 3 (see Invention Example 3 and Comparative Example 1). It can be noticed that at the end of the compounding cycle slightly lower torque and lower chamber temperature was obtained when formulation comprised dual composition block copolymer than when comprising prior art uncoupled tapered block copolymer.

In Invention Example 24 and 25, and in Comparative Example 10, the block copolymers employed in the formulation had very similar Mooney viscosity values, 39.2, 39.0 and 40.6, respectively, and very similar complex shear viscosity profiles at 100° C., as can be reviewed in Table 3 (see Invention Example 4, Invention Example 13 and Comparative Example 2). Again, it can be noticed that at the end of the compounding cycle slightly lower torque and lower chamber temperature was obtained when formulation comprised dual composition block copolymer than when comprising prior art uncoupled tapered block copolymer.

In Invention Example 26 and in Comparative Example 11, the block copolymers employed in the formulation had very similar complex shear viscosity profiles at 100° C., higher than in previous examples, as can be reviewed in Table 3 (see Invention Example 3 and Comparative Example 1). Again, it can be noticed that at the end of the compounding cycle slightly lower torque and lower chamber temperature was obtained when formulation comprised dual composition block copolymer than when comprising prior art uncoupled tapered block copolymer.

Moreover, when comparing compounding of formulations in Invention Examples 23 to 26, against compounding of formulation comprising prior art commercial reference Buna® BL 30-4548, in Comparative Example 12, it can be noticed that dual composition block copolymers of the invention conduct to slightly lower temperature at the end of the compounding cycle, and in most of the cases exhibiting slightly lower final torque.

Slightly lower torque when compounding formulations comprising dual composition block copolymers of the invention represent an advantage as lower power consumption is needed to conduct compounding operation. Slightly lower final internal chamber temperature when compounding formulations comprising dual composition block copolymers of the invention represent an advantage as premature crosslinking and premature blowing problems during mixing operation are better avoided; this is particularly advantageous when using crosslinking systems and/or blowing agent systems with low activation temperatures.

TABLE 9

Crosslinkable-foamable block copolymer formulations and compounding

| | | Compounding examples | | | |
|---|---|---|---|---|---|
| | | EX-23 | C-9 | EX-24 | EX-25 |
| Formulation (weight parts) | Invention Example 3 | 80 | 0 | 0 | 0 |
| | Comparative Example 1 | 0 | 80 | 0 | 0 |
| | Invention Example 4 | 0 | 0 | 80 | 0 |
| | Invention Example 13 | 0 | 0 | 0 | 80 |
| | Comparative Example 2 | 0 | 0 | 0 | 0 |
| | Invention Example 5 | 0 | 0 | 0 | 0 |
| | Comparative Example 3 | 0 | 0 | 0 | 0 |
| | Buna ® BL 30-4548 | 0 | 0 | 0 | 0 |
| | Emulprene 1502 | 20 | 20 | 20 | 20 |
| | Naphthenic oil | 2.5 | 2.5 | 2.5 | 2.5 |
| | Paraffin wax | 1.7 | 1.7 | 1.7 | 1.7 |
| | Hard clay | 70 | 70 | 70 | 70 |
| | Aluminum silicate | 35 | 35 | 35 | 35 |
| | Celogen ® AZ-130 | 4.5 | 4.5 | 4.5 | 4.5 |
| | Wingstay ® L | 1 | 1 | 1 | 1 |
| | Sulfur | 3 | 3 | 3 | 3 |
| | Stearic acid | 3.5 | 3.5 | 3.5 | 3.5 |
| | Zinc Oxide | 3.5 | 3.5 | 3.5 | 3.5 |
| | DPG | 1 | 1 | 1 | 1 |
| | MBS | 2.3 | 2.3 | 2.3 | 2.3 |
| Compounding process evaluation | Initial mixing chamber temperature, ° C. | 45 | 45 | 45 | 45 |
| | Final torque reading, N-m | 106.2 | 109.9 | 110.2 | 110 |
| | Final mixing chamber temperature, ° C. | 87 | 88 | 87 | 87 |

| | | Compounding examples | | | |
|---|---|---|---|---|---|
| | | C-10 | EX-26 | C-11 | C-12 |
| Formulation (weight parts) | Invention Example 3 | 0 | 0 | 0 | 0 |
| | Comparative Example 1 | 0 | 0 | 0 | 0 |
| | Invention Example 4 | 0 | 0 | 0 | 0 |
| | Invention Example 13 | 0 | 0 | 0 | 0 |
| | Comparative Example 2 | 80 | 0 | 0 | 0 |
| | Invention Example 5 | 0 | 80 | 0 | 0 |
| | Comparative Example 3 | 0 | 0 | 80 | 0 |
| | Buna ® BL 30-4548 | 0 | 0 | 0 | 80 |
| | Emulprene 1502 | 20 | 20 | 20 | 20 |
| | Naphthenic oil | 2.5 | 2.5 | 2.5 | 2.5 |
| | Paraffin wax | 1.7 | 1.7 | 1.7 | 1.7 |
| | Hard clay | 70 | 70 | 70 | 70 |
| | Aluminum silicate | 35 | 35 | 35 | 35 |
| | Celogen ® AZ-130 | 4.5 | 4.5 | 4.5 | 4.5 |
| | Wingstay ® L | 1 | 1 | 1 | 1 |
| | Sulfur | 3 | 3 | 3 | 3 |
| | Stearic acid | 3.5 | 3.5 | 3.5 | 3.5 |

TABLE 9-continued

| | Crosslinkable-foamable block copolymer formulations and compounding | | | | |
|---|---|---|---|---|---|
| | Zinc Oxide | 3.5 | 3.5 | 3.5 | 3.5 |
| | DPG | 1 | 1 | 1 | 1 |
| | MBS | 2.3 | 2.3 | 2.3 | 2.3 |
| Compounding | Initial mixing chamber temperature, ° C. | 45 | 45 | 45 | 45 |
| process | Final torque reading, N-m | 112.2 | 115.6 | 119.6 | 114.3 |
| evaluation | Final mixing chamber temperature, ° C. | 87 | 88 | 90 | 90 |

In the following examples, there are shown formulations and performance of hot-melt pressure sensitive adhesives comprising a dual composition block copolymer of the present invention or prior art block copolymers. The formulation employed was customized for label adhesive purpose. Properties of the adhesives were evaluated with the following test methods: Brookfield viscosity at 150, 160 and 177° C., by ASTM D1084/D2556; ring and ball softening point temperature, was obtained by ASTM D36; loop tack tests at 23° C. were conducted according to PSTC-16; Rolling Ball Tack was evaluated at 23° C. as normed by PSTC-6; peel strength at 180° angle and 23° C. as per PSTC-1; and shear strength at 23° C. with ASTM D3654.

Invention Example 27

A hot-melt pressure sensitive adhesive for label was prepared using the following formulation: 100 weight parts of dual composition block copolymer with similar characteristics as that of Invention Example 13 ($M_w$=174.0 kg/mol, un-coupled block copolymer D-(D/A)-$A_1$ content=15.16%, un-coupled block copolymer D-(D/A)-$A_2$ content=46.01%, coupled block copolymer [D-(D/A)-$A_1$]$_{n=2-4}$-Si content=38.83%, % $A_t$=40.08, blockiness degree=83.06%, Mooney viscosity ML 1+4 at 100° C.=40.7, Tan delta$_{max}$ when sweeping oscillation frequency from 0.25 to 200 rad/s at 100° C. and at strain of 13.95%=0.81), 178 weight parts of hydrogenated gum rosin tackifier Foral® 85 from Eastman Chemical Company, 50 weight parts of naphthenic oil Nynex® 223 from NYNAS, and 4 weight parts of antioxidant Irganox® 1010 from BASF. Formulation was carried out in a 500 ml cylindric metal container equipped with controlled heating mantle and adjustable stirring speed by a three-blade propeller. Tackifier, naphthenic oil and antioxidant were first heated at 135° C. under nitrogen atmosphere and gentle stirring to melt the components. Upon melting, stirring speed was set at 300 RPM and temperature was raised to 155° C., over a 30-minutes period. Then dual composition block copolymer was gradually added and stirring speed was increased to 750 RPM. Then temperature was controlled at 170±5° C. for the following 2 hours, while stirring at 750 RPM to assure homogenization of the formulation. This adhesive exhibited Brookfield viscosities of 66300 cP at 150° C., of 46380 cP at 160° C., and of 19680 cP at 177° C.; ring and ball softening point temperature of 90.9° C.; loop tack at 23° C. of 8.853 lb$_f$-in, rolling ball tack at 23° C. of 0.28 in; peel strength at 180° angle and 23° C. of 4.04 lb$_f$; and shear strength at 23° C. of 9.58 minutes with a load of 1000 g. Formulation and performance of the adhesive are shown in Table 10.

Comparative Example C-13

A hot-melt pressure sensitive adhesive for label was prepared as in Invention Example 27, but replacing Dual Composition Block Copolymer by Solprene® 1205, from Dynasol Group. Solprene® 1205 is a tapered styrene-butadiene block copolymer with total styrene content of 25 wt. %, block styrene content of 17.5 wt. %, and Mooney viscosity ML 1+4 at 100° C. of 47, which is a well-established benchmark for the formulation of hot-melt pressure sensitive adhesives. This adhesive performed Brookfield viscosities of 14000 cP at 150° C., of 10750 cP at 160° C., and of 7050 cP at 177° C.; ring and ball softening point temperature of 69.95° C.; loop tack at 23° C. of 6.132 lb$_f$-in; rolling ball tack at 23° C. of 0.44 in; peel strength at 180° angle and 23° C. of 3.275 lb$_f$; and shear strength at 23° C. of 1.55 minutes at 1000 g load. Recipe and properties of this adhesive are listed in Table 10.

Comparative Example C-14

A hot-melt pressure sensitive adhesive for label was prepared as in Invention Example 27, but replacing Dual Composition Block Copolymer by Calprene® 540, from Dynasol Group. Calprene® 540 is linear styrene-butadiene-styrene triblock copolymer with total styrene content of 40 wt. %, block styrene content of 38 wt. %, which is also marketed for the formulation of hot-melt pressure sensitive adhesives. This adhesive presented Brookfield viscosities of 13260 cP at 150° C., of 9300 cP at 160° C., and of 5470 cP at 177° C.; ring and ball softening point temperature of 85.3° C.; loop tack at 23° C. of 5.05 lb$_f$-in; rolling ball tack at 23° C. of 0.98 in; peel strength at 180° angle and 23° C. of 4.09 lb$_f$; and shear strength at 23° C. of 713.5 minutes at 1000 g load. Evaluation of this adhesive is shown in Table 10.

TABLE 10

Hot-melt pressure sensitive adhesive formulations and performance evaluations.

| | | Hot-melt pressure sensitive adhesive examples | | |
|---|---|---|---|---|
| | | EX-27 | C-13 | C-14 |
| Adhesive formulation | Dual composition block copolymer, phr | 100 | 0 | 0 |
| | Solprene ® 1205, phr | 0 | 100 | 0 |
| | Calprene ®, phr | 0 | 0 | 100 |
| | Foral ® 85, phr | 178 | 178 | 178 |
| | Nyflex ® 223, phr | 50 | 50 | 50 |

TABLE 10-continued

Hot-melt pressure sensitive adhesive formulations and performance evaluations.

|   |   | Hot-melt pressure sensitive adhesive examples | | |
|---|---|---|---|---|
|   |   | EX-27 | C-13 | C-14 |
|   | Irganox ® 1010, phr | 4 | 4 | 4 |
| Adhesive | Brookfield viscosity at 150° C., cP | 66300 | 14000 | 13206 |
| performance | Brookfield viscosity at 160° C., cP | 46380 | 10750 | 9300 |
|   | Brookfield viscosity at 177° C., cP | 19680 | 7050 | 5470 |
|   | Ring and ball softening temperature, ° C. | 90.9 | 69.95 | 85.3 |
|   | Loop tack at 23° C., lb$_f$-in | 8.85 | 6.13 | 5.05 |
|   | Rolling ball Tack at 23° C., in | 0.28 | 0.44 | 0.98 |
|   | Peel strength at 180° angle and 23° C., lb$_f$ | 4.04 | 3.28 | 4.09 |
|   | Shear strength at 23° C., minutes - 1000 g | 9.58 | 1.55 | 713.45 |

Performance evaluation of hot-melt pressure sensitive adhesive formulation for labels shows that dual composition block copolymer confers outstanding tack, which may be related to higher wetting and adherence capacity of terminal conjugated diene rich blocks of its coupled fraction. On the other hand, the higher softening point temperature of the adhesive formulated with dual composition block copolymer can be advantageous to expand service temperature range of the adhesive, as to be useful for labels of merchandises exposed to high temperatures during their transportation. Brookfield viscosity of hot melt adhesive according to the invention is at the upper limit of usefulness for its processing, nevertheless it may be easily lowered by proper adjustment of molecular parameters such as molecular weight, coupling level, and/or functionality of coupling agent employed.

End-Use Applications

In summary, in one embodiment, the present invention provides a dual composition block copolymer, comprising C and U, wherein C comprises: [D-(D/A)-A1]n-X; [B-(B/A)-A1]n-X; [(B/A)-A1]n-X; or [B-A1]n-X, or a mixture of the foregoing, and wherein U comprises: D-(D/A)-A2 or D-(D/A)-A2 and D-(D/A)-A1; B-(B/A)-A2 or B-(B/A)-A2 and B-(B/A)-A1; (B/A)-A2 or (B/A)-A2 and (B/A)-A1; or B-A2 or B-A2 and B-A1, or a mixture of the foregoing, wherein B is a polymer block made from only conjugated diene monomer, (B/A) is a random polymer block made from at least a conjugated diene monomer and at least a monovinyl aromatic monomer, D is a polymer block made from at least a conjugated diene monomer and at least a monovinyl aromatic monomer, wherein conjugated diene repeating units are in a greater molar amount than monovinyl aromatic repeating units along the whole polymer block length, (D/A) is a polymer block made from at least a conjugated diene monomer and at least a monovinyl aromatic monomer, wherein an end of the polymer block opposite to A1 or A2 is predominantly composed of conjugated diene repeating units, wherein the composition of the polymer block gradually changes along the length of the block until it becomes composed substantially of monovinyl aromatic repeating units at an end adjacent to A1 or A2, A1 and A2 are polymer blocks made from monovinyl aromatic monomer only, wherein polymer block A2 has a greater molecular weight than polymer block A1, X is the residue of a coupling agent, and wherein n is an integer with a value from 2 to 30.

Preferably, the molecular weight distribution of the dual composition block copolymer exhibits at least two peaks, partially or totally resolved; and/or block copolymer C constitutes the fraction with the peak at the highest molecular weight in the molecular weight distribution, and block copolymer U constitutes the remainder of the molecular weight distribution; and/or block copolymer C accounts for from about 20 to about 80% of the molecular weight distribution. Optionally, the total monovinyl aromatic repeating unit content of the dual composition block copolymer is from about 20 to about 50 wt. %; and/or monovinyl aromatic repeating unit content in block copolymer U is at least 10 wt. % higher than monovinyl aromatic repeating unit content in block copolymer C.

The primary anticipated end-use application for the dual composition block copolymers of the present invention is in making the crosslinked microcellular rubber articles described herein. However, the dual composition block copolymers of the present invention may also be useful in asphalt reinforcement, adhesives, sealants, coatings, insulation and plastic compositions. End-use applications for block copolymers are described in U.S. patent application Ser. No. 15/417,193, filed on Jan. 26, 2107, and published on Jul. 27, 2017, as U.S. Pub. No. 2017/0210841 A1, which is incorporated by reference. One application is a bituminous composition that can include a bitumen; one or more additives selected from the group consisting of plasticizers; fillers; crosslinking agents; flow resins; tackifying resins; processing aids; antiozonants; and antioxidants; and a dual composition block copolymer composition as described and claimed herein, wherein the bituminous composition includes from about 0.5 to about 25 percent weight, preferably from about 0.5 to about 8 percent weight for road paving applications and 3 to about 25 percent weight for roofing, shingles and waterproofing membrane applications. The bituminous composition can also be emulsified in water with an emulsifying agent.

One application is an adhesive composition that can include at least one additive selected from the group consisting of tackifying resins; plasticizers; solvent; coupling agents; crosslinking agents; photoinitiators; and antioxidants; and a dual composition block copolymer composition as described and claimed herein, wherein the adhesive composition includes from about 0.5 to about 50 percent weight of the dual composition block copolymer composition. Another application is a sealant composition that can include at least one additive selected from the group consisting of tackifying resins; plasticizers; fillers; coupling agents; processing aids; and antioxidants; and a dual composition block copolymer composition as described and claimed herein, wherein the sealant composition includes from about 0.5 to about 50 percent weight of the dual composition block copolymer composition. Another suitable application of the invention is the production of high impact styrenic resins, such as HIPS and ABS obtained by bulk polymerization of styrene, or bulk copolymerization of styrene and acrylonitrile, in the presence dual composition block copolymer, for the specific purpose of improving gloss with minimal compromise of impact strength, which can include a mixture of a polymeric composition and a dual composition block copolymer composition as described and claimed herein.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. A dual composition block copolymer, comprising block copolymer C and block copolymer U, wherein
block copolymer C comprises:

$[D-(D/A)-A_1]_n-X$;

$[B-(B/A)-A_1]_n-X$;

$[(B/A)-A_1]_n-X$; or $[B-A_1]_n-X$, or a mixture of the foregoing, and wherein block copolymer U comprises:

$D-(D/A)-A_2$ or $D-(D/A)-A_2$ and $D-(D/A)-A_1$;

$B-(B/A)-A_2$ or $B-(B/A)-A_2$ and $B-(B/A)-A_1$;

$(B/A)-A_2$ or $(B/A)-A_2$ and $(B/A)-A_1$; or $B-A_2$ or $B-A_2$ and $B-A_1$, or a mixture of the foregoing, wherein
B is a polymer block made from only conjugated diene monomer, wherein
(B/A) is a random polymer block made from at least a conjugated diene monomer and at least a monovinyl aromatic monomer, wherein
D is a polymer block made from at least a conjugated diene monomer and at least a monovinyl aromatic monomer, wherein conjugated diene repeating units are in a greater molar amount than monovinyl aromatic repeating units along a whole polymer block length, wherein
(D/A) is a polymer block made from at least a conjugated diene monomer and at least a monovinyl aromatic monomer, wherein an end of the polymer block opposite to $A_1$ or $A_2$ is predominantly composed of conjugated diene repeating units, wherein a composition of the polymer block gradually changes along a length of the block until it becomes composed substantially of monovinyl aromatic repeating units at an end adjacent to $A_1$ or $A_2$, wherein
$A_1$ and $A_2$ are polymer blocks made from monovinyl aromatic monomer only, wherein polymer block $A_2$ has a greater molecular weight than polymer block $A_1$, wherein
X is a residue of a coupling agent, and wherein n is an integer with a value from 2 to 30;
and wherein:
molecular weight distribution of the dual composition block copolymer exhibits at least two peaks, partially or totally resolved; and
block copolymer C constitutes a fraction with the peak at the highest molecular weight in the molecular weight distribution, and block copolymer U constitutes a remainder of the molecular weight distribution; and
block copolymer C accounts for from about 20 to about 80% of the molecular weight distribution; and
total monovinyl aromatic repeating unit content of the dual composition block copolymer is from about 20 to about 50 wt %; and
monovinyl aromatic repeating unit content in block copolymer U is at least 10 wt % higher than monovinyl aromatic repeating unit content in block copolymer C; and
optionally, the dual composition block copolymer further comprises extender oil.

2. The dual composition block copolymer of claim 1, wherein
block copolymer C comprises:

$[D-(D/A)-A_1]_n-X$, and wherein block copolymer U comprises:

$D-(D/A)-A_2$ or $D-(D/A)-A_2$ and $D-(D/A)-A_1$, wherein:

uncoupled block copolymer molecules of formula $D-(D/A)-A_2$ account for from about 20 to about 80 wt % of a molecular weight distribution of the dual composition block copolymer,
uncoupled block copolymer molecules of formula $D-(D/A)-A_1$ account for from about 0 to about 20 wt. % of the molecular weight distribution of the dual composition block copolymer,
monovinyl aromatic repeating unit blockiness degree of the dual composition block copolymer is equal or greater than about 76 mole %, on a total monovinyl aromatic repeating unit basis, and
optionally, the dual composition block copolymer further comprises from 0 to about 12 wt % of extender oil.

3. The dual composition block copolymer of claim 1, wherein
block copolymer C comprises:

$[B-(B/A)-A_1]_n-X$, and wherein block copolymer U comprises:

$B-(B/A)-A_2$ or $B-(B/A)-A_2$ and $B-(B/A)-A_1$, wherein:

uncoupled block copolymer molecules of formula $B-(B/A)-A_2$ account for from about 20 to about 80 wt % of a molecular weight distribution of the dual composition block copolymer,
uncoupled block copolymer molecules of formula $B-(B/A)-A_1$ account for from about 0 to about 20 wt % of the molecular weight distribution of the dual composition block copolymer, and
optionally, the dual composition block copolymer further comprises from 0 to about 12 wt % of extender oil.

4. The dual composition block copolymer of claim 1, wherein
block copolymer C comprises:

$[(B/A)-A_1]_n-X$, and wherein block copolymer U comprises:

$(B/A)-A_2$ or $(B/A)-A_2$ and $(B/A)-A_1$, wherein:

uncoupled block copolymer molecules of formula $(B/A)-A_2$ account for from about 20 to about 80 wt % of a molecular weight distribution of the dual composition block copolymer, uncoupled block copolymer molecules of formula (B/A)-$A_1$ account for from about 0 to about 20 wt % of the molecular weight distribution of the dual composition block copolymer, and optionally, the dual composition block copolymer further comprises from 0 to about 12 wt % of extender oil.

5. The dual composition block copolymer of claim 1, wherein block copolymer C comprises:

[B-$A_1$]$_n$-X, and wherein block copolymer U comprises:

B-$A_2$ or B-$A_2$ and B-$A_1$, wherein:

uncoupled block copolymer molecules of formula B-$A_2$ account for from about 20 to about 80 wt % of a molecular weight distribution of the dual composition block copolymer, uncoupled block copolymer molecules of formula B-$A_1$ account for from about 0 to about 20 wt % of the molecular weight distribution of the dual composition block copolymer, monovinyl aromatic repeating unit blockiness degree of the dual composition block copolymer is equal or greater than about 90 mole %, on a total monovinyl aromatic repeating unit basis, and optionally, the dual composition block copolymer further comprises from 0 to about 12 wt % of extender oil.

6. The dual composition block copolymer of claim 2, wherein the monovinyl aromatic repeating unit blockiness degree of the dual composition block copolymer is at least about 80 mole % on a total monovinyl aromatic repeating unit basis.

7. The dual composition block copolymer of any one of claims 1 to 5, wherein the monovinyl aromatic repeating unit content in block copolymer U is at least 20 wt % higher than in block copolymer C.

8. The dual composition block copolymer of any one of claims 1 to 5, wherein n is an integer from 2 to 4 and a polydispersity ratio $M_w/M_n$ of the dual composition block copolymer is less than 1.50; or n is an integer from 2 to 30 and a polydispersity ratio $M_w/M_n$ of the dual composition block copolymer is less than 1.90.

9. The dual composition block copolymer of any one of claims 1 to 5, wherein a dynamic oscillatory shear test only exhibits tan delta values of less than 0.95, when oscillation frequency is varied from 0.25 to 200 rad/s, at a temperature of 100° C., and at strain of 13.95%, optionally wherein a dynamic oscillatory shear test only exhibits tan delta values of less than 0.95, when oscillation frequency is varied from 0.25 to 200 rad/s, at a temperature of 140° ° C., and at strain of 13.95%.

10. The dual composition block copolymer any one of claims 1 to 5, wherein a dynamic oscillatory shear test only exhibits tan delta values of less than 0.90, when oscillation frequency is varied from 0.25 to 200 rad/s, at a temperature of 100° C., and at strain of 13.95%, optionally wherein a dynamic oscillatory shear test only exhibits tan delta values of less than 0.90, when oscillation frequency is varied from 0.25 to 200 rad/s, at a temperature of 140° C., and at strain of 13.95%.

11. The dual composition block copolymer of any one of claims 1 to 5, wherein a dynamic oscillatory shear test only exhibits tan delta values of less than 0.85, when oscillation frequency is varied from 0.25 to 200 rad/s, at a temperature of 100° C., and at strain of 13.95%, optionally wherein its a dynamic oscillatory shear test only exhibits tan delta values of less than 0.85, when oscillation frequency is varied from 0.25 to 200 rad/s, at a temperature of 140° C., and at strain of 13.95%.

12. The dual composition block copolymer any one of claims 1 to 5, wherein Mooney viscosity (ML 1+4 at 100° C.) of the dual composition block copolymer is from about 25 to about 90; and complex dynamic shear viscosity of the dual composition block copolymer, evaluated at a frequency of 0.99 rad/s, at a temperature of 100° C. and at strain of 13.95%, is between about 50,000 Pa-s and about 360,000 Pa-s; and complex dynamic shear viscosity of the dual composition block copolymer, evaluated at a frequency of 100 rad/s, at a temperature of 100° C. and at strain of 13.95%, is between about 3,000 Pa-s and about 12,000 Pa-s.

13. A dual composition block copolymer made from conjugated diene and monovinyl aromatic monomers, comprising a block copolymer C and a block copolymer U, wherein, (a) molecular weight distribution of the dual composition block copolymer exhibits at least two peaks, partially or totally resolved;

(b) block copolymer C constitutes the fraction with a peak at the highest molecular weight in the molecular weight distribution, and block copolymer U constitutes a remainder of the molecular weight distribution;

(c) block copolymer C accounts for from about 20 to about 80% of the molecular weight distribution;

(d) total monovinyl aromatic repeating unit content of the dual composition block copolymer is from about 20 to about 50 wt %;

(e) monovinyl aromatic repeating unit content in block copolymer U is at least 10 wt % higher than monovinyl aromatic repeating unit content in block copolymer C;

(f) monovinyl aromatic repeating unit blockiness degree of the dual composition block copolymer is equal to or greater than about 77 mole % on a total monovinyl aromatic repeating unit basis;

(g) Mooney viscosity (ML 1+4 at 100° C.) of the dual composition block copolymer is from about 25 to about 70;

(h) complex dynamic shear viscosity of the dual composition block copolymer, evaluated at a frequency of 0.99 rad/s, at a temperature of 100° C. and at strain of 13.95%, is greater than about 50000 Pa-s and less than about 150000 Pa-s;

(i) complex dynamic shear viscosity of the dual composition block copolymer, evaluated at a frequency of 100 rad/s, at a temperature of 100° C. and at strain of 13.95%, is greater than about 3000 Pa-s and less than about 7000 Pa-s; and (j) dynamic oscillatory shear test of the dual composition block copolymer, when sweeping oscillation frequency from 0.25 to 200 rad/s, at a temperature of 100° C., and at strain of 13.95%, exhibits tan delta values of less than 0.95.

14. The dual composition block copolymer of claim 13, wherein the block copolymer C has the general formula:

[D-(D/A)-A$_1$]$_n$-X and the block copolymer U has the general formula:

D-(D/A)-A$_2$ or

D-(D/A)-A$_2$ and D-(D/A)-A$_1$, wherein:
(a) D is a polymer block made from at least a conjugated diene monomer and at least a monovinyl aromatic monomer, wherein conjugated diene repeating units are in greater molar amount than monovinyl aromatic repeating units along a whole polymer block length;
(b) (D/A) is a polymer block made from at least a conjugated diene monomer and at least a monovinyl aromatic monomer, wherein polymer block end opposite to A$_1$ or A$_2$ is predominantly composed of conjugated diene repeating units and that gradually changes its composition until it becomes substantially composed of monovinyl aromatic repeating units at its end adjacent to A$_1$ or A$_2$;
(c) A$_1$ and A$_2$ are polymer blocks made from monovinyl aromatic monomer only;
(d) polymer block A$_2$ has greater molecular weight than polymer block A$_1$;
(e) X is a residue of a coupling agent, and n is an integer with a value from 2 to 30; and
(f) coupled block copolymer molecules of formula [D-(D/A)-A$_1$]$_n$-X account for from about 20 to about 80% of the molecular weight distribution of the dual composition block copolymer;
(g) uncoupled block copolymer molecules of formula D-(D/A)-A$_2$ account for from about 20 to about 80 wt % of the molecular weight distribution of the dual composition block copolymer;
(h) uncoupled block copolymer molecules of formula D-(D/A)-A$_1$ account for from about 0 to about 20 wt % of the molecular weight distribution of the dual composition block copolymer.

15. A process for making the dual composition block copolymer of claim 2, comprising the steps of:
charging an aliphatic hydrocarbon solvent, a conjugated diene monomer and a monovinyl aromatic monomer to a batch reactor;
charging an organolithium initiator to the batch reactor;
allowing for full copolymerization of monomers and forming polymeric anions;
charging a limited amount of a coupling agent to the batch reactor so as to couple only a fraction of the polymeric anions;
charging more and/or a different monovinyl aromatic monomer to the batch reactor;
allowing for full block copolymerization of the monovinyl aromatic monomer;
charging a proton donor or an electrophilic monofunctional compound for deactivating all remaining polymeric anions in the batch reactor; and
recovering a dual composition block copolymer.

16. A process for making the dual composition block copolymer of claim 3, comprising the steps of:
charging an aliphatic hydrocarbon solvent, a randomizer, and a conjugated diene monomer to a batch reactor;
charging an organolithium initiator to the batch reactor;
allowing for polymerization of conjugated diene monomer fed to the batch reactor to a conversion level from about 80% to about 95%;
charging a monovinyl aromatic monomer to the batch reactor;
allowing for full copolymerization of remaining conjugated diene monomer and monovinyl aromatic monomer fed to the reactor, wherein polymeric anions are formed;
charging a limited amount of a coupling agent for partially coupling the polymeric anions;
charging more and/or a different monovinyl aromatic monomer to the batch reactor;
allowing for full block copolymerization of the monovinyl aromatic monomer;
charging a proton donor or an electrophilic monofunctional compound for deactivating all remaining polymeric anions; and
recovering a dual composition block copolymer.

17. A process for making the dual composition block copolymer of claim 4, comprising the steps of:
charging an aliphatic hydrocarbon solvent, a randomizer, a conjugated diene monomer and a monovinyl aromatic monomer to a batch reactor;
charging an organolithium initiator to the batch reactor;
allowing for complete copolymerization of the conjugated diene monomer and the monovinyl aromatic monomer;
charging more and/or a different monovinyl aromatic monomer to the batch reactor;
allowing for full block copolymerization of the monovinyl aromatic monomer fed to the batch reactor, wherein polymeric anions are formed;
charging a limited amount of a coupling agent so as to couple only a fraction of the polymeric anions;
charging more and/or a different monovinyl aromatic monomer to the batch reactor;
allowing for full block copolymerization of the monovinyl aromatic monomer;
charging a proton donor or an electrophilic monofunctional compound to fully deactivate any remaining polymeric anions; and
recovering a dual composition block copolymer.

18. A process for making the dual composition block copolymer of claim 5, comprising the steps of:
charging an aliphatic hydrocarbon solvent, a randomizer, and a conjugated diene monomer to a batch reactor;
charging an organolithium initiator to the batch reactor;
allowing for the complete polymerization of the conjugated diene monomer;
charging a monovinyl aromatic monomer to the batch reactor;
allowing for full block copolymerization of the monovinyl aromatic monomer fed to the batch reactor, wherein polymeric anions are formed;
charging a limited amount of a coupling agent for partially coupling the polymeric anions;
charging more and/or a different monovinyl aromatic monomer to the batch reactor;
allowing for full block copolymerization of the monovinyl aromatic monomer;
charging a proton donor or an electrophilic monofunctional compound so as to fully deactivate any remaining polymeric anions in the batch reactor; and
recovering a dual composition block copolymer.

19. The process of any one of claims 15 to 18, further comprising the step of:
- charging a limited amount of a proton donor or an electrophilic monofunctional compound so as to deactivate only a fraction of the polymeric anions in the batch reactor before the step of charging more and/or a different monovinyl aromatic monomer; or
- charging a limited amount of a proton donor or an electrophilic monofunctional compound so as to deactivate only a fraction of the polymeric anions in the batch reactor simultaneously with the step of charging more and/or a different monovinyl aromatic monomer.

20. A composition for a crosslinked microcellular rubber article, comprising:
- a dual composition block copolymer composition of any one of claims 1 to 5;
- a blowing agent; and a crosslinking agent.

21. The composition of claim 20, further comprising at least one additive selected from the group consisting of: styrene-butadiene random copolymers; styrene-isoprene-butadiene random copolymers; natural rubbers; polybutadienes; polyisoprene rubbers; ethylene/α-olefin/non-conjugated diene terpolymers; ethylene-propylene copolymers; ethylene-vinyl acetate copolymers; ground crosslinked microcellular rubber compounds; fillers; plasticizers; blowing agent activators; crosslinking agent activators; crosslinking accelerators; vulcanization retarders; antioxidants; antiozonants; UV stabilizers; light stabilizers; fragrances or odorants; anti-termite agents; biocide agents; antifungal agents; antimicrobial agents; antibacterial agents; metal deactivators; dyes; pigments; mold release agents; and mixtures thereof.

22. A composition for a hot-melt pressure sensitive adhesive, comprising:
- a dual composition block copolymer composition of any one of claims 1 to 5;
- a tackifier resin; an extender oil; and an antioxidant.

23. The composition of claim 22, further comprising at least one additive selected from the group consisting of: fillers; waxes; photoinitiators; crosslinking agents; crosslinking coagents; crosslinking retarders; adhesion promoters or coupling agents; UV stabilizers; light stabilizers; ozone stabilizers; epoxy resins; asphalt; reinforcing resins; fragrances or odorants; anti-termite agents; biocide agents; antifungal agents; antibacterial agents; metal deactivators; dyes, pigments or colorants; flame retardants; blowing agents; blowing agent activators; refractive index adjusting agents; and mixtures thereof.

* * * * *